US010031284B2

(12) United States Patent
Hayashi et al.

(10) Patent No.: US 10,031,284 B2
(45) Date of Patent: *Jul. 24, 2018

(54) MULTI-CORE OPTICAL FIBER, OPTICAL CABLE, AND OPTICAL CONNECTOR

(71) Applicant: SUMITOMO ELECTRIC INDUSTRIES, LTD., Osaka-shi, Osaka (JP)

(72) Inventors: Tetsuya Hayashi, Yokohama (JP); Osamu Shimakawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,006

(22) Filed: Jun. 30, 2017

(65) Prior Publication Data

US 2017/0307812 A1 Oct. 26, 2017

Related U.S. Application Data

(63) Continuation of application No. 15/080,878, filed on Mar. 25, 2016, now Pat. No. 9,726,816, which is a (Continued)

(30) Foreign Application Priority Data

Oct. 22, 2014 (JP) ................................ 2014-215401
Mar. 6, 2015 (JP) ................................ 2015-044957

(51) Int. Cl.
*G02B 6/02* (2006.01)
*G02B 6/38* (2006.01)
(Continued)

(52) U.S. Cl.
CPC ..... *G02B 6/02042* (2013.01); *G02B 6/02004* (2013.01); *G02B 6/3885* (2013.01);
(Continued)

(58) Field of Classification Search
CPC ................................................ G02B 6/02042
See application file for complete search history.

(56) References Cited

U.S. PATENT DOCUMENTS 8,285,094 B2 10/2012 Takenaga et al.
9,069,143 B2 6/2015 Bradley et al.
(Continued)

OTHER PUBLICATIONS

K. Takenaga et al., "Reduction of Crosstalk by Trench-Assisted Multi-Core Fiber," in Optical Fiber Communication Conference/National Fiber Optic Engineers Conference 2011, OSA Technical Digest (CD) (Optical Society of America, 2011), paper OWJ4.*

*Primary Examiner* — Omar R Rojas
(74) *Attorney, Agent, or Firm* — Drinker Biddle & Reath LLP

(57) ABSTRACT

An MCF of the present embodiment has eight or more cores. A diameter of a common cladding is not more than 126 μm. Optical characteristics of each core are as follows: a TL at a predetermined wavelength of 1310 nm is not more than 0.4 dB/km; an MFD at the predetermined wavelength is from 8.0 μm to 10.1 μm; a BL in a BR of not less than 5 mm or in the BR of not less than 3 mm and, less than 5 mm is not more than 0.25 dB/turn at the predetermined wavelength; λ0 is from 1300 nm to 1324 nm; λcc is not more than 1260 nm; an XT or XTs at the predetermined wavelength is not more than 0.001/km.

14 Claims, 56 Drawing Sheets

10
B
1
2
3
4
5
Λ
B
A
OCT

Related U.S. Application Data continuation of application No. PCT/JP2015/079272, filed on Oct. 16, 2015.

(51) Int. Cl.
*G02B 6/024* (2006.01)
*G02B 6/036* (2006.01)

(52) U.S. Cl.
CPC .......... *G02B 6/024* (2013.01); *G02B 6/02214* (2013.01); *G02B 6/02285* (2013.01); *G02B 6/02395* (2013.01); *G02B 6/0365* (2013.01)

(56) References Cited

U.S. PATENT DOCUMENTS

| | | | | |
|---|---|---|---|---|
| 9,726,816 | B2 * | 8/2017 | Hayashi ............. | G02B 6/02004 |
| 9,829,652 | B2 | 11/2017 | Watanabe et al. | |
| 2014/0178024 | A1 * | 6/2014 | Takenaga ........... | G02B 6/02042 385/126 |
| 2015/0316715 | A1 * | 11/2015 | Matsuo ............. | G02B 6/02042 385/124 |

* cited by examiner

Fig.6A

| | CORE REFRACTIVE INDEX PROFILE | | | | | | | | CORE OPTICAL CHARACTERISTICS | |
|---|---|---|---|---|---|---|---|---|---|---|
| | 2a | a/b | b/c | Δ1 | Δ2 | Δ3 | Δ1−Δ2 | 2c | λcc | λ0 |
| # ＼ Unit | [μm] | | | [%] | [%] | [%] | [%] | [μm] | [nm] | [nm] |
| 1 | 5.27 | 0.4 | 0.500 | 0.3 | 0.05 | −0.75 | 0.25 | 26.3 | 1105 | 1301 |
| 2 | 5.42 | 0.4 | 0.600 | 0.4 | 0.15 | −0.75 | 0.25 | 22.6 | 1186 | 1302 |
| 3 | 5.50 | 0.4 | 0.600 | 0.36 | 0.1 | −0.75 | 0.26 | 22.9 | 1047 | 1305 |
| 4 | 5.50 | 0.4 | 0.500 | 0.36 | 0.1 | −0.75 | 0.26 | 27.5 | 1220 | 1305 |
| 5 | 5.58 | 0.4 | 0.491 | 0.32 | 0.05 | −0.5 | 0.27 | 28.4 | 1230 | 1309 |
| 6 | 5.59 | 0.4 | 0.500 | 0.32 | 0.05 | −0.5 | 0.27 | 27.9 | 1184 | 1308 |
| 7 | 5.59 | 0.4 | 0.500 | 0.32 | 0.05 | −0.75 | 0.27 | 28.0 | 1185 | 1308 |
| 8 | 5.67 | 0.4 | 0.478 | 0.28 | 0 | −0.5 | 0.28 | 29.7 | 1230 | 1313 |
| 9 | 5.70 | 0.4 | 0.500 | 0.28 | 0 | −0.5 | 0.28 | 28.5 | 1161 | 1311 |
| 10 | 5.73 | 0.4 | 0.600 | 0.42 | 0.15 | −0.75 | 0.27 | 23.9 | 1228 | 1309 |
| 11 | 5.78 | 0.4 | 0.600 | 0.375 | 0.01 | −0.5 | 0.365 | 24.1 | 1111 | 1311 |
| 12 | 5.78 | 0.4 | 0.600 | 0.33 | 0.05 | −0.5 | 0.28 | 24.1 | 1003 | 1312 |
| 13 | 5.78 | 0.4 | 0.500 | 0.33 | 0.05 | −0.5 | 0.28 | 28.9 | 1230 | 1312 |
| 14 | 5.78 | 0.4 | 0.500 | 0.33 | 0.05 | −0.5 | 0.28 | 28.9 | 1230 | 1312 |
| 15 | 5.81 | 0.4 | 0.527 | 0.375 | 0.01 | −0.5 | 0.365 | 27.5 | 1230 | 1309 |
| 16 | 5.85 | 0.4 | 0.600 | 0.38 | 0.1 | −0.75 | 0.28 | 24.4 | 1122 | 1313 |
| 17 | 5.88 | 0.375 | 0.600 | 0.35 | 0.05 | −0.5 | 0.3 | 26.1 | 1088 | 1324 |
| 18 | 5.88 | 0.375 | 0.527 | 0.35 | 0.05 | −0.5 | 0.3 | 29.8 | 1230 | 1324 |
| 19 | 5.92 | 0.4 | 0.600 | 0.29 | 0 | −0.5 | 0.29 | 24.7 | 995 | 1315 |
| 20 | 5.92 | 0.4 | 0.492 | 0.29 | 0 | −0.5 | 0.29 | 30.1 | 1230 | 1315 |
| 21 | 5.92 | 0.4 | 0.500 | 0.29 | 0 | −0.5 | 0.29 | 29.6 | 1210 | 1315 |
| 22 | 5.96 | 0.4 | 0.700 | 0.375 | 0.1 | −0.75 | 0.275 | 21.3 | 1176 | 1305 |
| 23 | 5.97 | 0.4 | 0.600 | 0.375 | 0.1 | −0.75 | 0.275 | 24.9 | 1235 | 1304 |
| 24 | 5.97 | 0.4 | 0.623 | 0.375 | 0.1 | −0.75 | 0.275 | 24.0 | 1230 | 1304 |
| 25 | 5.98 | 0.4 | 0.525 | 0.375 | 0.09 | −0.5 | 0.285 | 28.5 | 1230 | 1314 |
| 26 | 6.00 | 0.4 | 0.600 | 0.34 | 0.05 | −0.75 | 0.29 | 25.0 | 1066 | 1314 |
| 27 | 6.00 | 0.4 | 0.600 | 0.34 | 0.05 | −0.5 | 0.29 | 25.0 | 1067 | 1314 |
| 28 | 6.00 | 0.4 | 0.515 | 0.34 | 0.05 | −0.5 | 0.29 | 29.1 | 1230 | 1314 |
| 29 | 6.08 | 0.4 | 0.491 | 0.26 | −0.04 | −0.5 | 0.3 | 31.0 | 1230 | 1318 |
| 30 | 6.08 | 0.4 | 0.500 | 0.26 | −0.04 | −0.5 | 0.3 | 30.4 | 1205 | 1318 |
| 31 | 6.11 | 0.4 | 0.497 | 0.27 | −0.03 | −0.5 | 0.3 | 30.7 | 1230 | 1318 |
| 32 | 6.11 | 0.4 | 0.500 | 0.27 | −0.03 | −0.5 | 0.3 | 30.5 | 1220 | 1318 |
| 33 | 6.12 | 0.4 | 0.600 | 0.28 | −0.02 | −0.5 | 0.3 | 25.5 | 1004 | 1318 |
| 34 | 6.13 | 0.4 | 0.500 | 0.28 | −0.02 | −0.5 | 0.3 | 30.6 | 1234 | 1318 |
| 35 | 6.13 | 0.4 | 0.501 | 0.28 | −0.02 | −0.5 | 0.3 | 30.5 | 1230 | 1318 |
| 36 | 6.13 | 0.4 | 0.700 | 0.375 | 0.09 | −0.75 | 0.285 | 21.9 | 1223 | 1309 |
| 37 | 6.14 | 0.4 | 0.649 | 0.375 | 0.09 | −0.75 | 0.285 | 23.6 | 1230 | 1308 |
| 38 | 6.14 | 0.4 | 0.600 | 0.375 | 0.09 | −0.75 | 0.285 | 25.6 | 1250 | 1308 |
| 39 | 6.15 | 0.4 | 0.600 | 0.375 | 0.08 | −0.5 | 0.295 | 25.6 | 1157 | 1317 |
| 40 | 6.15 | 0.4 | 0.600 | 0.29 | −0.01 | −0.5 | 0.3 | 25.6 | 1017 | 1318 |

Fig.6B

| | CORE OPTICAL CHARACTERISTICS | | | | | | |
|---|---|---|---|---|---|---|---|
| | S0 | MFD at 1310nm | CD at 1310nm | Macrobend loss at 1310nm R=7.5mm | R=5mm | R=4mm | R=3mm |
| # \ Unit | [ps/(nm$^2$·km)] | [μm] | [ps/(nm·km)] | [dB/turn] | [dB/turn] | [dB/turn] | [dB/turn] |
| 1 | 0.100 | 8.6 | 0.9 | 2.4E−2 | 4.6E−2 | 6.8E−2 | 1.5E−1 |
| 2 | 0.100 | 8.6 | 0.8 | 2.3E−2 | 1.1E−1 | 2.0E−1 | 4.0E−1 |
| 3 | 0.099 | 8.6 | 0.5 | 7.0E−2 | 1.6E−1 | 2.7E−1 | 5.0E−1 |
| 4 | 0.100 | 8.6 | 0.5 | 4.5E−3 | 1.1E−2 | 2.2E−2 | 5.4E−2 |
| 5 | 0.098 | 8.6 | 0.1 | 5.5E−3 | 1.3E−2 | 2.3E−2 | 6.0E−2 |
| 6 | 0.098 | 8.6 | 0.2 | 7.5E−3 | 1.7E−2 | 3.0E−2 | 7.9E−2 |
| 7 | 0.098 | 8.6 | 0.2 | 7.5E−3 | 1.7E−2 | 3.0E−2 | 7.9E−2 |
| 8 | 0.096 | 8.6 | −0.3 | 4.8E−3 | 1.1E−2 | 1.9E−2 | 5.5E−2 |
| 9 | 0.097 | 8.6 | −0.1 | 1.1E−2 | 2.4E−2 | 4.0E−2 | 1.1E−1 |
| 10 | 0.099 | 8.6 | 0.1 | 6.3E−3 | 4.5E−2 | 9.0E−2 | 2.2E−1 |
| 11 | 0.098 | 8.6 | −0.1 | 2.6E−2 | 8.3E−2 | 1.5E−1 | 3.2E−1 |
| 12 | 0.097 | 8.6 | −0.2 | 7.1E−2 | 1.5E−1 | 2.3E−1 | 4.7E−1 |
| 13 | 0.097 | 8.6 | −0.2 | 4.0E−3 | 9.7E−3 | 1.9E−2 | 5.5E−2 |
| 14 | 0.097 | 8.6 | −0.2 | 4.0E−3 | 9.6E−3 | 1.9E−2 | 5.2E−2 |
| 15 | 0.099 | 8.6 | 0.1 | 3.5E−3 | 1.1E−2 | 2.1E−2 | 5.0E−2 |
| 16 | 0.098 | 8.6 | −0.3 | 2.1E−2 | 7.2E−2 | 1.3E−1 | 2.9E−1 |
| 17 | 0.095 | 8.6 | −1.4 | 2.6E−2 | 6.2E−2 | 1.2E−1 | 2.8E−1 |
| 18 | 0.096 | 8.6 | −1.3 | 2.9E−3 | 8.3E−3 | 1.7E−2 | 5.4E−2 |
| 19 | 0.096 | 8.6 | −0.5 | 1.1E−1 | 2.0E−1 | 2.9E−1 | 5.8E−1 |
| 20 | 0.096 | 8.6 | −0.5 | 4.0E−3 | 9.6E−3 | 1.8E−2 | 5.8E−2 |
| 21 | 0.096 | 8.6 | −0.4 | 5.4E−3 | 1.3E−2 | 2.4E−2 | 7.5E−2 |
| 22 | 0.099 | 8.6 | 0.5 | 3.8E−2 | 1.4E−1 | 2.4E−1 | 4.3E−1 |
| 23 | 0.100 | 8.6 | 0.6 | 2.9E−3 | 9.7E−3 | 1.7E−2 | 3.6E−2 |
| 24 | 0.100 | 8.6 | 0.6 | 5.6E−3 | 1.9E−2 | 3.4E−2 | 6.8E−2 |
| 25 | 0.097 | 8.6 | −0.4 | 2.2E−3 | 7.1E−3 | 1.4E−2 | 3.6E−2 |
| 26 | 0.096 | 8.6 | −0.4 | 4.0E−2 | 9.1E−2 | 1.6E−1 | 3.4E−1 |
| 27 | 0.096 | 8.6 | −0.4 | 3.9E−2 | 9.0E−2 | 1.5E−1 | 3.4E−1 |
| 28 | 0.096 | 8.6 | −0.4 | 3.3E−3 | 8.6E−3 | 1.8E−2 | 5.0E−2 |
| 29 | 0.094 | 8.6 | −0.8 | 4.1E−3 | 1.0E−2 | 1.9E−2 | 7.0E−2 |
| 30 | 0.094 | 8.6 | −0.7 | 5.9E−3 | 1.4E−2 | 2.7E−2 | 9.5E−2 |
| 31 | 0.094 | 8.6 | −0.7 | 4.2E−3 | 1.0E−2 | 2.0E−2 | 7.1E−2 |
| 32 | 0.094 | 8.6 | −0.7 | 4.8E−3 | 1.2E−2 | 2.4E−2 | 8.3E−2 |
| 33 | 0.094 | 8.6 | −0.7 | 8.5E−2 | 1.6E−1 | 2.4E−1 | 5.1E−1 |
| 34 | 0.094 | 8.6 | −0.7 | 3.9E−3 | 9.7E−3 | 2.0E−2 | 7.1E−2 |
| 35 | 0.094 | 8.6 | −0.7 | 4.1E−3 | 1.0E−2 | 2.0E−2 | 6.9E−2 |
| 36 | 0.098 | 8.6 | 0.1 | 3.0E−2 | 1.1E−1 | 2.0E−1 | 3.8E−1 |
| 37 | 0.098 | 8.6 | 0.2 | 8.5E−3 | 3.1E−2 | 5.6E−2 | 1.1E−1 |
| 38 | 0.099 | 8.6 | 0.2 | 2.1E−3 | 7.4E−3 | 1.3E−2 | 2.9E−2 |
| 39 | 0.096 | 8.6 | −0.6 | 1.3E−2 | 4.6E−2 | 8.8E−2 | 2.1E−1 |
| 40 | 0.094 | 8.6 | −0.7 | 6.9E−2 | 1.4E−1 | 2.1E−1 | 4.5E−1 |

Fig.7A

| | CORE REFRACTIVE INDEX PROFILE | | | | | | | | CORE OPTICAL CHARACTERISTICS | |
|---|---|---|---|---|---|---|---|---|---|---|
| | 2a | a/b | b/c | Δ1 | Δ2 | Δ3 | Δ1−Δ2 | 2c | λcc | λ0 |
| # ╲ Unit | [μm] | | | [%] | [%] | [%] | [%] | [μm] | [nm] | [nm] |
| 41 | 6.15 | 0.4 | 0.500 | 0.29 | −0.01 | −0.5 | 0.3 | 30.7 | 1249 | 1317 |
| 42 | 6.15 | 0.4 | 0.506 | 0.29 | −0.01 | −0.5 | 0.3 | 30.4 | 1230 | 1317 |
| 43 | 6.16 | 0.4 | 0.600 | 0.3 | 0 | −0.75 | 0.3 | 25.7 | 1029 | 1317 |
| 44 | 6.16 | 0.4 | 0.600 | 0.3 | 0 | −0.5 | 0.3 | 25.7 | 1030 | 1317 |
| 45 | 6.17 | 0.4 | 0.510 | 0.3 | 0 | −0.5 | 0.3 | 30.2 | 1230 | 1317 |
| 46 | 6.17 | 0.4 | 0.544 | 0.375 | 0.08 | −0.5 | 0.295 | 28.3 | 1230 | 1315 |
| 47 | 6.18 | 0.4 | 0.600 | 0.31 | 0.01 | −0.5 | 0.3 | 25.7 | 1043 | 1317 |
| 48 | 6.18 | 0.4 | 0.515 | 0.31 | 0.01 | −0.5 | 0.3 | 30.0 | 1230 | 1317 |
| 49 | 6.19 | 0.4 | 0.600 | 0.32 | 0.02 | −0.5 | 0.3 | 25.8 | 1058 | 1317 |
| 50 | 6.20 | 0.4 | 0.519 | 0.32 | 0.02 | −0.5 | 0.3 | 29.8 | 1230 | 1317 |
| 51 | 6.20 | 0.4 | 0.600 | 0.33 | 0.03 | −0.5 | 0.3 | 25.8 | 1072 | 1317 |
| 52 | 6.20 | 0.4 | 0.522 | 0.33 | 0.03 | −0.5 | 0.3 | 29.7 | 1230 | 1317 |
| 53 | 6.22 | 0.4 | 0.600 | 0.34 | 0.04 | −0.5 | 0.3 | 25.9 | 1093 | 1317 |
| 54 | 6.22 | 0.4 | 0.538 | 0.34 | 0.04 | −0.5 | 0.3 | 28.9 | 1230 | 1317 |
| 55 | 6.23 | 0.4 | 0.600 | 0.35 | 0.05 | −0.5 | 0.3 | 26.0 | 1123 | 1317 |
| 56 | 6.24 | 0.4 | 0.538 | 0.35 | 0.05 | −0.5 | 0.3 | 29.0 | 1230 | 1317 |
| 57 | 6.24 | 0.4 | 0.600 | 0.36 | 0.06 | −0.5 | 0.3 | 26.0 | 1173 | 1317 |
| 58 | 6.25 | 0.4 | 0.565 | 0.36 | 0.06 | −0.5 | 0.3 | 27.7 | 1230 | 1317 |
| 59 | 6.26 | 0.4 | 0.600 | 0.37 | 0.07 | −0.5 | 0.3 | 26.1 | 1161 | 1317 |
| 60 | 6.26 | 0.4 | 0.600 | 0.3 | 0 | −0.6 | 0.3 | 26.1 | 1109 | 1313 |
| 61 | 6.27 | 0.4 | 0.549 | 0.3 | 0 | −0.6 | 0.3 | 28.5 | 1230 | 1313 |
| 62 | 6.28 | 0.4 | 0.700 | 0.4 | 0.1 | −0.75 | 0.3 | 22.4 | 1176 | 1318 |
| 63 | 6.29 | 0.4 | 0.600 | 0.4 | 0.1 | −0.75 | 0.3 | 26.2 | 1227 | 1317 |
| 64 | 6.30 | 0.4 | 0.700 | 0.35 | 0.05 | −0.6 | 0.3 | 22.5 | 1065 | 1314 |
| 65 | 6.32 | 0.4 | 0.600 | 0.35 | 0.05 | −0.6 | 0.3 | 26.3 | 1173 | 1314 |
| 66 | 6.32 | 0.4 | 0.700 | 0.375 | 0.08 | −0.75 | 0.295 | 22.6 | 1134 | 1310 |
| 67 | 6.32 | 0.4 | 0.565 | 0.35 | 0.05 | −0.6 | 0.3 | 28.0 | 1230 | 1314 |
| 68 | 6.32 | 0.4 | 0.635 | 0.375 | 0.08 | −0.75 | 0.295 | 24.9 | 1230 | 1310 |
| 69 | 6.32 | 0.4 | 0.573 | 0.3 | 0 | −0.7 | 0.3 | 27.6 | 1230 | 1311 |
| 70 | 6.33 | 0.4 | 0.700 | 0.3 | 0 | −0.7 | 0.3 | 22.6 | 970 | 1311 |
| 71 | 6.34 | 0.4 | 0.600 | 0.3 | 0 | −0.7 | 0.3 | 26.4 | 1177 | 1310 |
| 72 | 6.36 | 0.4 | 0.700 | 0.3 | 0 | −0.75 | 0.3 | 22.7 | 1033 | 1310 |
| 73 | 6.37 | 0.4 | 0.600 | 0.3 | 0 | −0.75 | 0.3 | 26.5 | 1212 | 1309 |
| 74 | 6.37 | 0.4 | 0.591 | 0.3 | 0 | −0.75 | 0.3 | 26.9 | 1230 | 1309 |
| 75 | 6.37 | 0.4 | 0.576 | 0.375 | 0.07 | −0.5 | 0.305 | 27.7 | 1230 | 1318 |
| 76 | 6.37 | 0.4 | 0.600 | 0.375 | 0.07 | −0.5 | 0.305 | 26.5 | 1184 | 1318 |
| 77 | 6.37 | 0.4 | 0.700 | 0.35 | 0.05 | −0.7 | 0.3 | 22.8 | 1073 | 1312 |
| 78 | 6.38 | 0.4 | 0.619 | 0.35 | 0.05 | −0.7 | 0.3 | 25.8 | 1200 | 1311 |
| 79 | 6.38 | 0.4 | 0.600 | 0.35 | 0.05 | −0.7 | 0.3 | 26.6 | 1238 | 1311 |
| 80 | 6.40 | 0.4 | 0.700 | 0.35 | 0.05 | −0.75 | 0.3 | 22.9 | 1078 | 1311 |

Fig.7B

| | CORE OPTICAL CHARACTERISTICS | | | | | | |
|---|---|---|---|---|---|---|---|
| | S0 | MFD | CD | Macrobend loss at 1310nm | | | |
| | | at 1310nm | at 1310nm | R=7.5mm | R=5mm | R=4mm | R=3mm |
| # ＼ Unit | [ps/ (nm$^2$·km)] | [μm] | [ps/ (nm·km)] | [dB/turn] | [dB/turn] | [dB/turn] | [dB/turn] |
| 41 | 0.094 | 8.6 | −0.7 | 3.1E−3 | 7.8E−3 | 1.7E−2 | 5.9E−2 |
| 42 | 0.095 | 8.6 | −0.7 | 3.9E−3 | 9.7E−3 | 2.0E−2 | 6.6E−2 |
| 43 | 0.094 | 8.6 | −0.7 | 5.6E−2 | 1.2E−1 | 1.8E−1 | 4.1E−1 |
| 44 | 0.094 | 8.6 | −0.7 | 5.5E−2 | 1.2E−1 | 1.8E−1 | 4.0E−1 |
| 45 | 0.095 | 8.6 | −0.7 | 3.6E−3 | 9.1E−3 | 1.9E−2 | 6.2E−2 |
| 46 | 0.097 | 8.6 | −0.5 | 2.8E−3 | 9.7E−3 | 1.9E−2 | 5.1E−2 |
| 47 | 0.095 | 8.6 | −0.7 | 4.5E−2 | 9.8E−2 | 1.6E−1 | 3.6E−1 |
| 48 | 0.095 | 8.6 | −0.6 | 3.5E−3 | 8.9E−3 | 1.9E−2 | 5.9E−2 |
| 49 | 0.095 | 8.6 | −0.7 | 3.7E−2 | 8.3E−2 | 1.4E−1 | 3.2E−1 |
| 50 | 0.095 | 8.6 | −0.6 | 3.3E−3 | 8.7E−3 | 1.8E−2 | 5.6E−2 |
| 51 | 0.095 | 8.6 | −0.7 | 3.1E−2 | 7.1E−2 | 1.2E−1 | 2.9E−1 |
| 52 | 0.095 | 8.6 | −0.6 | 3.0E−3 | 8.1E−3 | 1.7E−2 | 5.2E−2 |
| 53 | 0.095 | 8.6 | −0.7 | 2.5E−2 | 6.0E−2 | 1.1E−1 | 2.6E−1 |
| 54 | 0.095 | 8.6 | −0.6 | 4.1E−3 | 1.1E−2 | 2.3E−2 | 6.7E−2 |
| 55 | 0.095 | 8.6 | −0.7 | 2.0E−2 | 5.1E−2 | 9.8E−2 | 2.3E−1 |
| 56 | 0.095 | 8.6 | −0.6 | 3.1E−3 | 9.4E−3 | 1.9E−2 | 5.6E−2 |
| 57 | 0.095 | 8.6 | −0.7 | 1.5E−2 | 4.5E−2 | 8.6E−2 | 2.1E−1 |
| 58 | 0.095 | 8.6 | −0.6 | 5.5E−3 | 1.8E−2 | 3.5E−2 | 9.6E−2 |
| 59 | 0.095 | 8.6 | −0.7 | 1.1E−2 | 3.9E−2 | 7.5E−2 | 1.8E−1 |
| 60 | 0.095 | 8.6 | −0.3 | 1.9E−2 | 4.0E−2 | 6.3E−2 | 1.4E−1 |
| 61 | 0.096 | 8.6 | −0.3 | 3.8E−3 | 8.8E−3 | 1.6E−2 | 4.3E−2 |
| 62 | 0.095 | 8.6 | −0.8 | 3.2E−2 | 2.2E−1 | 4.3E−1 | 1.0E+0 |
| 63 | 0.095 | 8.6 | −0.7 | 4.1E−3 | 2.3E−2 | 4.6E−2 | 1.3E−1 |
| 64 | 0.095 | 8.6 | −0.4 | 9.0E−2 | 2.3E−1 | 3.9E−1 | 7.6E−1 |
| 65 | 0.096 | 8.6 | −0.4 | 7.3E−3 | 1.9E−2 | 3.7E−2 | 8.6E−2 |
| 66 | 0.097 | 8.6 | 0.0 | 2.1E−2 | 8.2E−2 | 1.5E−1 | 3.0E−1 |
| 67 | 0.096 | 8.6 | −0.3 | 2.4E−3 | 7.0E−3 | 1.3E−2 | 3.5E−2 |
| 68 | 0.097 | 8.6 | 0.0 | 3.7E−3 | 1.4E−2 | 2.6E−2 | 5.7E−2 |
| 69 | 0.096 | 8.6 | −0.1 | 5.4E−3 | 1.2E−2 | 2.1E−2 | 5.1E−2 |
| 70 | 0.096 | 8.6 | −0.1 | 1.3E−1 | 2.5E−1 | 3.4E−1 | 6.2E−1 |
| 71 | 0.096 | 8.6 | 0.0 | 7.7E−3 | 1.6E−2 | 2.5E−2 | 5.7E−2 |
| 72 | 0.096 | 8.6 | 0.0 | 9.6E−2 | 1.9E−1 | 2.6E−1 | 4.6E−1 |
| 73 | 0.096 | 8.6 | 0.1 | 5.1E−3 | 1.1E−2 | 1.7E−2 | 3.8E−2 |
| 74 | 0.096 | 8.6 | 0.1 | 3.9E−3 | 8.3E−3 | 1.4E−2 | 3.1E−2 |
| 75 | 0.094 | 8.6 | −0.7 | 4.1E−3 | 1.6E−2 | 3.2E−2 | 8.7E−2 |
| 76 | 0.094 | 8.6 | −0.7 | 7.6E−3 | 3.1E−2 | 6.0E−2 | 1.6E−1 |
| 77 | 0.096 | 8.6 | −0.2 | 5.0E−2 | 1.3E−1 | 2.2E−1 | 4.3E−1 |
| 78 | 0.096 | 8.6 | −0.1 | 5.6E−3 | 1.5E−2 | 2.8E−2 | 6.3E−2 |
| 79 | 0.096 | 8.6 | −0.1 | 3.1E−3 | 8.3E−3 | 1.6E−2 | 3.6E−2 |
| 80 | 0.096 | 8.6 | −0.1 | 3.8E−2 | 1.0E−1 | 1.7E−1 | 3.3E−1 |

Fig.8A

| | CORE REFRACTIVE INDEX PROFILE | | | | | | | | CORE OPTICAL CHARACTERISTICS | |
|---|---|---|---|---|---|---|---|---|---|---|
| | 2a | a/b | b/c | Δ1 | Δ2 | Δ3 | Δ1−Δ2 | 2c | λcc | λ0 |
| # ＼ Unit | [μm] | | | [%] | [%] | [%] | [%] | [μm] | [nm] | [nm] |
| 81 | 6.41 | 0.4 | 0.617 | 0.35 | 0.05 | −0.75 | 0.3 | 26.0 | 1230 | 1311 |
| 82 | 6.42 | 0.4 | 0.600 | 0.31 | 0 | −0.5 | 0.31 | 26.7 | 1099 | 1317 |
| 83 | 6.42 | 0.4 | 0.540 | 0.31 | 0 | −0.5 | 0.31 | 29.7 | 1230 | 1316 |
| 84 | 6.47 | 0.4 | 0.600 | 0.36 | 0.05 | −0.75 | 0.31 | 27.0 | 1171 | 1318 |
| 85 | 6.47 | 0.4 | 0.600 | 0.36 | 0.05 | −0.5 | 0.31 | 27.0 | 1162 | 1317 |
| 86 | 6.48 | 0.4 | 0.558 | 0.36 | 0.05 | −0.5 | 0.31 | 29.0 | 1230 | 1316 |
| 87 | 6.52 | 0.4 | 0.651 | 0.375 | 0.07 | −0.75 | 0.305 | 25.1 | 1230 | 1312 |
| 88 | 6.52 | 0.4 | 0.700 | 0.375 | 0.07 | −0.75 | 0.305 | 23.3 | 1147 | 1312 |
| 89 | 6.53 | 0.425 | 0.600 | 0.35 | 0.05 | −0.5 | 0.3 | 25.6 | 1133 | 1309 |
| 90 | 6.54 | 0.425 | 0.550 | 0.35 | 0.05 | −0.5 | 0.3 | 28.0 | 1230 | 1309 |
| 91 | 6.54 | 0.42 | 0.700 | 0.35 | 0.05 | −0.6 | 0.3 | 22.3 | 1055 | 1308 |
| 92 | 6.56 | 0.42 | 0.600 | 0.35 | 0.05 | −0.6 | 0.3 | 26.0 | 1181 | 1308 |
| 93 | 6.57 | 0.42 | 0.573 | 0.35 | 0.05 | −0.6 | 0.3 | 27.3 | 1230 | 1307 |
| 94 | 6.57 | 0.42 | 0.576 | 0.3 | 0 | −0.7 | 0.3 | 27.2 | 1230 | 1304 |
| 95 | 6.57 | 0.42 | 0.700 | 0.3 | 0 | −0.7 | 0.3 | 22.4 | 989 | 1305 |
| 96 | 6.58 | 0.42 | 0.600 | 0.3 | 0 | −0.7 | 0.3 | 26.1 | 1186 | 1304 |
| 97 | 6.60 | 0.4 | 0.700 | 0.375 | 0.06 | −0.5 | 0.315 | 23.6 | 1110 | 1318 |
| 98 | 6.60 | 0.42 | 0.700 | 0.3 | 0 | −0.75 | 0.3 | 22.5 | 1048 | 1304 |
| 99 | 6.61 | 0.4 | 0.600 | 0.375 | 0.06 | −0.5 | 0.315 | 27.5 | 1219 | 1318 |
| 100 | 6.61 | 0.42 | 0.637 | 0.3 | 0 | −0.75 | 0.3 | 24.7 | 1230 | 1303 |
| 101 | 6.61 | 0.42 | 0.700 | 0.35 | 0.05 | −0.7 | 0.3 | 22.5 | 1086 | 1306 |
| 102 | 6.61 | 0.42 | 0.600 | 0.3 | 0 | −0.6 | 0.3 | 26.2 | 1118 | 1307 |
| 103 | 6.61 | 0.4 | 0.586 | 0.375 | 0.06 | −0.5 | 0.315 | 28.2 | 1230 | 1317 |
| 104 | 6.61 | 0.42 | 0.550 | 0.3 | 0 | −0.6 | 0.3 | 28.6 | 1230 | 1307 |
| 105 | 6.62 | 0.42 | 0.613 | 0.35 | 0.05 | −0.7 | 0.3 | 25.7 | 1230 | 1305 |
| 106 | 6.63 | 0.42 | 0.600 | 0.35 | 0.05 | −0.7 | 0.3 | 26.3 | 1257 | 1305 |
| 107 | 6.64 | 0.42 | 0.700 | 0.35 | 0.05 | −0.75 | 0.3 | 22.6 | 1110 | 1304 |
| 108 | 6.64 | 0.42 | 0.651 | 0.35 | 0.05 | −0.75 | 0.3 | 24.3 | 1230 | 1304 |
| 109 | 6.67 | 0.4 | 0.600 | 0.32 | 0 | −0.5 | 0.32 | 27.8 | 1143 | 1307 |
| 110 | 6.67 | 0.4 | 0.561 | 0.32 | 0 | −0.5 | 0.32 | 29.7 | 1230 | 1306 |
| 111 | 6.67 | 0.4 | 0.600 | 0.32 | 0 | −0.75 | 0.32 | 27.8 | 1132 | 1318 |
| 112 | 6.71 | 0.4 | 0.700 | 0.37 | 0.05 | −0.5 | 0.32 | 24.0 | 1157 | 1308 |
| 113 | 6.72 | 0.4 | 0.600 | 0.37 | 0.05 | −0.5 | 0.32 | 28.0 | 1212 | 1307 |
| 114 | 6.72 | 0.4 | 0.578 | 0.37 | 0.05 | −0.5 | 0.32 | 29.1 | 1230 | 1307 |
| 115 | 6.73 | 0.4 | 0.676 | 0.375 | 0.06 | −0.75 | 0.315 | 24.9 | 1230 | 1313 |
| 116 | 6.73 | 0.4 | 0.700 | 0.375 | 0.06 | −0.75 | 0.315 | 24.0 | 1171 | 1313 |
| 117 | 6.80 | 0.45 | 0.600 | 0.35 | 0.05 | −0.5 | 0.3 | 25.2 | 1153 | 1302 |
| 118 | 6.80 | 0.45 | 0.542 | 0.35 | 0.05 | −0.5 | 0.3 | 27.9 | 1230 | 1302 |
| 119 | 6.84 | 0.4 | 0.700 | 0.375 | 0.05 | −0.5 | 0.325 | 24.4 | 1130 | 1318 |
| 120 | 6.85 | 0.4 | 0.600 | 0.375 | 0.05 | −0.5 | 0.325 | 28.5 | 1249 | 1318 |

Fig.8B

| | CORE OPTICAL CHARACTERISTICS | | | | | | |
|---|---|---|---|---|---|---|---|
| | S0 | MFD | CD | Macrobend loss at 1310nm | | | |
| | | at 1310nm | at 1310nm | R=7.5mm | R=5mm | R=4mm | R=3mm |
| # ╲ Unit | [ps/ (nm$^2$·km)] | [μm] | [ps/ (nm·km)] | [dB/turn] | [dB/turn] | [dB/turn] | [dB/turn] |
| 81 | 0.096 | 8.6 | −0.1 | 3.6E−3 | 9.8E−3 | 1.8E−2 | 4.0E−2 |
| 82 | 0.094 | 8.7 | −0.6 | 3.3E−2 | 7.5E−2 | 1.3E−1 | 3.3E−1 |
| 83 | 0.094 | 8.7 | −0.6 | 5.6E−3 | 1.5E−2 | 3.1E−2 | 9.8E−2 |
| 84 | 0.093 | 8.6 | −0.8 | 9.4E−3 | 3.1E−2 | 6.2E−2 | 1.6E−1 |
| 85 | 0.094 | 8.7 | −0.6 | 1.2E−2 | 3.6E−2 | 7.2E−2 | 1.9E−1 |
| 86 | 0.094 | 8.7 | −0.6 | 3.4E−3 | 1.1E−2 | 2.4E−2 | 7.2E−2 |
| 87 | 0.095 | 8.6 | −0.2 | 3.7E−3 | 1.5E−2 | 2.9E−2 | 6.6E−2 |
| 88 | 0.095 | 8.6 | −0.2 | 1.4E−2 | 5.9E−2 | 1.1E−1 | 2.3E−1 |
| 89 | 0.095 | 8.6 | 0.1 | 1.7E−2 | 4.9E−2 | 9.2E−2 | 2.1E−1 |
| 90 | 0.095 | 8.6 | 0.1 | 4.0E−3 | 1.3E−2 | 2.5E−2 | 6.8E−2 |
| 91 | 0.095 | 8.6 | 0.2 | 7.5E−2 | 2.1E−1 | 3.7E−1 | 7.0E−1 |
| 92 | 0.096 | 8.6 | 0.2 | 6.4E−3 | 1.8E−2 | 3.5E−2 | 7.9E−2 |
| 93 | 0.096 | 8.6 | 0.2 | 2.7E−3 | 8.4E−3 | 1.6E−2 | 4.0E−2 |
| 94 | 0.096 | 8.6 | 0.5 | 5.5E−3 | 1.2E−2 | 2.1E−2 | 5.0E−2 |
| 95 | 0.096 | 8.6 | 0.5 | 1.1E−1 | 2.3E−1 | 3.1E−1 | 5.5E−1 |
| 96 | 0.096 | 8.6 | 0.6 | 7.2E−3 | 1.5E−2 | 2.4E−2 | 5.2E−2 |
| 97 | 0.092 | 8.6 | −0.8 | 4.3E−2 | 2.0E−1 | 3.9E−1 | 8.9E−1 |
| 98 | 0.096 | 8.6 | 0.6 | 8.2E−2 | 1.6E−1 | 2.2E−1 | 4.0E−1 |
| 99 | 0.093 | 8.6 | −0.7 | 4.3E−3 | 1.9E−2 | 3.8E−2 | 1.1E−1 |
| 100 | 0.096 | 8.6 | 0.7 | 1.5E−2 | 3.1E−2 | 4.7E−2 | 9.4E−2 |
| 101 | 0.096 | 8.6 | 0.4 | 3.9E−2 | 1.1E−1 | 1.9E−1 | 3.7E−1 |
| 102 | 0.095 | 8.6 | 0.3 | 1.7E−2 | 3.7E−2 | 5.8E−2 | 1.3E−1 |
| 103 | 0.093 | 8.6 | −0.7 | 3.0E−3 | 1.3E−2 | 2.6E−2 | 7.7E−2 |
| 104 | 0.096 | 8.6 | 0.3 | 3.8E−3 | 8.9E−3 | 1.6E−2 | 4.1E−2 |
| 105 | 0.096 | 8.6 | 0.5 | 3.9E−3 | 1.2E−2 | 2.1E−2 | 4.7E−2 |
| 106 | 0.096 | 8.6 | 0.5 | 2.6E−3 | 7.7E−3 | 1.4E−2 | 3.2E−2 |
| 107 | 0.096 | 8.6 | 0.5 | 2.9E−2 | 8.4E−2 | 1.5E−1 | 2.8E−1 |
| 108 | 0.097 | 8.6 | 0.6 | 8.2E−3 | 2.4E−2 | 4.2E−2 | 8.7E−2 |
| 109 | 0.095 | 8.6 | 0.3 | 1.3E−2 | 2.8E−2 | 4.7E−2 | 1.1E−1 |
| 110 | 0.095 | 8.6 | 0.3 | 3.8E−3 | 9.2E−3 | 1.7E−2 | 4.4E−2 |
| 111 | 0.092 | 8.6 | −0.7 | 1.3E−2 | 3.4E−2 | 6.8E−2 | 1.9E−1 |
| 112 | 0.095 | 8.6 | 0.2 | 5.6E−2 | 1.7E−1 | 3.1E−1 | 6.3E−1 |
| 113 | 0.095 | 8.6 | 0.3 | 4.5E−3 | 1.4E−2 | 2.7E−2 | 6.6E−2 |
| 114 | 0.095 | 8.6 | 0.3 | 2.3E−3 | 7.6E−3 | 1.5E−2 | 3.9E−2 |
| 115 | 0.094 | 8.6 | −0.3 | 4.7E−3 | 2.2E−2 | 4.1E−2 | 9.7E−2 |
| 116 | 0.094 | 8.6 | −0.3 | 8.8E−3 | 4.1E−2 | 7.7E−2 | 1.8E−1 |
| 117 | 0.095 | 8.6 | 0.7 | 1.5E−2 | 4.6E−2 | 8.7E−2 | 1.9E−1 |
| 118 | 0.096 | 8.6 | 0.8 | 2.9E−3 | 1.0E−2 | 1.9E−2 | 5.2E−2 |
| 119 | 0.091 | 8.6 | −0.7 | 2.8E−2 | 1.4E−1 | 2.8E−1 | 7.0E−1 |
| 120 | 0.091 | 8.6 | −0.7 | 2.6E−3 | 1.2E−2 | 2.5E−2 | 7.9E−2 |

Fig.9A

| | CORE REFRACTIVE INDEX PROFILE | | | | | | | | CORE OPTICAL CHARACTERISTICS | |
|---|---|---|---|---|---|---|---|---|---|---|
| | 2a | a/b | b/c | Δ1 | Δ2 | Δ3 | Δ1−Δ2 | 2c | λcc | λ0 |
| # ＼ Unit | [μm] | | | [%] | [%] | [%] | [%] | [μm] | [nm] | [nm] |
| 121 | 6.85 | 0.4 | 0.610 | 0.375 | 0.05 | −0.5 | 0.325 | 28.1 | 1230 | 1318 |
| 122 | 6.91 | 0.4 | 0.700 | 0.33 | 0 | −0.5 | 0.33 | 24.7 | 1030 | 1304 |
| 123 | 6.92 | 0.4 | 0.607 | 0.33 | 0 | −0.5 | 0.33 | 28.5 | 1230 | 1304 |
| 124 | 6.92 | 0.4 | 0.600 | 0.33 | 0 | −0.5 | 0.33 | 28.8 | 1245 | 1304 |
| 125 | 6.94 | 0.4 | 0.700 | 0.375 | 0.05 | −0.75 | 0.325 | 24.8 | 1230 | 1313 |
| 126 | 6.94 | 0.4 | 0.700 | 0.375 | 0.05 | −0.75 | 0.325 | 24.8 | 1193 | 1313 |
| 127 | 6.95 | 0.4 | 0.700 | 0.38 | 0.05 | −0.5 | 0.33 | 24.8 | 1170 | 1305 |
| 128 | 6.96 | 0.4 | 0.652 | 0.38 | 0.05 | −0.5 | 0.33 | 26.7 | 1230 | 1305 |
| 129 | 6.96 | 0.4 | 0.700 | 0.38 | 0.05 | −0.75 | 0.33 | 24.9 | 1182 | 1317 |
| 130 | 7.08 | 0.4 | 0.700 | 0.375 | 0.04 | −0.5 | 0.335 | 25.3 | 1166 | 1316 |
| 131 | 7.08 | 0.4 | 0.639 | 0.375 | 0.04 | −0.5 | 0.335 | 27.7 | 1230 | 1316 |
| 132 | 7.15 | 0.4 | 0.800 | 0.375 | 0.04 | −0.75 | 0.335 | 22.3 | 1143 | 1313 |
| 133 | 7.15 | 0.4 | 0.725 | 0.375 | 0.04 | −0.75 | 0.335 | 24.7 | 1230 | 1312 |
| 134 | 7.15 | 0.4 | 0.700 | 0.34 | 0 | −0.5 | 0.34 | 25.5 | 1076 | 1310 |
| 135 | 7.16 | 0.4 | 0.617 | 0.34 | 0 | −0.5 | 0.34 | 29.0 | 1230 | 1310 |
| 136 | 7.17 | 0.4 | 0.700 | 0.34 | 0 | −0.75 | 0.34 | 25.6 | 1091 | 1314 |
| 137 | 7.17 | 0.4 | 0.600 | 0.34 | 0 | −0.75 | 0.34 | 29.9 | 1253 | 1314 |
| 138 | 7.19 | 0.4 | 0.700 | 0.39 | 0.05 | −0.5 | 0.34 | 25.7 | 1174 | 1311 |
| 139 | 7.19 | 0.4 | 0.661 | 0.39 | 0.05 | −0.5 | 0.34 | 27.2 | 1230 | 1311 |
| 140 | 7.30 | 0.4 | 0.671 | 0.375 | 0.03 | −0.5 | 0.345 | 27.2 | 1230 | 1314 |
| 141 | 7.30 | 0.4 | 0.700 | 0.375 | 0.03 | −0.5 | 0.345 | 26.1 | 1199 | 1313 |
| 142 | 7.35 | 0.4 | 0.700 | 0.3 | −0.05 | −0.5 | 0.35 | 26.2 | 1046 | 1312 |
| 143 | 7.35 | 0.4 | 0.700 | 0.3 | −0.05 | −0.5 | 0.35 | 26.2 | 1046 | 1312 |
| 144 | 7.35 | 0.4 | 0.600 | 0.3 | −0.05 | −0.5 | 0.35 | 30.6 | 1221 | 1312 |
| 145 | 7.35 | 0.4 | 0.600 | 0.3 | −0.05 | −0.5 | 0.35 | 30.6 | 1221 | 1312 |
| 146 | 7.35 | 0.4 | 0.591 | 0.3 | −0.05 | −0.5 | 0.35 | 31.1 | 1230 | 1311 |
| 147 | 7.35 | 0.4 | 0.800 | 0.375 | 0.03 | −0.75 | 0.345 | 23.0 | 1178 | 1310 |
| 148 | 7.36 | 0.4 | 0.733 | 0.375 | 0.03 | −0.75 | 0.345 | 25.1 | 1230 | 1310 |
| 149 | 7.36 | 0.4 | 0.700 | 0.31 | −0.04 | −0.5 | 0.35 | 26.3 | 1083 | 1312 |
| 150 | 7.36 | 0.4 | 0.600 | 0.31 | −0.04 | −0.5 | 0.35 | 30.7 | 1229 | 1312 |
| 151 | 7.36 | 0.4 | 0.700 | 0.375 | 0.03 | −0.75 | 0.345 | 26.3 | 1239 | 1310 |
| 152 | 7.36 | 0.4 | 0.599 | 0.31 | −0.04 | −0.5 | 0.35 | 30.7 | 1230 | 1311 |
| 153 | 7.37 | 0.4 | 0.700 | 0.32 | −0.03 | −0.5 | 0.35 | 26.3 | 1088 | 1312 |
| 154 | 7.37 | 0.4 | 0.600 | 0.32 | −0.03 | −0.5 | 0.35 | 30.7 | 1243 | 1312 |
| 155 | 7.37 | 0.4 | 0.603 | 0.32 | −0.03 | −0.5 | 0.35 | 30.5 | 1230 | 1311 |
| 156 | 7.37 | 0.4 | 0.632 | 0.33 | −0.02 | −0.5 | 0.35 | 29.2 | 1230 | 1312 |
| 157 | 7.37 | 0.4 | 0.700 | 0.33 | −0.02 | −0.5 | 0.35 | 26.3 | 1099 | 1312 |
| 158 | 7.38 | 0.4 | 0.700 | 0.35 | 0 | −0.5 | 0.35 | 26.4 | 1130 | 1307 |
| 159 | 7.38 | 0.4 | 0.700 | 0.34 | −0.01 | −0.5 | 0.35 | 26.4 | 1114 | 1312 |
| 160 | 7.38 | 0.4 | 0.660 | 0.35 | 0 | −0.5 | 0.35 | 28.0 | 1230 | 1307 |

*Fig.9B*

| | CORE OPTICAL CHARACTERISTICS | | | | | | |
|---|---|---|---|---|---|---|---|
| | S0 | MFD | CD | Macrobend loss at 1310nm | | | |
| | | at 1310nm | at 1310nm | R=7.5mm | R=5mm | R=4mm | R=3mm |
| # ＼ Unit | [ps/ ($nm^2$·km)] | [μm] | [ps/ (nm·km)] | [dB/turn] | [dB/turn] | [dB/turn] | [dB/turn] |
| 121 | 0.091 | 8.6 | −0.7 | 3.4E−3 | 1.6E−2 | 3.3E−2 | 1.0E−1 |
| 122 | 0.095 | 8.7 | 0.5 | 6.4E−2 | 1.4E−1 | 2.0E−1 | 4.0E−1 |
| 123 | 0.095 | 8.7 | 0.6 | 6.1E−3 | 1.4E−2 | 2.5E−2 | 6.1E−2 |
| 124 | 0.095 | 8.7 | 0.6 | 3.6E−3 | 8.1E−3 | 1.5E−2 | 3.5E−2 |
| 125 | 0.093 | 8.6 | −0.3 | 5.7E−3 | 2.9E−2 | 5.6E−2 | 1.4E−1 |
| 126 | 0.093 | 8.6 | −0.2 | 5.9E−3 | 2.9E−2 | 5.6E−2 | 1.4E−1 |
| 127 | 0.095 | 8.7 | 0.5 | 2.0E−2 | 7.1E−2 | 1.3E−1 | 2.8E−1 |
| 128 | 0.095 | 8.7 | 0.5 | 5.8E−3 | 2.1E−2 | 3.9E−2 | 8.8E−2 |
| 129 | 0.091 | 8.6 | −0.6 | 1.8E−2 | 1.0E−1 | 2.1E−1 | 5.7E−1 |
| 130 | 0.090 | 8.6 | −0.5 | 1.7E−2 | 9.5E−2 | 1.9E−1 | 5.2E−1 |
| 131 | 0.090 | 8.6 | −0.5 | 4.2E−3 | 2.2E−2 | 4.6E−2 | 1.4E−1 |
| 132 | 0.091 | 8.6 | −0.2 | 3.5E−2 | 2.1E−1 | 4.2E−1 | 9.8E−1 |
| 133 | 0.091 | 8.6 | −0.2 | 6.8E−3 | 3.7E−2 | 7.3E−2 | 1.9E−1 |
| 134 | 0.093 | 8.9 | 0.0 | 5.4E−2 | 1.3E−1 | 2.3E−1 | 5.5E−1 |
| 135 | 0.093 | 8.9 | 0.0 | 5.3E−3 | 1.5E−2 | 3.0E−2 | 9.1E−2 |
| 136 | 0.090 | 8.6 | −0.4 | 3.9E−2 | 1.2E−1 | 2.4E−1 | 6.3E−1 |
| 137 | 0.090 | 8.6 | −0.4 | 2.9E−3 | 1.0E−2 | 2.2E−2 | 7.6E−2 |
| 138 | 0.093 | 8.9 | −0.1 | 1.7E−2 | 7.5E−2 | 1.5E−1 | 3.8E−1 |
| 139 | 0.093 | 8.9 | −0.1 | 6.3E−3 | 2.7E−2 | 5.4E−2 | 1.5E−1 |
| 140 | 0.089 | 8.6 | −0.3 | 5.8E−3 | 3.3E−2 | 7.2E−2 | 2.3E−1 |
| 141 | 0.089 | 8.6 | −0.3 | 1.2E−2 | 6.8E−2 | 1.4E−1 | 4.2E−1 |
| 142 | 0.088 | 8.6 | −0.2 | 5.8E−2 | 1.4E−1 | 2.7E−1 | 7.3E−1 |
| 143 | 0.088 | 8.6 | −0.2 | 5.8E−2 | 1.4E−1 | 2.7E−1 | 7.3E−1 |
| 144 | 0.088 | 8.6 | −0.2 | 4.1E−3 | 1.2E−2 | 2.8E−2 | 1.0E−1 |
| 145 | 0.088 | 8.6 | −0.2 | 4.1E−3 | 1.2E−2 | 2.8E−2 | 1.0E−1 |
| 146 | 0.089 | 8.6 | −0.1 | 3.1E−3 | 9.0E−3 | 2.2E−2 | 8.4E−2 |
| 147 | 0.090 | 8.6 | 0.0 | 2.5E−2 | 1.6E−1 | 3.2E−1 | 8.2E−1 |
| 148 | 0.091 | 8.6 | 0.0 | 5.7E−3 | 3.3E−2 | 6.7E−2 | 1.8E−1 |
| 149 | 0.088 | 8.6 | −0.2 | 5.0E−2 | 1.3E−1 | 2.5E−1 | 6.7E−1 |
| 150 | 0.089 | 8.6 | −0.1 | 3.5E−3 | 1.1E−2 | 2.5E−2 | 9.2E−2 |
| 151 | 0.091 | 8.6 | 0.0 | 2.6E−3 | 1.4E−2 | 2.8E−2 | 7.8E−2 |
| 152 | 0.089 | 8.6 | −0.1 | 3.4E−3 | 1.0E−2 | 2.4E−2 | 9.0E−2 |
| 153 | 0.089 | 8.6 | −0.2 | 4.1E−2 | 1.1E−1 | 2.3E−1 | 6.2E−1 |
| 154 | 0.089 | 8.6 | −0.1 | 2.9E−3 | 9.4E−3 | 2.1E−2 | 8.1E−2 |
| 155 | 0.089 | 8.6 | −0.1 | 3.2E−3 | 1.0E−2 | 2.4E−2 | 8.7E−2 |
| 156 | 0.089 | 8.6 | −0.2 | 5.9E−3 | 2.0E−2 | 4.3E−2 | 1.5E−1 |
| 157 | 0.089 | 8.6 | −0.2 | 3.3E−2 | 1.0E−1 | 2.1E−1 | 5.7E−1 |
| 158 | 0.093 | 9.0 | 0.3 | 2.3E−2 | 5.6E−2 | 1.1E−1 | 2.7E−1 |
| 159 | 0.089 | 8.6 | −0.1 | 2.6E−2 | 8.9E−2 | 1.8E−1 | 5.2E−1 |
| 160 | 0.093 | 9.0 | 0.3 | 6.9E−3 | 1.8E−2 | 3.6E−2 | 9.4E−2 |

Fig.10A

| | CORE REFRACTIVE INDEX PROFILE | | | | | | | | CORE OPTICAL CHARACTERISTICS | |
|---|---|---|---|---|---|---|---|---|---|---|
| | 2a | a/b | b/c | Δ1 | Δ2 | Δ3 | Δ1−Δ2 | 2c | λcc | λ0 |
| # ＼ Unit | [μm] | | | [%] | [%] | [%] | [%] | [μm] | [nm] | [nm] |
| 161 | 7.39 | 0.4 | 0.622 | 0.34 | −0.01 | −0.5 | 0.35 | 29.7 | 1230 | 1311 |
| 162 | 7.39 | 0.4 | 0.634 | 0.35 | 0 | −0.5 | 0.35 | 29.1 | 1230 | 1312 |
| 163 | 7.39 | 0.4 | 0.700 | 0.35 | 0 | −0.5 | 0.35 | 26.4 | 1134 | 1312 |
| 164 | 7.40 | 0.4 | 0.651 | 0.36 | 0.01 | −0.5 | 0.35 | 28.4 | 1230 | 1312 |
| 165 | 7.40 | 0.4 | 0.700 | 0.36 | 0.01 | −0.5 | 0.35 | 26.4 | 1163 | 1312 |
| 166 | 7.40 | 0.4 | 0.675 | 0.37 | 0.02 | −0.5 | 0.35 | 27.4 | 1230 | 1312 |
| 167 | 7.40 | 0.4 | 0.668 | 0.4 | 0.05 | −0.5 | 0.35 | 27.7 | 1230 | 1309 |
| 168 | 7.40 | 0.4 | 0.700 | 0.37 | 0.02 | −0.5 | 0.35 | 26.4 | 1192 | 1312 |
| 169 | 7.41 | 0.4 | 0.704 | 0.38 | 0.03 | −0.5 | 0.35 | 26.3 | 1230 | 1313 |
| 170 | 7.41 | 0.4 | 0.700 | 0.38 | 0.03 | −0.5 | 0.35 | 26.5 | 1221 | 1312 |
| 171 | 7.41 | 0.4 | 0.800 | 0.4 | 0.05 | −0.75 | 0.35 | 23.2 | 1237 | 1314 |
| 172 | 7.41 | 0.4 | 0.800 | 0.4 | 0.05 | −0.5 | 0.35 | 23.2 | 1231 | 1314 |
| 173 | 7.41 | 0.4 | 0.796 | 0.4 | 0.05 | −0.5 | 0.35 | 23.3 | 1230 | 1313 |
| 174 | 7.51 | 0.4 | 0.689 | 0.375 | 0.02 | −0.5 | 0.355 | 27.2 | 1230 | 1311 |
| 175 | 7.51 | 0.4 | 0.700 | 0.375 | 0.02 | −0.5 | 0.355 | 26.8 | 1205 | 1310 |
| 176 | 7.55 | 0.4 | 0.800 | 0.375 | 0.02 | −0.75 | 0.355 | 23.6 | 1179 | 1308 |
| 177 | 7.55 | 0.4 | 0.747 | 0.375 | 0.02 | −0.75 | 0.355 | 25.3 | 1230 | 1308 |
| 178 | 7.60 | 0.4 | 0.700 | 0.36 | 0 | −0.75 | 0.36 | 27.1 | 1179 | 1308 |
| 179 | 7.70 | 0.4 | 0.800 | 0.375 | 0.01 | −0.5 | 0.365 | 24.1 | 1180 | 1307 |
| 180 | 7.70 | 0.4 | 0.720 | 0.375 | 0.01 | −0.5 | 0.365 | 26.7 | 1230 | 1307 |
| 181 | 7.70 | 0.4 | 0.700 | 0.375 | 0.01 | −0.5 | 0.365 | 27.5 | 1236 | 1307 |
| 182 | 7.73 | 0.4 | 0.800 | 0.375 | 0.01 | −0.75 | 0.365 | 24.2 | 1209 | 1305 |
| 183 | 7.74 | 0.4 | 0.766 | 0.375 | 0.01 | −0.75 | 0.365 | 25.3 | 1230 | 1305 |
| 184 | 7.76 | 0.4 | 0.700 | 0.32 | −0.05 | −0.5 | 0.37 | 27.7 | 1135 | 1305 |
| 185 | 7.83 | 0.4 | 0.700 | 0.3 | 0 | −0.75 | 0.3 | 28.0 | 1227 | 1304 |
| 186 | 7.83 | 0.4 | 0.699 | 0.3 | 0 | −0.75 | 0.3 | 28.0 | 1230 | 1304 |
| 187 | 7.86 | 0.4 | 0.753 | 0.35 | 0.05 | −0.75 | 0.3 | 26.1 | 1230 | 1305 |
| 188 | 7.88 | 0.4 | 0.800 | 0.375 | 0 | −0.5 | 0.375 | 24.6 | 1187 | 1304 |
| 189 | 7.88 | 0.4 | 0.732 | 0.375 | 0 | −0.5 | 0.375 | 26.9 | 1230 | 1304 |
| 190 | 7.88 | 0.4 | 0.700 | 0.375 | 0 | −0.5 | 0.375 | 28.2 | 1244 | 1304 |
| 191 | 7.91 | 0.4 | 0.816 | 0.375 | 0 | −0.75 | 0.375 | 24.2 | 1230 | 1302 |
| 192 | 7.97 | 0.4 | 0.800 | 0.38 | 0 | −0.75 | 0.38 | 24.9 | 1214 | 1303 |
| 193 | 8.00 | 0.42 | 0.752 | 0.35 | 0.05 | −0.75 | 0.3 | 25.3 | 1230 | 1300 |
| 194 | 8.04 | 0.4 | 0.800 | 0.375 | −0.01 | −0.5 | 0.385 | 25.1 | 1237 | 1301 |
| 195 | 8.05 | 0.4 | 0.778 | 0.375 | −0.01 | −0.5 | 0.385 | 25.9 | 1230 | 1301 |

Fig.10B

| | CORE OPTICAL CHARACTERISTICS | | | | | | |
|---|---|---|---|---|---|---|---|
| | S0 | MFD | CD | Macrobend loss at 1310nm | | | |
| | | at 1310nm | at 1310nm | R=7.5mm | R=5mm | R=4mm | R=3mm |
| # ＼ Unit | [ps/(nm²·km)] | [μm] | [psv/(nm·km)] | [dB/turn] | [dB/turn] | [dB/turn] | [dB/turn] |
| 161 | 0.089 | 8.6 | −0.1 | 3.5E−3 | 1.3E−2 | 2.9E−2 | 1.0E−1 |
| 162 | 0.089 | 8.6 | −0.1 | 3.7E−3 | 1.6E−2 | 3.4E−2 | 1.2E−1 |
| 163 | 0.089 | 8.6 | −0.1 | 1.9E−2 | 7.9E−2 | 1.6E−1 | 4.7E−1 |
| 164 | 0.089 | 8.6 | −0.2 | 4.5E−3 | 2.2E−2 | 4.7E−2 | 1.6E−1 |
| 165 | 0.089 | 8.6 | −0.2 | 1.4E−2 | 7.0E−2 | 1.4E−1 | 4.2E−1 |
| 166 | 0.089 | 8.6 | −0.2 | 5.9E−3 | 3.3E−2 | 7.1E−2 | 2.3E−1 |
| 167 | 0.093 | 9.0 | 0.1 | 2.8E−3 | 1.3E−2 | 2.5E−2 | 7.2E−2 |
| 168 | 0.089 | 8.6 | −0.2 | 1.1E−2 | 6.0E−2 | 1.3E−1 | 3.8E−1 |
| 169 | 0.089 | 8.6 | −0.2 | 8.4E−3 | 5.5E−2 | 1.2E−1 | 3.9E−1 |
| 170 | 0.089 | 8.6 | −0.2 | 8.0E−3 | 5.0E−2 | 1.1E−1 | 3.4E−1 |
| 171 | 0.089 | 8.6 | −0.3 | 2.2E−2 | 2.3E−1 | 5.6E−1 | 1.7E+0 |
| 172 | 0.089 | 8.6 | −0.3 | 2.2E−2 | 2.3E−1 | 5.6E−1 | 1.7E+0 |
| 173 | 0.089 | 8.6 | −0.3 | 2.1E−2 | 2.2E−1 | 5.2E−1 | 1.6E+0 |
| 174 | 0.089 | 8.6 | 0.0 | 5.5E−3 | 3.4E−2 | 7.5E−2 | 2.5E−1 |
| 175 | 0.089 | 8.6 | 0.0 | 7.4E−3 | 4.4E−2 | 9.4E−2 | 3.0E−1 |
| 176 | 0.090 | 8.6 | 0.2 | 1.7E−2 | 1.2E−1 | 2.4E−1 | 6.3E−1 |
| 177 | 0.090 | 8.6 | 0.2 | 5.5E−3 | 3.3E−2 | 6.9E−2 | 1.9E−1 |
| 178 | 0.089 | 8.6 | 0.2 | 9.4E−3 | 4.8E−2 | 1.0E−1 | 3.1E−1 |
| 179 | 0.088 | 8.6 | 0.2 | 3.1E−2 | 2.2E−1 | 4.9E−1 | 1.4E+0 |
| 180 | 0.089 | 8.6 | 0.2 | 7.2E−3 | 4.7E−2 | 1.1E−1 | 3.6E−1 |
| 181 | 0.089 | 8.6 | 0.3 | 5.0E−3 | 3.1E−2 | 6.8E−2 | 2.3E−1 |
| 182 | 0.090 | 8.6 | 0.4 | 1.2E−2 | 8.0E−2 | 1.7E−1 | 4.6E−1 |
| 183 | 0.090 | 8.6 | 0.4 | 5.6E−3 | 3.6E−2 | 7.4E−2 | 2.1E−1 |
| 184 | 0.088 | 8.6 | 0.4 | 1.8E−2 | 5.5E−2 | 1.2E−1 | 3.7E−1 |
| 185 | 0.092 | 9.2 | 0.6 | 7.7E−3 | 2.3E−2 | 4.6E−2 | 1.3E−1 |
| 186 | 0.092 | 9.2 | 0.6 | 7.4E−3 | 2.1E−2 | 4.2E−2 | 7.6E−1 |
| 187 | 0.092 | 9.2 | 0.4 | 1.1E−2 | 5.5E−2 | 1.0E−1 | 2.7E−1 |
| 188 | 0.088 | 8.6 | 0.5 | 2.4E−2 | 1.8E−1 | 4.0E−1 | 1.2E+0 |
| 189 | 0.088 | 8.6 | 0.5 | 6.9E−3 | 4.7E−2 | 1.1E−1 | 3.8E−1 |
| 190 | 0.089 | 8.6 | 0.5 | 3.6E−3 | 2.3E−2 | 5.2E−2 | 1.9E−1 |
| 191 | 0.089 | 8.6 | 0.7 | 1.3E−2 | 9.3E−2 | 1.9E−1 | 5.3E−1 |
| 192 | 0.088 | 8.6 | 0.6 | 1.7E−2 | 1.4E−1 | 3.3E−1 | 1.1E+0 |
| 193 | 0.093 | 9.2 | 0.9 | 1.0E−2 | 5.3E−2 | 9.7E−2 | 2.4E−1 |
| 194 | 0.089 | 8.6 | 0.8 | 1.7E−2 | 1.3E−1 | 2.9E−1 | 9.3E−1 |
| 195 | 0.089 | 8.6 | 0.8 | 1.1E−2 | 8.3E−2 | 1.9E−1 | 6.1E−1 |

*Fig.11*

| | $OCT_{1310nm,LL}$ | | | | |
|---|---|---|---|---|---|
| | LL=0.1dB/km | LL=0.08dB/km | LL=0.05dB/km | LL=0.01dB/km | LL=0.001dB/km |
| # ＼Unit | [μm] | [μm] | [μm] | [μm] | [μm] |
| 1 | 20.8 | 21.4 | 22.7 | 28.3 | 31.8 |
| 2 | 20.8 | 21.1 | 21.6 | 23.5 | 26.5 |
| 3 | 21.4 | 21.8 | 22.5 | 24.9 | 28.8 |
| 4 | 18.6 | 18.9 | 19.6 | 22.0 | 26.1 |
| 5 | 19.7 | 18.6 | 19.6 | 22.9 | 28.5 |
| 6 | 18.6 | 19.1 | 20.1 | 23.5 | 28.9 |
| 7 | 18.6 | 19.1 | 20.1 | 23.5 | 28.8 |
| 8 | 16.8 | 17.5 | 19.1 | 24.5 | 31.0 |
| 9 | 19.3 | 20.0 | 21.6 | 28.5 | 32.5 |
| 10 | 19.1 | 19.4 | 20.8 | 22.5 | 25.0 |
| 11 | 20.7 | 21.0 | 21.6 | 23.8 | 27.2 |
| 12 | 22.0 | 22.4 | 23.3 | 27.3 | 29.8 |
| 13 | 19.0 | 19.3 | 19.1 | 22.1 | 27.4 |
| 14 | 19.0 | 19.3 | 19.1 | 22.1 | 27.4 |
| 15 | 18.3 | 18.6 | 19.3 | 21.8 | 24.8 |
| 16 | 20.4 | 20.7 | 21.3 | 23.4 | 26.7 |
| 17 | 20.5 | 20.9 | 21.7 | 24.2 | 28.4 |
| 18 | 18.4 | 18.8 | 19.5 | 21.7 | 26.1 |
| 19 | 24.1 | 24.7 | 27.6 | 29.9 | 33.9 |
| 20 | 16.9 | 17.5 | 18.8 | 23.2 | 29.7 |
| 21 | 17.6 | 18.2 | 19.5 | 23.9 | 29.7 |
| 22 | 21.1 | 21.3 | 22.0 | 24.0 | 27.4 |
| 23 | 17.8 | 18.1 | 18.7 | 21.3 | 24.3 |
| 24 | 18.5 | 18.8 | 19.5 | 22.0 | 25.0 |
| 25 | 18.0 | 18.4 | 19.0 | 21.5 | 24.6 |
| 26 | 21.0 | 21.4 | 22.2 | 24.8 | 29.0 |
| 27 | 21.0 | 21.4 | 22.2 | 24.8 | 29.0 |
| 28 | 18.6 | 18.9 | 19.6 | 21.8 | 26.5 |
| 29 | 15.2 | 16.1 | 18.2 | 27.8 | 32.2 |
| 30 | 16.6 | 17.6 | 19.6 | 28.5 | 33.0 |
| 31 | 16.2 | 16.9 | 18.6 | 24.1 | 30.8 |
| 32 | 16.6 | 17.3 | 19.0 | 24.6 | 31.1 |
| 33 | 24.0 | 24.7 | 27.8 | 30.2 | 34.3 |
| 34 | 16.6 | 17.2 | 18.6 | 23.3 | 29.7 |
| 35 | 16.7 | 17.4 | 18.7 | 23.5 | 29.8 |
| 36 | 20.7 | 21.0 | 21.6 | 23.7 | 26.9 |
| 37 | 19.0 | 19.3 | 19.9 | 22.4 | 25.5 |
| 38 | 17.4 | 17.7 | 18.4 | 21.0 | 23.9 |
| 39 | 19.7 | 20.0 | 21.0 | 23.1 | 26.4 |
| 40 | 22.9 | 23.5 | 24.7 | 29.3 | 32.7 |

*Fig.12*

| | $OCT_{1310nm,LL}$ | | | | |
|---|---|---|---|---|---|
| | LL=0.1dB/km | LL=0.08dB/km | LL=0.05dB/km | LL=0.01dB/km | LL=0.001dB/km |
| # ＼Unit | [μm] | [μm] | [μm] | [μm] | [μm] |
| 41 | 19.5 | 19.9 | 18.4 | 22.5 | 29.0 |
| 42 | 19.8 | 17.6 | 18.8 | 22.9 | 29.3 |
| 43 | 22.1 | 22.6 | 23.7 | 28.3 | 31.4 |
| 44 | 22.1 | 22.6 | 23.6 | 28.3 | 31.4 |
| 45 | 19.5 | 19.8 | 18.8 | 22.5 | 28.5 |
| 46 | 18.1 | 18.4 | 19.1 | 21.6 | 24.5 |
| 47 | 21.5 | 22.0 | 22.9 | 27.4 | 30.3 |
| 48 | 19.2 | 19.6 | 18.9 | 22.2 | 27.9 |
| 49 | 21.1 | 21.5 | 22.4 | 26.7 | 29.8 |
| 50 | 18.9 | 19.2 | 20.0 | 22.0 | 27.3 |
| 51 | 20.8 | 21.2 | 22.0 | 24.8 | 29.1 |
| 52 | 18.6 | 19.0 | 19.7 | 21.8 | 26.7 |
| 53 | 20.5 | 20.8 | 21.6 | 24.2 | 28.3 |
| 54 | 18.8 | 19.1 | 19.9 | 22.1 | 26.5 |
| 55 | 20.3 | 20.6 | 21.3 | 23.7 | 27.6 |
| 56 | 18.4 | 18.8 | 19.5 | 21.8 | 25.6 |
| 57 | 20.0 | 20.4 | 21.1 | 23.3 | 27.0 |
| 58 | 19.0 | 19.3 | 20.0 | 22.4 | 25.8 |
| 59 | 19.6 | 19.9 | 20.9 | 23.0 | 26.4 |
| 60 | 20.1 | 20.6 | 21.6 | 26.8 | 29.7 |
| 61 | 19.3 | 19.7 | 18.7 | 22.3 | 28.3 |
| 62 | 21.4 | 21.7 | 22.2 | 24.0 | 26.6 |
| 63 | 18.8 | 19.1 | 19.7 | 22.3 | 24.8 |
| 64 | 21.9 | 22.3 | 22.9 | 26.2 | 28.9 |
| 65 | 19.0 | 19.3 | 20.1 | 22.4 | 26.3 |
| 66 | 20.5 | 20.8 | 21.4 | 23.4 | 26.6 |
| 67 | 17.9 | 18.3 | 18.9 | 21.3 | 24.7 |
| 68 | 18.1 | 18.4 | 19.1 | 21.7 | 24.5 |
| 69 | 19.6 | 18.2 | 19.3 | 22.8 | 28.5 |
| 70 | 23.3 | 23.8 | 24.8 | 28.9 | 31.9 |
| 71 | 20.0 | 18.8 | 19.8 | 23.2 | 28.8 |
| 72 | 22.7 | 23.1 | 24.1 | 28.4 | 31.4 |
| 73 | 19.3 | 19.7 | 18.9 | 22.3 | 28.2 |
| 74 | 19.0 | 19.3 | 18.5 | 21.9 | 27.9 |
| 75 | 18.5 | 18.8 | 19.5 | 22.0 | 24.9 |
| 76 | 19.2 | 19.5 | 20.6 | 22.6 | 25.8 |
| 77 | 21.0 | 21.4 | 22.0 | 24.4 | 28.1 |
| 78 | 18.6 | 18.9 | 19.6 | 22.0 | 25.3 |
| 79 | 17.9 | 18.2 | 18.9 | 21.3 | 24.6 |
| 80 | 20.7 | 21.0 | 21.7 | 24.0 | 27.7 |

*Fig.13*

| | $OCT_{1310nm,LL}$ | | | | |
|---|---|---|---|---|---|
| | LL=0.1dB/km | LL=0.08dB/km | LL=0.05dB/km | LL=0.01dB/km | LL=0.001dB/km |
| # ＼Unit | [μm] | [μm] | [μm] | [μm] | [μm] |
| 81 | 18.1 | 18.4 | 19.1 | 21.5 | 24.8 |
| 82 | 21.2 | 21.6 | 22.6 | 27.3 | 30.1 |
| 83 | 19.9 | 18.7 | 19.7 | 23.1 | 28.6 |
| 84 | 19.5 | 19.9 | 20.8 | 22.9 | 26.4 |
| 85 | 19.8 | 20.3 | 21.0 | 23.2 | 26.9 |
| 86 | 18.6 | 18.9 | 19.6 | 22.0 | 25.4 |
| 87 | 18.2 | 18.5 | 19.2 | 21.8 | 24.6 |
| 88 | 19.6 | 19.9 | 21.0 | 23.0 | 26.1 |
| 89 | 20.2 | 20.5 | 21.2 | 23.4 | 27.1 |
| 90 | 18.6 | 18.9 | 19.6 | 22.0 | 25.4 |
| 91 | 21.6 | 22.0 | 22.6 | 24.9 | 28.4 |
| 92 | 18.9 | 19.2 | 19.9 | 22.3 | 25.9 |
| 93 | 18.0 | 18.4 | 19.0 | 21.5 | 24.7 |
| 94 | 19.5 | 19.8 | 19.4 | 22.6 | 28.1 |
| 95 | 22.8 | 23.2 | 24.2 | 28.2 | 31.1 |
| 96 | 19.7 | 18.7 | 19.7 | 22.9 | 28.3 |
| 97 | 21.5 | 21.7 | 22.3 | 24.3 | 27.3 |
| 98 | 22.3 | 22.7 | 23.6 | 27.8 | 30.6 |
| 99 | 18.8 | 19.1 | 19.7 | 22.3 | 25.2 |
| 100 | 19.5 | 19.9 | 20.8 | 24.0 | 29.0 |
| 101 | 21.0 | 21.3 | 21.9 | 24.1 | 27.7 |
| 102 | 19.9 | 20.3 | 21.3 | 24.6 | 29.6 |
| 103 | 18.4 | 18.7 | 19.3 | 21.9 | 24.7 |
| 104 | 19.1 | 19.5 | 18.8 | 22.1 | 27.9 |
| 105 | 18.2 | 18.5 | 19.2 | 21.7 | 24.8 |
| 106 | 17.7 | 18.0 | 18.7 | 21.1 | 24.3 |
| 107 | 20.6 | 20.9 | 21.6 | 23.8 | 27.3 |
| 108 | 19.0 | 19.3 | 20.0 | 22.4 | 25.7 |
| 109 | 19.4 | 19.8 | 20.7 | 23.9 | 28.8 |
| 110 | 19.0 | 19.3 | 18.9 | 22.0 | 27.5 |
| 111 | 19.8 | 20.2 | 21.0 | 23.8 | 28.3 |
| 112 | 21.3 | 21.6 | 22.2 | 24.4 | 27.8 |
| 113 | 18.5 | 18.8 | 19.5 | 21.9 | 25.3 |
| 114 | 17.8 | 18.1 | 18.8 | 21.3 | 24.4 |
| 115 | 18.6 | 18.9 | 19.5 | 22.1 | 24.9 |
| 116 | 19.2 | 19.5 | 20.8 | 22.7 | 25.6 |
| 117 | 19.8 | 20.4 | 21.0 | 23.2 | 26.7 |
| 118 | 18.2 | 18.5 | 19.2 | 21.6 | 24.7 |
| 119 | 21.2 | 21.4 | 22.0 | 23.9 | 26.8 |
| 120 | 18.3 | 18.6 | 19.3 | 21.9 | 24.6 |

*Fig.14*

| | $OCT_{1310nm,LL}$ | | | | |
|---|---|---|---|---|---|
| | LL=0.1dB/km | LL=0.08dB/km | LL=0.05dB/km | LL=0.01dB/km | LL=0.001dB/km |
| # ＼Unit | [μm] | [μm] | [μm] | [μm] | [μm] |
| 121 | 18.6 | 18.9 | 19.5 | 22.1 | 24.8 |
| 122 | 21.7 | 22.1 | 22.9 | 27.0 | 29.3 |
| 123 | 19.3 | 19.7 | 19.6 | 22.5 | 27.6 |
| 124 | 18.6 | 19.0 | 19.7 | 21.7 | 27.0 |
| 125 | 18.8 | 19.1 | 19.8 | 22.3 | 24.7 |
| 126 | 18.8 | 19.1 | 19.7 | 22.3 | 25.0 |
| 127 | 20.4 | 20.7 | 21.3 | 23.4 | 26.7 |
| 128 | 18.7 | 19.0 | 19.7 | 22.2 | 25.3 |
| 129 | 20.9 | 21.2 | 21.7 | 23.5 | 26.3 |
| 130 | 20.9 | 21.1 | 21.7 | 23.5 | 26.3 |
| 131 | 18.9 | 19.2 | 19.8 | 22.4 | 24.9 |
| 132 | 21.4 | 21.7 | 22.2 | 24.0 | 26.8 |
| 133 | 19.1 | 19.4 | 20.7 | 22.6 | 24.8 |
| 134 | 21.6 | 22.0 | 22.8 | 26.7 | 29.6 |
| 135 | 19.3 | 19.7 | 19.8 | 22.6 | 27.2 |
| 136 | 21.2 | 21.5 | 22.2 | 24.4 | 27.9 |
| 137 | 18.5 | 18.8 | 19.5 | 21.9 | 25.4 |
| 138 | 20.6 | 20.9 | 21.5 | 23.4 | 26.6 |
| 139 | 19.1 | 19.4 | 20.6 | 22.5 | 25.6 |
| 140 | 19.3 | 19.6 | 20.9 | 22.7 | 25.0 |
| 141 | 19.9 | 20.9 | 21.4 | 23.3 | 25.9 |
| 142 | 21.8 | 22.2 | 23.1 | 27.1 | 29.3 |
| 143 | 21.8 | 22.2 | 23.1 | 27.1 | 29.3 |
| 144 | 19.2 | 19.6 | 19.5 | 22.4 | 27.5 |
| 145 | 19.2 | 19.6 | 19.5 | 22.4 | 27.5 |
| 146 | 19.0 | 19.3 | 19.1 | 22.0 | 27.1 |
| 147 | 21.1 | 21.3 | 21.8 | 23.7 | 26.3 |
| 148 | 18.9 | 19.2 | 19.8 | 22.4 | 25.0 |
| 149 | 21.4 | 21.8 | 22.6 | 26.4 | 29.3 |
| 150 | 18.9 | 19.2 | 19.9 | 22.1 | 26.8 |
| 151 | 18.1 | 18.4 | 19.0 | 21.6 | 24.2 |
| 152 | 18.9 | 19.2 | 19.9 | 22.1 | 26.5 |
| 153 | 21.2 | 21.5 | 22.2 | 24.7 | 28.7 |
| 154 | 18.5 | 18.9 | 19.6 | 21.8 | 26.1 |
| 155 | 18.7 | 19.0 | 19.7 | 21.9 | 25.7 |
| 156 | 19.2 | 19.5 | 20.2 | 22.6 | 26.0 |
| 157 | 21.0 | 21.3 | 22.0 | 24.3 | 28.0 |
| 158 | 20.2 | 20.6 | 21.4 | 24.0 | 28.3 |
| 159 | 20.8 | 21.1 | 21.7 | 23.9 | 27.4 |
| 160 | 19.3 | 19.6 | 19.9 | 22.6 | 27.1 |

*Fig.15*

| | $OCT_{1310nm,LL}$ | | | | |
|---|---|---|---|---|---|
| | LL=0.1dB/km | LL=0.08dB/km | LL=0.05dB/km | LL=0.01dB/km | LL=0.001dB/km |
| # ＼Unit | [μm] | [μm] | [μm] | [μm] | [μm] |
| 161 | 18.7 | 19.0 | 19.7 | 22.1 | 25.0 |
| 162 | 18.7 | 19.0 | 19.7 | 22.2 | 24.9 |
| 163 | 20.7 | 21.0 | 21.6 | 23.6 | 26.9 |
| 164 | 18.9 | 19.2 | 19.9 | 22.4 | 24.9 |
| 165 | 20.6 | 20.9 | 21.4 | 23.4 | 26.4 |
| 166 | 19.2 | 19.5 | 20.8 | 22.7 | 24.9 |
| 167 | 18.2 | 18.5 | 19.1 | 21.8 | 24.5 |
| 168 | 19.8 | 20.8 | 21.3 | 23.1 | 25.9 |
| 169 | 19.6 | 19.9 | 21.2 | 23.0 | 24.7 |
| 170 | 19.6 | 19.9 | 21.1 | 22.9 | 24.8 |
| 171 | 21.3 | 21.6 | 22.0 | 23.7 | 20.7 |
| 172 | 21.3 | 21.6 | 22.0 | 23.7 | 20.7 |
| 173 | 21.4 | 21.6 | 22.1 | 23.7 | 19.0 |
| 174 | 19.3 | 19.6 | 20.9 | 22.7 | 24.4 |
| 175 | 19.5 | 19.8 | 21.1 | 22.9 | 25.0 |
| 176 | 20.8 | 21.1 | 21.6 | 23.4 | 25.7 |
| 177 | 19.0 | 19.3 | 19.9 | 22.4 | 25.0 |
| 178 | 19.7 | 20.0 | 21.2 | 23.1 | 26.0 |
| 179 | 21.6 | 21.8 | 22.4 | 24.1 | 26.6 |
| 180 | 19.6 | 19.9 | 21.2 | 22.9 | 24.6 |
| 181 | 19.2 | 19.5 | 20.8 | 22.6 | 24.1 |
| 182 | 19.9 | 20.9 | 21.4 | 23.2 | 25.0 |
| 183 | 19.1 | 19.4 | 20.0 | 22.5 | 23.6 |
| 184 | 20.5 | 20.8 | 21.5 | 23.8 | 27.7 |
| 185 | 19.3 | 19.6 | 20.3 | 22.7 | 26.8 |
| 186 | 19.2 | 19.5 | 20.2 | 22.7 | 26.9 |
| 187 | 19.5 | 19.8 | 21.4 | 23.1 | 25.9 |
| 188 | 21.3 | 21.5 | 22.0 | 23.8 | 25.7 |
| 189 | 19.5 | 19.8 | 21.1 | 22.8 | 23.5 |
| 190 | 18.9 | 19.2 | 19.8 | 22.3 | 24.8 |
| 191 | 19.8 | 20.9 | 21.4 | 23.1 | 24.3 |
| 192 | 21.1 | 21.4 | 21.9 | 23.6 | 23.9 |
| 193 | 19.5 | 19.8 | 21.3 | 23.0 | 25.5 |
| 194 | 21.2 | 21.4 | 21.9 | 23.6 | 25.1 |
| 195 | 20.9 | 21.1 | 21.6 | 23.3 | 24.4 |

*Fig.16A*

| | XT Case A | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 1 | 2c | 28.1 | 7.1E−03 | 1.6E+00 | 1.1E+01 | 110.4 |
| 2 | 28.5 | 25.2 | 2.4E−03 | 3.6E−01 | 1.2E+00 | 116.1 |
| 3 | 29.6 | 23.8 | 2.1E−02 | 2.3E+00 | 9.3E+00 | 120.2 |
| 4 | 2c | 26.6 | 4.8E−04 | 1.0E−01 | 4.6E−01 | 109.1 |
| 5 | 2c | 25.4 | 3.1E−03 | 5.3E−01 | 2.8E+00 | 113.6 |
| 6 | 2c | 26.0 | 3.0E−03 | 5.4E−01 | 2.9E+00 | 110.3 |
| 7 | 2c | 26.0 | 3.0E−03 | 5.4E−01 | 2.9E+00 | 110.3 |
| 8 | 2c | 23.7 | 1.8E−02 | 2.2E+00 | 1.6E+01 | 111.1 |
| 9 | 2c | 25.3 | 1.7E−02 | 3.4E+00 | 4.1E+01 | 113.0 |
| 10 | 27.3 | 26.8 | 1.8E−04 | 4.2E−02 | 1.4E−01 | 109.6 |
| 11 | 28.5 | 25.3 | 3.2E−03 | 4.8E−01 | 1.7E+00 | 115.8 |
| 12 | 30.2 | 23.1 | 6.9E−02 | 6.0E+00 | 2.8E+01 | 122.9 |
| 13 | 2c | 24.7 | 2.6E−03 | 4.0E−01 | 1.9E+00 | 113.6 |
| 14 | 2c | 24.7 | 2.6E−03 | 4.0E−01 | 2.0E+00 | 113.6 |
| 15 | 2c | 26.5 | 2.7E−04 | 6.0E−02 | 2.4E−01 | 108.5 |
| 16 | 27.9 | 26.0 | 1.3E−03 | 2.3E−01 | 8.3E−01 | 113.8 |
| 17 | 28.0 | 25.9 | 3.5E−03 | 5.4E−01 | 2.4E+00 | 114.2 |
| 18 | 2c | 23.6 | 3.2E−03 | 4.0E−01 | 1.7E+00 | 114.6 |
| 19 | ODmin ＞ 126 μm | | | | | |
| 20 | 2c | 23.2 | 1.5E−02 | 1.6E+00 | 8.6E+00 | 112.4 |
| 21 | 2c | 23.8 | 1.4E−02 | 1.7E+00 | 9.2E+00 | 112.6 |
| 22 | 29.0 | 24.6 | 6.5E−03 | 8.3E−01 | 2.8E+00 | 118.0 |
| 23 | 2c | 30.0 | 1.2E−05 | 5.7E−03 | 2.8E−02 | 100.6 |
| 24 | 25.4 | 29.3 | 3.6E−05 | 1.4E−02 | 6.3E−02 | 103.4 |
| 25 | 2c | 25.3 | 5.9E−04 | 1.0E−01 | 3.9E−01 | 110.6 |
| 26 | 28.9 | 24.8 | 1.0E−02 | 1.4E+00 | 6.0E+00 | 117.4 |
| 27 | 28.9 | 24.8 | 1.0E−02 | 1.4E+00 | 5.9E+00 | 117.4 |
| 28 | 2c | 24.4 | 2.1E−03 | 3.1E−01 | 1.4E+00 | 113.2 |
| 29 | 2c | 22.0 | 5.2E−02 | 4.0E+05 | 4.3E+05 | 111.3 |
| 30 | 2c | 22.8 | 4.9E−02 | 3.9E+05 | 4.3E+05 | 112.6 |
| 31 | 2c | 22.3 | 3.5E−02 | 2.8E+00 | 2.3E+01 | 112.6 |
| 32 | 2c | 22.6 | 3.4E−02 | 3.0E+00 | 2.9E+01 | 112.9 |
| 33 | ODmin ＞ 126 μm | | | | | |
| 34 | 2c | 22.5 | 2.5E−02 | 2.1E+00 | 1.1E+01 | 113.2 |
| 35 | 2c | 22.6 | 2.4E−02 | 2.1E+00 | 1.1E+01 | 113.2 |
| 36 | 28.7 | 25.0 | 3.5E−03 | 4.9E−01 | 1.6E+00 | 116.5 |
| 37 | 26.4 | 28.0 | 1.2E−04 | 3.5E−02 | 1.5E−01 | 106.9 |
| 38 | 2c | 29.1 | 1.7E−05 | 7.1E−03 | 3.2E−02 | 101.7 |
| 39 | 27.4 | 26.7 | 6.1E−04 | 1.2E−01 | 4.6E−01 | 111.0 |
| 40 | 30.0 | 23.3 | 1.2E−01 | 1.1E+01 | 5.6E+01 | 124.3 |

Fig.16B

| | XT Case B | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 1 | equals to XT Case A | | | | | |
| 2 | 24.1 | 31.0 | 1.9E−05 | 1.0E−02 | 4.7E−02 | 104.6 |
| 3 | 24.6 | 30.3 | 2.7E−04 | 8.4E−02 | 4.4E−01 | 107.2 |
| 4 | equals to XT Case A | | | | | |
| 5 | equals to XT Case A | | | | | |
| 6 | equals to XT Case A | | | | | |
| 7 | equals to XT Case A | | | | | |
| 8 | equals to XT Case A | | | | | |
| 9 | equals to XT Case A | | | | | |
| 10 | 2c | 31.3 | 4.4E−06 | 2.1E−03 | 9.1E−03 | 100.7 |
| 11 | 2c | 31.1 | 4.0E−05 | 1.8E−02 | 9.0E−02 | 104.2 |
| 12 | 24.7 | 30.3 | 1.1E−03 | 2.9E−01 | 1.6E+00 | 108.5 |
| 13 | equals to XT Case A | | | | | |
| 14 | equals to XT Case A | | | | | |
| 15 | equals to XT Case A | | | | | |
| 16 | 2c | 30.6 | 3.5E−05 | 1.6E−02 | 7.3E−02 | 104.6 |
| 17 | 2c | 28.4 | 7.8E−04 | 1.7E−01 | 8.0E−01 | 109.4 |
| 18 | equals to XT Case A | | | | | |
| 19 | 24.8 | 30.1 | 1.1E−02 | 2.7E+00 | 1.9E+01 | 113.1 |
| 20 | equals to XT Case A | | | | | |
| 21 | equals to XT Case A | | | | | |
| 22 | 24.5 | 30.5 | 6.4E−05 | 2.6E−02 | 1.2E−01 | 106.0 |
| 23 | equals to XT Case A | | | | | |
| 24 | 2c | 31.2 | 8.3E−06 | 4.6E−03 | 2.4E−02 | 99.7 |
| 25 | equals to XT Case A | | | | | |
| 26 | 2c | 29.9 | 4.9E−04 | 1.3E−01 | 6.6E−01 | 107.3 |
| 27 | 2c | 29.8 | 5.0E−04 | 1.3E−01 | 6.6E−01 | 107.3 |
| 28 | equals to XT Case A | | | | | |
| 29 | equals to XT Case A | | | | | |
| 30 | equals to XT Case A | | | | | |
| 31 | equals to XT Case A | | | | | |
| 32 | equals to XT Case A | | | | | |
| 33 | 2c | 29.2 | 1.8E−02 | 4.0E+00 | 2.8E+01 | 114.8 |
| 34 | equals to XT Case A | | | | | |
| 35 | equals to XT Case A | | | | | |
| 36 | 24.2 | 30.9 | 3.1E−05 | 1.5E−02 | 7.0E−02 | 104.7 |
| 37 | 2c | 31.6 | 6.8E−06 | 4.2E−03 | 2.1E−02 | 99.7 |
| 38 | equals to XT Case A | | | | | |
| 39 | 2c | 29.0 | 9.5E−05 | 3.0E−02 | 1.3E−01 | 106.2 |
| 40 | 2c | 29.0 | 9.1E−03 | 1.9E+00 | 1.2E+01 | 112.7 |

Fig.17A

| | XT Case A | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 41 | 2c | 22.3 | 1.8E-02 | 1.5E+00 | 8.0E+00 | 119.4 |
| 42 | 2c | 22.8 | 1.6E-02 | 1.5E+00 | 8.0E+00 | 119.0 |
| 43 | 29.3 | 24.2 | 4.7E-02 | 5.2E+00 | 2.7E+01 | 120.8 |
| 44 | 29.2 | 24.3 | 4.3E-02 | 5.0E+00 | 2.5E+01 | 120.6 |
| 45 | 2c | 23.0 | 1.1E-02 | 1.1E+00 | 5.8E+00 | 117.9 |
| 46 | 2c | 25.5 | 4.8E-04 | 8.8E-02 | 3.1E-01 | 110.2 |
| 47 | 28.8 | 24.9 | 2.0E-02 | 2.7E+00 | 1.3E+01 | 118.3 |
| 48 | 2c | 23.3 | 7.7E-03 | 8.3E-01 | 4.2E+00 | 116.8 |
| 49 | 28.6 | 25.2 | 1.1E-02 | 1.6E+00 | 7.5E+00 | 116.8 |
| 50 | 2c | 23.5 | 5.1E-03 | 6.1E-01 | 2.9E+00 | 115.7 |
| 51 | 28.3 | 25.5 | 6.5E-03 | 9.5E-01 | 4.3E+00 | 115.6 |
| 52 | 2c | 23.7 | 3.6E-03 | 4.6E-01 | 2.1E+00 | 114.9 |
| 53 | 28.0 | 25.9 | 3.4E-03 | 5.4E-01 | 2.3E+00 | 114.2 |
| 54 | 2c | 24.7 | 2.0E-03 | 3.0E-01 | 1.3E+00 | 113.2 |
| 55 | 27.7 | 26.3 | 1.8E-03 | 3.1E-01 | 1.3E+00 | 113.0 |
| 56 | 2c | 24.6 | 1.5E-03 | 2.3E-01 | 9.4E-01 | 112.7 |
| 57 | 27.5 | 26.6 | 9.5E-04 | 1.8E-01 | 7.2E-01 | 111.7 |
| 58 | 2c | 26.4 | 5.7E-04 | 1.1E-01 | 4.5E-01 | 110.2 |
| 59 | 27.2 | 26.9 | 4.9E-04 | 1.0E-01 | 4.0E-01 | 110.4 |
| 60 | 26.8 | 27.5 | 3.5E-03 | 6.9E-01 | 3.9E+00 | 110.2 |
| 61 | 2c | 25.2 | 2.6E-03 | 4.7E-01 | 2.5E+00 | 113.1 |
| 62 | 29.9 | 23.5 | 1.3E-02 | 1.4E+00 | 3.6E+00 | 121.0 |
| 63 | 26.6 | 27.8 | 7.2E-05 | 2.1E-02 | 7.6E-02 | 107.0 |
| 64 | 30.5 | 22.7 | 6.0E-02 | 5.1E+00 | 1.9E+01 | 123.5 |
| 65 | 2c | 28.1 | 2.0E-04 | 5.2E-02 | 2.4E-01 | 106.8 |
| 66 | 28.1 | 25.8 | 1.4E-03 | 2.4E-01 | 8.3E-01 | 114.4 |
| 67 | 2c | 26.0 | 4.1E-04 | 8.3E-02 | 3.5E-01 | 108.9 |
| 68 | 2c | 30.0 | 1.3E-05 | 6.0E-03 | 2.8E-02 | 101.3 |
| 69 | 2c | 26.5 | 1.8E-03 | 3.7E-01 | 2.0E+00 | 111.4 |
| 70 | ODmin > 126 μm | | | | | |
| 71 | 2c | 28.0 | 1.1E-03 | 2.6E-01 | 1.5E+00 | 109.0 |
| 72 | 30.4 | 22.7 | 1.4E-01 | 1.1E+01 | 5.3E+01 | 124.9 |
| 73 | 2c | 27.8 | 7.6E-04 | 1.8E-01 | 1.1E+00 | 107.9 |
| 74 | 2c | 27.3 | 7.9E-04 | 1.8E-01 | 1.1E+00 | 108.3 |
| 75 | 2c | 26.4 | 3.0E-04 | 6.4E-02 | 2.3E-01 | 109.3 |
| 76 | 26.7 | 27.6 | 1.9E-04 | 4.8E-02 | 1.9E-01 | 108.2 |
| 77 | 29.1 | 24.4 | 9.6E-03 | 1.2E+00 | 4.6E+00 | 118.3 |
| 78 | 2c | 28.8 | 8.5E-05 | 2.6E-02 | 1.3E-01 | 104.5 |
| 79 | 2c | 27.8 | 1.1E-04 | 3.1E-02 | 1.4E-01 | 105.2 |
| 80 | 28.6 | 25.1 | 4.7E-03 | 6.8E-01 | 2.6E+00 | 116.2 |

Fig.17B

| | XT Case B | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 41 | equals to XT Case A | | | | | |
| 42 | equals to XT Case A | | | | | |
| 43 | 2c | 29.0 | 4.9E-03 | 1.0E+00 | 5.9E+00 | 111.2 |
| 44 | 2c | 28.9 | 4.9E-03 | 1.0E+00 | 5.8E+00 | 111.3 |
| 45 | equals to XT Case A | | | | | |
| 46 | equals to XT Case A | | | | | |
| 47 | 2c | 28.9 | 2.8E-03 | 5.7E-01 | 3.2E+00 | 110.3 |
| 48 | equals to XT Case A | | | | | |
| 49 | 2c | 28.8 | 1.6E-03 | 3.4E-01 | 1.8E+00 | 109.6 |
| 50 | equals to XT Case A | | | | | |
| 51 | 2c | 28.7 | 9.9E-04 | 2.2E-01 | 1.1E+00 | 109.1 |
| 52 | equals to XT Case A | | | | | |
| 53 | 2c | 28.7 | 6.1E-04 | 1.4E-01 | 6.7E-01 | 108.7 |
| 54 | equals to XT Case A | | | | | |
| 55 | 2c | 28.6 | 3.8E-04 | 9.1E-02 | 4.3E-01 | 108.4 |
| 56 | equals to XT Case A | | | | | |
| 57 | 2c | 28.5 | 2.4E-04 | 6.3E-02 | 2.8E-01 | 107.9 |
| 58 | equals to XT Case A | | | | | |
| 59 | 2c | 28.4 | 1.6E-04 | 4.3E-02 | 1.8E-01 | 107.3 |
| 60 | 2c | 28.4 | 2.3E-03 | 5.0E-01 | 2.9E+00 | 108.4 |
| 61 | equals to XT Case A | | | | | |
| 62 | 25.7 | 29.0 | 1.2E-04 | 3.8E-02 | 1.4E-01 | 110.0 |
| 63 | 2c | 28.3 | 4.6E-05 | 1.5E-02 | 5.6E-02 | 106.0 |
| 64 | 25.6 | 29.0 | 7.9E-04 | 1.8E-01 | 8.5E-01 | 110.8 |
| 65 | equals to XT Case A | | | | | |
| 66 | 23.6 | 31.7 | 1.2E-05 | 7.2E-03 | 3.5E-02 | 102.7 |
| 67 | equals to XT Case A | | | | | |
| 68 | equals to XT Case A | | | | | |
| 69 | equals to XT Case A | | | | | |
| 70 | 25.3 | 29.4 | 6.0E-03 | 1.2E+00 | 7.3E+00 | 112.8 |
| 71 | equals to XT Case A | | | | | |
| 72 | 24.5 | 30.4 | 2.4E-03 | 6.4E-01 | 3.9E+00 | 109.4 |
| 73 | equals to XT Case A | | | | | |
| 74 | equals to XT Case A | | | | | |
| 75 | equals to XT Case A | | | | | |
| 76 | 2c | 27.8 | 1.5E-04 | 4.1E-02 | 1.6E-01 | 107.7 |
| 77 | 24.3 | 30.7 | 1.1E-04 | 4.2E-02 | 2.1E-01 | 105.7 |
| 78 | equals to XT Case A | | | | | |
| 79 | equals to XT Case A | | | | | |
| 80 | 23.8 | 31.4 | 5.0E-05 | 2.4E-02 | 1.2E-01 | 103.7 |

Fig.18A

| | XT Case A | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 81 | 2c | 28.6 | 7.1E-05 | 2.2E-02 | 1.1E-01 | 104.0 |
| 82 | 29.7 | 23.7 | 3.7E-02 | 3.5E+00 | 1.7E+01 | 120.0 |
| 83 | 2c | 23.7 | 9.1E-03 | 1.0E+00 | 5.0E+00 | 117.4 |
| 84 | 2c | 27.3 | 4.1E-04 | 9.0E-02 | 3.7E-01 | 109.6 |
| 85 | 27.6 | 26.4 | 1.0E-03 | 1.8E-01 | 7.2E-01 | 111.8 |
| 86 | 2c | 24.6 | 1.6E-03 | 2.3E-01 | 8.5E-01 | 113.0 |
| 87 | 25.1 | 29.7 | 1.5E-05 | 6.9E-03 | 3.1E-02 | 102.1 |
| 88 | 27.5 | 26.5 | 5.5E-04 | 1.1E-01 | 4.0E-01 | 111.1 |
| 89 | 27.7 | 26.3 | 1.2E-03 | 2.3E-01 | 9.1E-01 | 112.7 |
| 90 | 2c | 25.9 | 6.1E-04 | 1.2E-01 | 4.7E-01 | 110.3 |
| 91 | 30.1 | 23.1 | 3.4E-02 | 3.2E+00 | 1.1E+01 | 122.1 |
| 92 | 2c | 28.5 | 1.2E-04 | 3.4E-02 | 1.6E-01 | 105.8 |
| 93 | 2c | 26.8 | 2.1E-04 | 5.0E-02 | 2.2E-01 | 107.5 |
| 94 | 2c | 27.0 | 1.1E-03 | 2.4E-01 | 1.3E+00 | 110.0 |
| 95 | 31.1 | 21.9 | 2.3E-01 | 1.5E+01 | 7.0E+01 | 126.7 |
| 96 | 2c | 28.4 | 6.6E-04 | 1.6E-01 | 9.4E-01 | 107.7 |
| 97 | 29.9 | 23.4 | 1.7E-02 | 1.8E+00 | 5.3E+00 | 121.1 |
| 98 | 30.2 | 23.0 | 8.8E-02 | 7.5E+00 | 3.7E+01 | 123.5 |
| 99 | 2c | 26.5 | 3.0E-04 | 6.3E-02 | 2.2E-01 | 109.4 |
| 100 | 25.3 | 29.4 | 6.8E-04 | 1.8E-01 | 1.0E+00 | 105.1 |
| 101 | 28.9 | 24.8 | 6.2E-03 | 8.3E-01 | 3.0E+00 | 117.4 |
| 102 | 26.5 | 27.9 | 2.1E-03 | 4.3E-01 | 2.4E+00 | 109.0 |
| 103 | 2c | 25.6 | 4.7E-04 | 8.6E-02 | 2.9E-01 | 110.5 |
| 104 | 2c | 25.1 | 2.3E-03 | 4.1E-01 | 2.2E+00 | 113.0 |
| 105 | 2c | 28.9 | 5.2E-05 | 1.7E-02 | 8.3E-02 | 103.7 |
| 106 | 2c | 28.2 | 6.1E-05 | 1.9E-02 | 8.8E-02 | 104.1 |
| 107 | 28.3 | 25.6 | 2.7E-03 | 4.2E-01 | 1.6E+00 | 115.1 |
| 108 | 25.5 | 29.2 | 6.6E-05 | 2.2E-02 | 1.1E-01 | 104.4 |
| 109 | 32.3 | 20.3 | 1.1E-01 | 5.8E+00 | 2.7E+01 | 123.3 |
| 110 | 30.9 | 22.1 | 1.3E-02 | 1.2E+00 | 5.8E+00 | 118.7 |
| 111 | 2c | 26.2 | 2.5E-03 | 4.1E-01 | 1.9E+00 | 112.3 |
| 112 | ODmin > 126 μm | | | | | |
| 113 | 29.6 | 23.8 | 2.4E-03 | 3.3E-01 | 1.2E+00 | 114.4 |
| 114 | 2c | 24.5 | 8.9E-04 | 1.4E-01 | 5.3E-01 | 111.6 |
| 115 | 25.9 | 28.7 | 4.2E-05 | 1.5E-02 | 6.0E-02 | 104.8 |
| 116 | 27.0 | 27.2 | 2.3E-04 | 5.6E-02 | 2.0E-01 | 109.1 |
| 117 | 27.5 | 26.6 | 7.8E-04 | 1.6E-01 | 6.2E-01 | 111.4 |
| 118 | 2c | 26.1 | 3.7E-04 | 7.6E-02 | 3.0E-01 | 109.2 |
| 119 | 29.4 | 24.1 | 7.4E-03 | 8.6E-01 | 2.5E+00 | 119.0 |
| 120 | 2c | 25.2 | 6.0E-04 | 1.0E-01 | 3.2E-01 | 111.2 |

Fig.18B

| | XT Case B | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 81 | equals to XT Case A | | | | | |
| 82 | 2c | 27.6 | 4.7E−03 | 8.0E−01 | 4.2E+00 | 112.2 |
| 83 | equals to XT Case A | | | | | |
| 84 | equals to XT Case A | | | | | |
| 85 | 2c | 27.3 | 5.8E−04 | 1.2E−01 | 4.8E−01 | 110.2 |
| 86 | equals to XT Case A | | | | | |
| 87 | 2c | 29.8 | 1.4E−05 | 6.5E−03 | 2.9E−02 | 101.9 |
| 88 | 2c | 32.1 | 5.3E−06 | 3.8E−03 | 1.9E−02 | 100.0 |
| 89 | 2c | 29.0 | 1.8E−04 | 5.1E−02 | 2.4E−01 | 107.3 |
| 90 | equals to XT Case A | | | | | |
| 91 | 25.4 | 29.3 | 4.2E−04 | 1.1E−01 | 5.1E−01 | 109.7 |
| 92 | equals to XT Case A | | | | | |
| 93 | equals to XT Case A | | | | | |
| 94 | equals to XT Case A | | | | | |
| 95 | 25.3 | 29.4 | 3.7E−03 | 7.9E−01 | 4.5E+00 | 111.7 |
| 96 | equals to XT Case A | | | | | |
| 97 | 25.5 | 29.2 | 1.7E−04 | 5.3E−02 | 2.1E−01 | 109.6 |
| 98 | 24.5 | 30.5 | 1.5E−03 | 4.0E−01 | 2.4E+00 | 108.6 |
| 99 | equals to XT Case A | | | | | |
| 100 | 2c | 30.2 | 4.3E−04 | 1.3E−01 | 7.8E−01 | 103.5 |
| 101 | 24.2 | 30.9 | 6.5E−05 | 2.7E−02 | 1.4E−01 | 105.1 |
| 102 | 2c | 28.2 | 1.7E−03 | 3.7E−01 | 2.1E+00 | 108.3 |
| 103 | equals to XT Case A | | | | | |
| 104 | equals to XT Case A | | | | | |
| 105 | equals to XT Case A | | | | | |
| 106 | equals to XT Case A | | | | | |
| 107 | 23.6 | 31.7 | 2.5E−05 | 1.4E−02 | 7.2E−02 | 102.8 |
| 108 | 2c | 30.8 | 2.1E−05 | 9.7E−03 | 5.0E−02 | 101.4 |
| 109 | 2c | 26.2 | 3.0E−03 | 5.3E−01 | 2.7E+00 | 111.4 |
| 110 | 2c | 23.7 | 5.0E−03 | 6.3E−01 | 3.1E+00 | 115.6 |
| 111 | equals to XT Case A | | | | | |
| 112 | 27.4 | 26.6 | 1.9E−03 | 3.3E−01 | 1.3E+00 | 114.2 |
| 113 | 2c | 25.9 | 5.2E−04 | 9.9E−02 | 3.9E−01 | 110.1 |
| 114 | equals to XT Case A | | | | | |
| 115 | 2c | 30.0 | 1.4E−05 | 6.4E−03 | 2.9E−02 | 102.2 |
| 116 | 2c | 31.1 | 8.4E−06 | 5.0E−03 | 2.3E−02 | 101.3 |
| 117 | 2c | 29.6 | 8.3E−05 | 2.8E−02 | 1.3E−01 | 105.4 |
| 118 | equals to XT Case A | | | | | |
| 119 | 25.0 | 29.8 | 6.6E−05 | 2.5E−02 | 1.0E−01 | 107.6 |
| 120 | equals to XT Case A | | | | | |

Fig.19A

| | XT Case A | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 121 | 2c | 25.8 | 4.4E−04 | 8.2E−02 | 2.7E−01 | 110.5 |
| 122 | ODmin > 126 μm | | | | | |
| 123 | 31.7 | 21.1 | 3.1E−02 | 2.1E+00 | 9.8E+00 | 121.4 |
| 124 | 31.4 | 21.5 | 1.6E−02 | 1.2E+00 | 5.7E+00 | 119.3 |
| 125 | 26.6 | 27.8 | 9.6E−05 | 2.8E−02 | 1.0E−01 | 107.2 |
| 126 | 26.6 | 27.8 | 9.1E−05 | 2.6E−02 | 9.9E−02 | 107.0 |
| 127 | 31.6 | 21.2 | 4.2E−02 | 3.4E+00 | 1.1E+01 | 123.4 |
| 128 | 30.4 | 22.7 | 5.7E−03 | 6.4E−01 | 2.1E+00 | 117.0 |
| 129 | 28.9 | 24.7 | 3.4E−03 | 4.4E−01 | 1.3E+00 | 117.4 |
| 130 | 28.8 | 24.9 | 3.0E−03 | 4.0E−01 | 1.2E+00 | 117.0 |
| 131 | 2c | 26.3 | 3.4E−04 | 6.8E−02 | 2.2E−01 | 110.2 |
| 132 | 29.9 | 23.5 | 1.4E−02 | 1.4E+00 | 3.9E+00 | 120.9 |
| 133 | 27.2 | 27.0 | 2.1E−04 | 5.1E−02 | 1.7E−01 | 109.3 |
| 134 | ODmin > 126 μm | | | | | |
| 135 | 30.4 | 22.7 | 1.1E−02 | 9.6E−01 | 4.1E+00 | 118.2 |
| 136 | 29.5 | 23.9 | 1.4E−02 | 1.5E+00 | 5.4E+00 | 119.6 |
| 137 | 2c | 23.5 | 3.1E−03 | 4.0E−01 | 1.5E+00 | 115.0 |
| 138 | 30.7 | 22.3 | 2.0E−02 | 1.7E+00 | 4.9E+00 | 121.5 |
| 139 | 29.7 | 23.7 | 3.4E−03 | 4.0E−01 | 1.2E+00 | 115.7 |
| 140 | 27.4 | 26.7 | 3.0E−04 | 6.5E−02 | 2.2E−01 | 110.2 |
| 141 | 28.3 | 25.6 | 1.3E−03 | 2.1E−01 | 6.2E−01 | 113.7 |
| 142 | 30.0 | 23.3 | 5.1E−02 | 4.6E+00 | 2.1E+01 | 122.0 |
| 143 | 30.0 | 23.3 | 5.1E−02 | 4.6E+00 | 2.1E+01 | 122.0 |
| 144 | 2c | 22.5 | 1.2E−02 | 1.1E+00 | 5.2E+00 | 118.5 |
| 145 | 2c | 22.5 | 1.2E−02 | 1.1E+00 | 5.2E+00 | 118.5 |
| 146 | 2c | 21.9 | 1.5E−02 | 1.3E+00 | 5.9E+00 | 119.2 |
| 147 | 29.5 | 24.0 | 6.5E−03 | 7.7E−01 | 2.1E+00 | 119.1 |
| 148 | 27.1 | 27.1 | 1.5E−04 | 3.8E−02 | 1.3E−01 | 108.5 |
| 149 | 29.6 | 23.8 | 2.7E−02 | 2.7E+00 | 1.2E+01 | 120.3 |
| 150 | 2c | 22.4 | 9.5E−03 | 9.2E−01 | 4.0E+00 | 117.9 |
| 151 | 2c | 28.2 | 3.1E−05 | 1.1E−02 | 4.2E−02 | 104.8 |
| 152 | 2c | 22.4 | 9.8E−03 | 9.6E−01 | 4.2E+00 | 118.0 |
| 153 | 29.3 | 24.2 | 1.5E−02 | 1.7E+00 | 6.7E+00 | 119.0 |
| 154 | 2c | 22.4 | 7.5E−03 | 7.6E−01 | 3.1E+00 | 117.3 |
| 155 | 2c | 22.6 | 7.0E−03 | 7.5E−01 | 3.1E+00 | 117.1 |
| 156 | 2c | 24.4 | 2.8E−03 | 3.9E−01 | 1.5E+00 | 114.7 |
| 157 | 29.0 | 24.6 | 8.3E−03 | 1.0E+00 | 3.9E+00 | 117.8 |
| 158 | 32.6 | 19.9 | 1.7E−01 | 8.1E+00 | 2.3E+01 | 125.7 |
| 159 | 28.8 | 24.9 | 4.9E−03 | 6.6E−01 | 2.3E+00 | 116.8 |
| 160 | 31.3 | 21.6 | 2.1E−02 | 1.6E+00 | 6.3E+00 | 120.3 |

*Fig.19B*

| | XT Case B | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 121 | equals to XT Case A | | | | | |
| 122 | 29.2 | 24.3 | 2.5E−02 | 2.8E+00 | 1.3E+01 | 119.7 |
| 123 | 2c | 25.3 | 2.2E−03 | 3.6E−01 | 1.7E+00 | 113.1 |
| 124 | 2c | 24.8 | 1.8E−03 | 2.9E−01 | 1.4E+00 | 112.6 |
| 125 | 2c | 30.1 | 1.3E−05 | 6.1E−03 | 2.6E−02 | 102.4 |
| 126 | 2c | 30.1 | 1.2E−05 | 6.1E−03 | 2.6E−02 | 102.4 |
| 127 | 27.0 | 27.2 | 5.2E−04 | 1.1E−01 | 4.1E−01 | 111.4 |
| 128 | 2c | 27.7 | 1.4E−04 | 3.6E−02 | 1.5E−01 | 107.1 |
| 129 | 2c | 30.0 | 3.5E−05 | 1.5E−02 | 5.9E−02 | 106.8 |
| 130 | 2c | 29.5 | 5.8E−05 | 2.1E−02 | 8.5E−02 | 107.8 |
| 131 | equals to XT Case A | | | | | |
| 132 | 25.6 | 29.1 | 1.2E−04 | 3.9E−02 | 1.5E−01 | 109.7 |
| 133 | 2c | 30.3 | 1.2E−05 | 6.0E−03 | 2.5E−02 | 102.7 |
| 134 | 28.0 | 26.0 | 7.9E−03 | 1.0E+00 | 4.3E+00 | 116.3 |
| 135 | 2c | 24.6 | 3.1E−03 | 4.0E−01 | 1.7E+00 | 114.4 |
| 136 | 2c | 29.1 | 3.5E−04 | 9.0E−02 | 4.0E−01 | 109.3 |
| 137 | equals to XT Case A | | | | | |
| 138 | 26.3 | 28.2 | 2.2E−04 | 5.0E−02 | 1.8E−01 | 109.9 |
| 139 | 2c | 27.0 | 2.8E−04 | 5.5E−02 | 1.9E−01 | 109.3 |
| 140 | 2c | 27.0 | 2.4E−04 | 5.5E−02 | 1.8E−01 | 109.6 |
| 141 | 2c | 28.4 | 1.0E−04 | 3.2E−02 | 1.2E−01 | 108.0 |
| 142 | 2c | 28.2 | 2.9E−03 | 5.5E−01 | 2.8E+00 | 112.2 |
| 143 | 2c | 28.2 | 2.9E−03 | 5.4E−01 | 2.7E+00 | 112.2 |
| 144 | equals to XT Case A | | | | | |
| 145 | equals to XT Case A | | | | | |
| 146 | equals to XT Case A | | | | | |
| 147 | 25.2 | 29.5 | 5.5E−05 | 2.1E−02 | 8.4E−02 | 108.1 |
| 148 | 2c | 29.7 | 1.5E−05 | 7.0E−03 | 2.9E−02 | 103.4 |
| 149 | 2c | 28.2 | 1.8E−03 | 3.5E−01 | 1.7E+00 | 111.6 |
| 150 | equals to XT Case A | | | | | |
| 151 | equals to XT Case A | | | | | |
| 152 | equals to XT Case A | | | | | |
| 153 | 2c | 28.1 | 1.1E−03 | 2.3E−01 | 1.1E+00 | 111.1 |
| 154 | equals to XT Case A | | | | | |
| 155 | equals to XT Case A | | | | | |
| 156 | equals to XT Case A | | | | | |
| 157 | 2c | 28.1 | 7.2E−04 | 1.6E−01 | 7.0E−01 | 110.8 |
| 158 | 27.5 | 26.6 | 2.1E−03 | 3.1E−01 | 1.3E+00 | 112.3 |
| 159 | 2c | 28.0 | 4.8E−04 | 1.1E−01 | 4.7E−01 | 110.5 |
| 160 | 2c | 26.0 | 1.3E−03 | 1.9E−01 | 8.2E−01 | 111.6 |

Fig.20A

| | XT Case A | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 161 | 2c | 23.7 | 2.8E−03 | 3.7E−01 | 1.3E+00 | 114.9 |
| 162 | 2c | 24.4 | 1.6E−03 | 2.4E−01 | 8.1E−01 | 113.6 |
| 163 | 28.5 | 25.2 | 2.9E−03 | 4.2E−01 | 1.4E+00 | 115.9 |
| 164 | 2c | 25.4 | 8.2E−04 | 1.4E−01 | 4.5E−01 | 112.0 |
| 165 | 28.3 | 25.5 | 1.8E−03 | 2.7E−01 | 8.7E−01 | 115.3 |
| 166 | 27.5 | 26.6 | 3.2E−04 | 6.9E−02 | 2.3E−01 | 110.3 |
| 167 | 29.5 | 24.0 | 1.4E−03 | 1.8E−01 | 5.4E−01 | 113.5 |
| 168 | 28.2 | 25.7 | 1.1E−03 | 1.8E−01 | 5.5E−01 | 113.1 |
| 169 | 28.3 | 25.5 | 9.8E−04 | 1.6E−01 | 4.6E−01 | 113.2 |
| 170 | 28.0 | 25.9 | 6.5E−04 | 1.2E−01 | 3.5E−01 | 112.3 |
| 171 | 30.3 | 23.0 | 1.5E−02 | 1.6E+00 | 3.5E+00 | 121.8 |
| 172 | 30.3 | 23.0 | 1.5E−02 | 1.6E+00 | 3.5E+00 | 121.8 |
| 173 | 30.1 | 23.1 | 1.3E−02 | 1.4E+00 | 3.0E+00 | 121.6 |
| 174 | 27.9 | 26.0 | 5.0E−04 | 9.3E−02 | 2.8E−01 | 111.6 |
| 175 | 27.9 | 26.1 | 5.5E−04 | 1.0E−01 | 3.1E−01 | 111.9 |
| 176 | 29.0 | 24.6 | 3.2E−03 | 4.2E−01 | 1.1E+00 | 117.5 |
| 177 | 27.2 | 27.0 | 1.6E−04 | 4.0E−02 | 1.3E−01 | 109.0 |
| 178 | 27.9 | 26.0 | 8.0E−04 | 1.4E−01 | 4.6E−01 | 112.3 |
| 179 | 30.3 | 22.9 | 2.3E−02 | 2.2E+00 | 5.6E+00 | 122.4 |
| 180 | 28.2 | 25.7 | 8.3E−04 | 1.4E−01 | 4.1E−01 | 112.9 |
| 181 | 2c | 26.6 | 2.7E−04 | 5.9E−02 | 1.9E−01 | 110.3 |
| 182 | 28.5 | 25.2 | 1.5E−03 | 2.3E−01 | 6.4E−01 | 114.3 |
| 183 | 27.4 | 26.7 | 2.2E−04 | 5.0E−02 | 1.6E−01 | 109.8 |
| 184 | 27.8 | 26.1 | 2.1E−03 | 3.5E−01 | 1.4E+00 | 113.7 |
| 185 | 2c | 25.9 | 1.2E−03 | 1.7E−01 | 6.3E−01 | 111.7 |
| 186 | 2c | 25.9 | 1.2E−03 | 1.7E−01 | 6.4E−01 | 111.6 |
| 187 | 29.5 | 24.0 | 3.7E−03 | 3.9E−01 | 1.0E+00 | 116.1 |
| 188 | 29.9 | 23.5 | 1.1E−02 | 1.2E+00 | 1.4E+04 | 120.6 |
| 189 | 28.0 | 25.9 | 5.8E−04 | 1.1E−01 | 5.8E+01 | 112.2 |
| 190 | 2c | 25.7 | 4.3E−04 | 7.9E−02 | 2.3E−01 | 111.4 |
| 191 | 28.5 | 25.2 | 1.4E−03 | 2.1E−01 | 5.9E−01 | 114.2 |
| 192 | 29.6 | 23.8 | 6.7E−03 | 7.7E−01 | 1.9E+00 | 119.6 |
| 193 | 29.0 | 24.6 | 2.1E−03 | 2.4E−01 | 6.4E−01 | 114.8 |
| 194 | 29.6 | 23.9 | 6.7E−03 | 7.8E−01 | 2.0E+00 | 119.6 |
| 195 | 29.0 | 24.6 | 2.8E−03 | 3.7E−01 | 9.8E−01 | 117.5 |

Fig.20B

| | XT Case B | | | | | |
|---|---|---|---|---|---|---|
| | Λmin | OCTmax | Leakage loss at OCTmax | | | ODmin |
| | | | at 1310nm | at 1550nm | at 1625nm | |
| # ＼Unit | [μm] | [μm] | [dB/km] | | | [μm] |
| 161 | equals to XT Case A | | | | | |
| 162 | equals to XT Case A | | | | | |
| 163 | 2c | 28.0 | 3.2E-04 | 8.0E-02 | 3.2E-01 | 110.4 |
| 164 | equals to XT Case A | | | | | |
| 165 | 2c | 28.0 | 2.2E-04 | 5.7E-02 | 2.2E-01 | 110.2 |
| 166 | 2c | 26.7 | 3.1E-04 | 6.6E-02 | 2.2E-01 | 110.1 |
| 167 | 2c | 26.3 | 2.3E-04 | 4.3E-02 | 1.4E-01 | 108.8 |
| 168 | 2c | 27.9 | 1.5E-04 | 4.2E-02 | 1.5E-01 | 108.7 |
| 169 | 2c | 28.2 | 8.9E-05 | 2.7E-02 | 9.5E-02 | 107.9 |
| 170 | 2c | 27.9 | 1.0E-04 | 3.0E-02 | 1.0E-01 | 108.3 |
| 171 | 26.3 | 28.2 | 1.3E-04 | 4.0E-02 | 1.3E-01 | 111.4 |
| 172 | 26.3 | 28.2 | 1.3E-04 | 4.0E-02 | 1.3E-01 | 111.4 |
| 173 | 26.1 | 28.3 | 9.4E-05 | 3.4E-02 | 1.1E-01 | 111.2 |
| 174 | 2c | 26.9 | 2.2E-04 | 5.1E-02 | 1.7E-01 | 109.8 |
| 175 | 2c | 27.5 | 1.6E-04 | 4.1E-02 | 1.4E-01 | 109.1 |
| 176 | 24.8 | 30.0 | 2.4E-05 | 1.1E-02 | 4.4E-02 | 106.6 |
| 177 | 2c | 29.5 | 1.7E-05 | 7.6E-03 | 3.0E-02 | 104.0 |
| 178 | 2c | 27.0 | 3.4E-04 | 7.6E-02 | 2.7E-01 | 110.3 |
| 179 | 26.1 | 28.3 | 2.1E-04 | 6.1E-02 | 2.1E-01 | 111.5 |
| 180 | 2c | 27.6 | 1.5E-04 | 3.9E-02 | 1.3E-01 | 109.1 |
| 181 | equals to XT Case A | | | | | |
| 182 | 24.4 | 30.6 | 1.2E-05 | 6.1E-03 | 2.5E-02 | 103.5 |
| 183 | 2c | 29.5 | 1.7E-05 | 7.8E-03 | 3.0E-02 | 104.2 |
| 184 | 2c | 26.3 | 1.9E-03 | 3.2E-01 | 1.3E+00 | 113.3 |
| 185 | equals to XT Case A | | | | | |
| 186 | equals to XT Case A | | | | | |
| 187 | 2c | 28.4 | 7.2E-05 | 2.1E-02 | 7.1E-02 | 107.1 |
| 188 | 25.7 | 28.9 | 8.9E-05 | 3.1E-02 | 1.8E+00 | 109.8 |
| 189 | 2c | 27.3 | 1.5E-04 | 4.0E-02 | 3.8E+00 | 109.3 |
| 190 | equals to XT Case A | | | | | |
| 191 | 24.4 | 30.7 | 1.0E-05 | 5.4E-03 | 2.2E-02 | 103.4 |
| 192 | 25.5 | 29.1 | 5.2E-05 | 2.0E-02 | 7.1E-02 | 109.0 |
| 193 | 2c | 29.4 | 2.5E-05 | 9.9E-03 | 3.6E-02 | 105.1 |
| 194 | 25.4 | 29.3 | 5.3E-05 | 2.0E-02 | 7.4E-02 | 108.8 |
| 195 | 2c | 28.7 | 6.6E-05 | 2.3E-02 | 8.1E-02 | 109.3 |

MINIMUM CLADDING DIAMETER [μm]
125
120
115
110
105
100
95
6
7
8
9
2a [μm]
121
189
148
191
121
189
148
191

MINIMUM CLADDING DIAMETER [μm]
150
145
140
135
130
125
120
115
110
105
100
0.2
0.4
0.6
0.8
a/b
121
189
148
191
121
189
148
191

MINIMUM CLADDING DIAMETER [μm]
150
145
140
135
130
125
120
115
110
105
100
0.2
0.4
0.6
0.8
b/c
121
189
148
191
121
189
148
191

*Fig.30A*

| OPTICAL CHARACTERISTICS | λcc≦ 1260nm | 8μm≦MFD ≦10.1μm | BENDING LOSS (R=5mm) | BENDING LOSS (R=3mm) 0.25dB/turn OR LESS | 1300nm≦λ0 ≦1324nm |
|---|---|---|---|---|---|
| #121 | 2a≦7.01μm<br>0.385≦a/b<br>0.597≦b/c<br>Δ1≦0.409%<br>Δ2≦0.071%<br>-0.566%≦Δ3<br>-0.015%≦Δ4 | 5.12μm≦2a≦10.86μm<br>a/b≦0.556<br>0.247%≦Δ1≦0.456%<br>-0.034%≦Δ2≦0.192% | 5.28μm≦2a<br>a/b≦0.591<br>b/c≦0.729<br>Δ3≦-0.245% | 6.13μm≦2a<br>0.332≦a/b≦0.486<br>b/c≦0.648<br>0.323%≦Δ1<br>Δ3≦-0.418% | 6.16μm≦2a≦8.72μm<br>0.375≦a/b≦0.473<br>b/c≦0.872<br>0.266%≦Δ1<br>-0.233%≦Δ2≦0.174%<br>Δ3≦-0.284% |
| #189 | 2a≦8.08μm<br>0.357≦a/b<br>0.687≦b/c<br>Δ1≦0.403%<br>Δ2≦0.034%<br>-0.694%≦Δ3<br>-0.017%≦Δ4 | 6.31μm≦2a≦11.49μm<br>0.228%≦Δ1≦0.484%<br>-0.113%≦Δ2≦0.147% | 6.73μm≦2a<br>a/b≦0.530<br>b/c≦0.815<br>0.297%≦Δ1<br>Δ3≦-0.271% | b/c≦0.712 | 6.51μm≦2a≦8.18μm<br>0.172%≦Δ1≦0.443%<br>-0.053%≦Δ2≦0.192% |
| #148 | 2a≦7.64μm<br>0.359≦a/b<br>0.695≦b/c<br>Δ1≦0.409%<br>Δ2≦0.060%<br>-1.020%≦Δ3<br>-0.017%≦Δ4 | 5.75μm≦2a≦11.08μm<br>0.238%≦Δ1≦0.469%<br>-0.067%≦Δ2≦0.174% | 6.47μm≦2a<br>a/b≦0.558<br>b/c≦0.819<br>0.261%≦Δ1<br>Δ3≦-0.392% | 7.06μm≦2a<br>0.345≦a/b≦0.435<br>b/c≦0.744<br>0.356%≦Δ1<br>Δ2≦0.066%<br>Δ3≦-0.699% | 5.91μm≦2a≦8.33μm<br>0.264%≦Δ1<br>-0.135%≦Δ2≦0.176% |
| #191 | 2a≦8.25μm<br>0.322≦a/b<br>0.744≦b/c<br>Δ1≦0.412%<br>Δ2≦0.043%<br>-1.426%≦Δ3<br>-0.022%≦Δ4 | 6.38μm≦2a≦11.43μm<br>0.225%≦Δ1≦0.486%<br>-0.115%≦Δ2≦0.151% | 7.14μm≦2a<br>a/b≦0.483<br>b/c≦0.859<br>0.328%≦Δ1<br>Δ2≦0.140%<br>Δ3≦-0.495%<br>Δ4≦0.161% | b/c≦0.779 | 6.27μm≦2a≦8.10μm<br>0.213%≦Δ1≦0.426%<br>-0.037%≦Δ2≦0.177% |

*Fig.30B*

| OPTICAL CHARACTERISTICS | S0≦0.092ps/(nm$^2$·km) | MINIMUM CLADDING DIAMETER 1≦126μm | MINIMUM CLADDING DIAMETER 2≦126μm | MINIMUM CLADDING DIAMETER 3≦126μm | MINIMUM CLADDING DIAMETER 4≦126μm |
|---|---|---|---|---|---|
| #121 | 6.65μm≦2a<br>a/b≦0.410, 0.748≦a/b<br>0.367%≦Δ1<br>Δ2≦0.058%<br>-0.566%≦Δ3 | 0.294≦a/b≦0.873<br>0.429≦b/c≦0.939<br>Δ4≦0.222% | 0.294≦a/b≦0.739<br>0.429≦b/c≦0.809<br>0.245%≦Δ1<br>Δ3≦-0.167%<br>Δ4≦0.167% | 0.332≦a/b≦0.754<br>0.489≦b/c≦0.815<br>Δ4≦0.167% | 0.332≦a/b≦0.591<br>0.489≦b/c≦0.704<br>0.301%≦Δ1<br>Δ3≦-0.317%<br>Δ4≦0.132% |
| #189 | 2a≦9.16μm<br>0.275%≦Δ1<br>Δ2≦0.093% | 0.286≦a/b<br>0.494≦b/c<br>Δ4≦0.196% | 0.286≦a/b≦0.794<br>0.494≦b/c≦0.915<br>0.287%≦Δ1<br>Δ4≦0.196% | 0.323≦a/b≦0.800<br>0.566≦b/c≦0.913<br>0.277%≦Δ1<br>Δ4≦0.157% | 0.323≦a/b≦0.535<br>0.566≦b/c≦0.796<br>0.339%≦Δ1<br>Δ2≦0.118%<br>Δ3≦-0.505%<br>Δ4≦0.082% |
| #148 | 2a≦9.09μm<br>0.349%≦Δ1<br>Δ2≦0.054%<br>-1.118%≦Δ3 | 0.264≦a/b≦0.917<br>0.448≦b/c≦0.993 | 0.264≦a/b≦0.758<br>0.448≦b/c≦0.900<br>0.262%≦Δ1<br>Δ3≦-0.214%<br>Δ4≦0.187% | 0.297≦a/b≦0.770<br>0.510≦b/c≦0.901<br>Δ3≦-0.211% | 0.297≦a/b≦0.583<br>0.510≦b/c≦0.810<br>0.314%≦Δ1<br>Δ3≦-0.477%<br>Δ4≦0.126% |
| #191 | 2a≦9.10μm<br>0.293%≦Δ1<br>Δ2≦0.078% | Δ4≦0.167% | 0.257≦a/b≦0.753<br>0.484≦b/c≦0.941<br>0.302%≦Δ1<br>Δ3≦-0.192%<br>Δ4≦0.110% | 0.292≦a/b≦0.758<br>0.550≦b/c≦0.939<br>0.294%≦Δ1<br>Δ3≦-0.197%<br>Δ4≦0.126% | 0.292≦a/b≦0.486<br>0.550≦b/c≦0.848<br>0.355%≦Δ1<br>Δ2≦0.068%<br>Δ3≦-0.601%<br>Δ4≦0.035% |

*Fig.41*

| | Att. [dB/km] | $\lambda$cc [nm] | MFD [$\mu$m] | $\lambda$0 [nm] | S0 [ps/(nm$^2$·km)] | Macrobend loss [dB/turn] at R=3mm |
|---|---|---|---|---|---|---|
| $\lambda$ [nm] | 1310 | n/a | 1310 | n/a | $\lambda$0 | 1310 |
| #1 | 0.346 | 1238 | 8.5 | 1317.7 | 0.0997 | 0.034 |
| #2 | 0.397 | 1231 | 8.3 | 1320.0 | 0.0995 | 0.027 |
| #3 | 0.394 | 1228 | 8.3 | 1320.2 | 0.0993 | 0.031 |
| #4 | 0.388 | 1226 | 8.4 | 1319.8 | 0.0996 | 0.023 |
| #5 | 0.386 | 1225 | 8.5 | 1319.6 | 0.0999 | 0.027 |
| #6 | 0.389 | 1217 | 8.3 | 1319.7 | 0.1005 | 0.032 |
| #7 | 0.395 | 1229 | 8.3 | 1317.6 | 0.0995 | 0.027 |
| #8 | 0.412 | 1236 | 8.4 | 1317.9 | 0.0995 | 0.028 |

MULTI-CORE OPTICAL FIBER, OPTICAL CABLE, AND OPTICAL CONNECTOR

CROSS-REFERENCE TO RELATED APPLICATIONS

This application is a continuation application of copending prior application Ser. No. 15/080,878, filed on Mar. 25, 2016, which is a continuation application of PCT International Application No. PCT/JP2015/079272, filed on Oct. 16, 2015 claiming the benefits of priorities of the Japanese Patent Applications No. 2014-215401 filed on Oct. 22, 2014 and No. 2015-044957 filed on Mar. 6, 2015, the entire contents of which are incorporated herein by reference. The co-pending application Ser. No. 15/080,878 is also incorporated by reference herein in its entirety.

TECHNICAL FIELD

The present invention relates to a multi-core optical fiber (hereinafter referred to as "MCF"), an optical cable, and an optical component such as an optical connector (including an array), and to an optical component required to allow for higher density of optical fibers of standard size to be applied thereto.

BACKGROUND ART

The MCF having a plurality of cores extending along a fiber axis in a common cladding is expected as an optical transmission line capable of transmitting a large capacity of information. On the MCF, various studies have been conducted for the purpose of transmitting a larger capacity of information (e.g., cf. Non Patent Literatures 1 to 7).

Non Patent Literatures 1 and 2 disclose the theories and simulation results about crosstalk between neighboring cores. Furthermore, Non Patent Literatures 3 to 7 disclose the theories and prototyping results about trench-assisted optical fibers.

CITATION LIST

Non Patent Literatures

Non. Patent Literature 1: Koshiba, et al., "Heterogeneous multi-core fibers: proposal and design principle," IEICE Electronics Express, 2009, Vol. 6, No. 2, pp. 98-103

Non Patent Literature 2: Tetsuya Hayashi, "Multi-core Fiber for High-Capacity Spatially-Multiplexed Transmission," [online], Sep. 25, 2013, HOKKAIDO UNIVERSITY, Internet <URL http://eprints.lib.hokudai.ac.jp/dspace/handle/2115/53805>

Non Patent Literature 3: Saitoh, et al., "Multi-core Hole-Assisted Fibers for High Core Density Space Division Multiplexing," OECC2010, 7C2-1

Non Patent Literature 4: Taylor, et al., "Demonstration of multi-core photonic crystal fibre in an optical interconnect," ELECTRONICS LETTERS, 2006, Vol. 42, No. 6, p. 331

Non Patent Literature 5: Imamura, et al., "Multi-core holey fibers for the long-distance (>100 km) ultra large capacity transmission," OFC2009, OTuC3

Non Patent Literature 6: Hayashi, et al., "Ultra-Low-Crosstalk Multi-core Fiber Feasible to Ultra-Long-Haul Transmission," OFC2011, PDPC2

Non Patent Literature 7: Sakamoto, et al., "Crosstalk Suppressed Hole-assisted 6-core Fiber with Cladding Diameter of 125 μm," ECOC2013, Mo.3.A.3

SUMMARY OF INVENTION

Technical Problem

The inventors conducted research on the conventional MCFs and found the problem as described below. Specifically, in the MCFs as described in above Non Patent Literatures 1 to 7, it is necessary to increase the core pitch Λ, for reducing XT, without making the mode field diameter (hereinafter referred to as "MID") too small (or while keeping it large). However, if the cores are arranged with increase in core pitch within the limited diameter of the common cladding, i.e., within the cladding diameter (hereinafter referred to "OD"), the number of cores will decrease. On the other hand, if the number of cores is increased with increase in core pitch, the OD will increase.

The MCFs as described in above Non Patent Literatures 1 to 7 have the optical characteristics suitable for long-haul large-capacity transmission. Specifically, in the C-band (1530 nm to 1565 nm), the transmission loss TL is low and the chromatic dispersion CD is high, and the cable cutoff wavelength $\lambda_{cc}$ is significantly larger than 1260 nm, for suppressing XT with the core pitch as short as possible while keeping the effective core cross-sectional area Aeff large. $\lambda_{cc}$ is, for example, approximately not less than 1300 nm, not less than 1400 nm, and a little smaller than 1530 nm.

Therefore, these MCFs are not suitable for transmission in the O-band (1260 nm to 1360 nm) where CD is low when made of common silica glass (silica-based glass). Furthermore, the foregoing MCFs have high CD in the single-mode operation band because they are not configured so that CD is low in the C-band as in dispersion-shifted fibers.

It is known from the below Reference Literatures and others that in the MCF, a leakage loss LL (dB/km) of core-mode light from the core to the coating worsens when the shortest distance (outmost core-cladding thickness (OCT: Outer Cladding Thickness)) between the core center of the core OC located closest to the outer periphery (the outmost core) and the surface of the cladding (coating) is small.

Reference Literature 1: T. Hayashi, T. Taru, O. Shimakawa, T. Sasaki, and E. Sasaoka, "Design and fabrication of ultra-low crosstalk and low-loss multi-core fiber," Opt. Express, Vol. 19, No. 17, pp. 16576-16592, August 2011

Reference Literature 2: K. Takenaga, Y. Arakawa, Y. Sasaki, S. Tanigawa, S. Matsuo, K. Saitoh, and M. Koshiba, "A Large Effective Area Multi-Core Fibre with an Optimised Cladding Thickness," in Eur. Conf. Opt. Commun. (ECOC), 2011, p.Mo.1.LeCervin.2.

Reference Literature 3: K. Takenaga, Y. Arakawa, Y. Sasaki, S. Tanigawa, S. Matsuo, K. Saitoh, and M. Koshiba, "A large effective area multi-core fiber with an optimized cladding thickness," Opt. Express, Vol. 19, No. 26, pp. B543-B550, November 2011

FIG. 1 is a graph showing a relation between radial distance from the core center of OC and refractive index (hereinafter referred to as "RI") difference with respect to the RI of the cladding. As shown in FIG. 1, the RI of the coating of the optical fiber is significantly higher than that of the cladding (and also higher than that of the core). This is for suppressing propagation of light leaking into the cladding. In such an optical fiber, if a core is arranged at a position close to the coating, light guided in the core will be coupled to the coating to leak.

FIG. 2 is a graph showing a relation between OCT and LL at wavelength λ. As shown in FIG. 2, it is known that LL exponentially increases with decreasing OCT. For reducing degradation of signal-to-noise ratio due to increase of TL as much as possible, it is desirable to reduce LL to a negligible level. For example, the above Reference Literatures 1 to 3 clearly specify or suggest that LL should be desirably controlled to 0.001 dB/km or less at the wavelength of 1625 nm.

For enhancing utilization efficiency of the cross section of MCF, i.e., for packing a larger number of cores in the cross section of MCF, OCT needs to be made smaller. For reducing LL while making OCT smaller, it is conceivable to decrease the RI of the coating. In this case, however, propagation of the cladding mode becomes easier and it becomes easier to cause multi-path interference (MPI) due to recoupling of the cladding mode to the core mode, or the like. This will facilitate degradation of signal quality of signal light propagating in the core. For preventing this degradation of signal quality of signal light, for example, the above Reference Literature 1 specifies that OCT must be not less than 30 μm. Furthermore, the above Reference Literatures 2 and 3 specify that OCT must be not less than about 40 μm.

As described above, there is no known MCF that realizes the optical characteristics suitable for transmission of optical signals, such as moderately large MFD, low inter-neighboring-core crosstalk XT, and low secondary inter-neighboring-core talk (crosstalk between a core concerned and another neighboring core neighboring to the concerned core) XTs, with the same OD as the OD of 125±1 μm of a conventional standard single-mode fiber (SSMF), while including eight or more cores.

The present invention has been accomplished in order to solve the above problem and it is an object of the present invention to provide an MCF, optical cable, and optical connector realizing optical characteristics satisfactorily suitable for short-haul transmission, while including eight or more cores in the cladding with the diameter of not more than 126 μm.

Solution to Problem

An MCF according to an embodiment of the invention comprises: a core group consisting of eight or more cores; an inner cladding group consisting of inner claddings each of which individually surrounds a corresponding core out of the eight or more cores; a trench group consisting of trenches each of which individually surrounds a corresponding inner cladding out of the inner claddings; a common cladding individually surrounding each of the trenches; and a resin coating surrounding the common cladding. In the MCF, each of the cores, each of the inner claddings, each of the trenches, and the common cladding are comprised of silica-based glass. A diameter of the common cladding is not more than 126 μm. Where relative RI differences of each core, each inner cladding, each trench, the common cladding, and the coating with respect to a predetermined RI are defined as Δ1, Δ2, Δ3, Δ4, and Δ5, respectively, each core, each inner cladding, each trench, the common cladding, and the coating satisfy the following conditions: $\Delta5>\Delta1>\Delta2>\Delta3$; and $\Delta1>\Delta4>\Delta3$. Optical characteristics of each core are as follows: a TL is not more than 0.5 dB/km or not more than 0.4 dB/km at a wavelength of 1310 nm. An MFD is from 8.0 μm to 10.1 μm at the wavelength of 1310 nm. A bending loss BL in a bending radius BR of not less than 5 mm or in the BR of not less than 3 mm and, less than 5 min is not more than 0.25 dB/turn at the wavelength of 1310 nm. A zero dispersion wavelength λ0 is from 1300 nm to 1324 nm. λcc is not more than 1260 nm. An XT or XTs is not more than 0.001/km at the wavelength of 1310 nm. The BR shall include a radius of curvature CR.

Advantageous Effects of Invention

The embodiment of the invention can provide the MCF, optical cable, and optical connector realizing the optical characteristics satisfactorily suitable for short-haul transmission, while including the eight or more cores in the common cladding with the diameter of not more than 126 μm.

BRIEF DESCRIPTION OF DRAWINGS

FIGS. 6A and 6B are tables showing RI profiles (refractive index profiles) of cores and optical characteristics of cores, of multiple samples (sample numbers #1 to #40).

FIGS. 7A and 7B are tables showing RI profiles of cores and optical characteristics of cores, of multiple samples (sample numbers #41 to #80).

FIGS. 8A and 8B are tables showing RI profiles of cores and optical characteristics of cores, of multiple samples (sample numbers #81 to #120).

FIGS. 9A and 9B are tables showing RI profiles of cores and optical characteristics of cores, of multiple samples (sample numbers #121 to #160).

FIGS. 10A and 10B are tables showing RI x profiles of cores and optical characteristics of cores, of multiple samples (sample numbers #161 to #195).

FIG. 11 is a table showing OCTs at respective LLs at the wavelength 1310 nm, of samples #1 to #40.

FIG. 12 is a table showing OCTs at respective LLs at the wavelength 1310 nm, of samples #41 to #80.

FIG. 13 is a table showing OCTs at respective LLs at the wavelength 1310 nm, of samples #81 to #120.

FIG. 14 is a table showing OCTs at respective LLs at the wavelength 1310 nm, of samples #121 to #160.

FIG. 15 is a table showing OCTs at respective LLs at the wavelength 1310 nm, of samples #161 to #195.

FIGS. 16A and 16B are tables showing neighboring core pitches (center-center distances between neighboring cores) Λ, maxima of OCT, LLs at the maxima of OCT, and minima of OD with XT at the wavelength 1310 nm being not more than a predetermined value, of samples #1 to #40.

FIGS. 17A and 17B are tables showing the Λs, maxima of OCT, LLs at the maxima of OCT, and minima of OD with XT at the wavelength 1310 nm being not more than the predetermined value, of samples #41 to #80.

FIGS. 18A and 18B are tables showing the Λs, maxima of OCT, LLs at the maxima of OCT, and minima of OD with XT at the wavelength 1310 nm being not more than the predetermined value, of samples #81 to #120.

FIGS. 19A and 19B are tables showing the Λs, maxima of OCT, LLs at the maxima of OCT, and minima of OD with XT at the wavelength 1310 nm being not more than the predetermined value, of samples #121 to #160.

FIGS. 20A and 20B are tables showing the Λs, maxima of OCT, LLs at the maxima of OCT, and minima of OD with XT at the wavelength 1310 nm being not more than the predetermined value, of samples #161 to #195.

FIGS. 30A and 30B are tables showing desired ranges of RI parameters.

FIG. 41 is a table showing optical characteristics in the O-band (1260 to 1360 nm) of respective cores in an MCF according to a specific example.

DESCRIPTION OF EMBODIMENTS

Description of Embodiment of Present Invention

Figure 1:
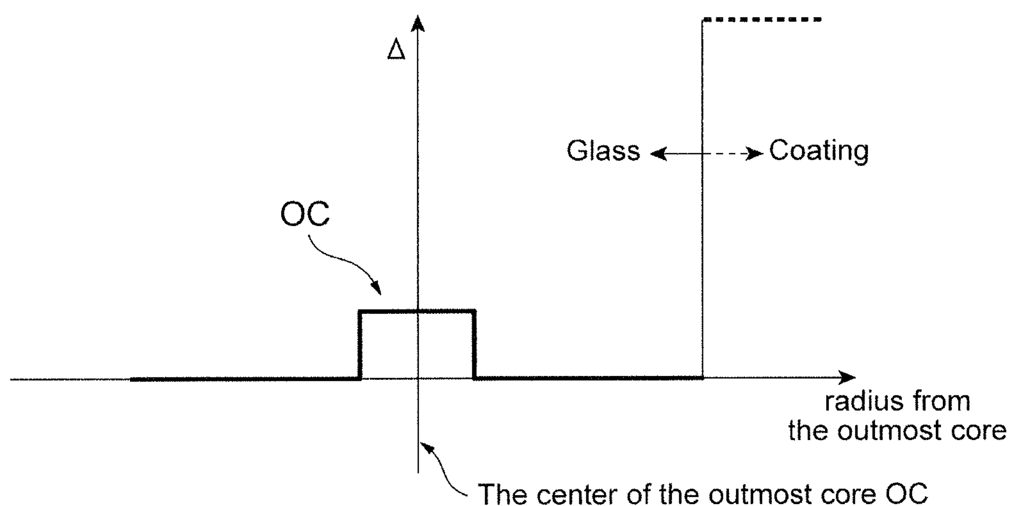
FIG. 1 is a graph showing a relation between radial distance from the core center of the outmost core OC and RI difference (refractive index difference) with respect to the RI (refractive index) of the cladding.
Figure 2:
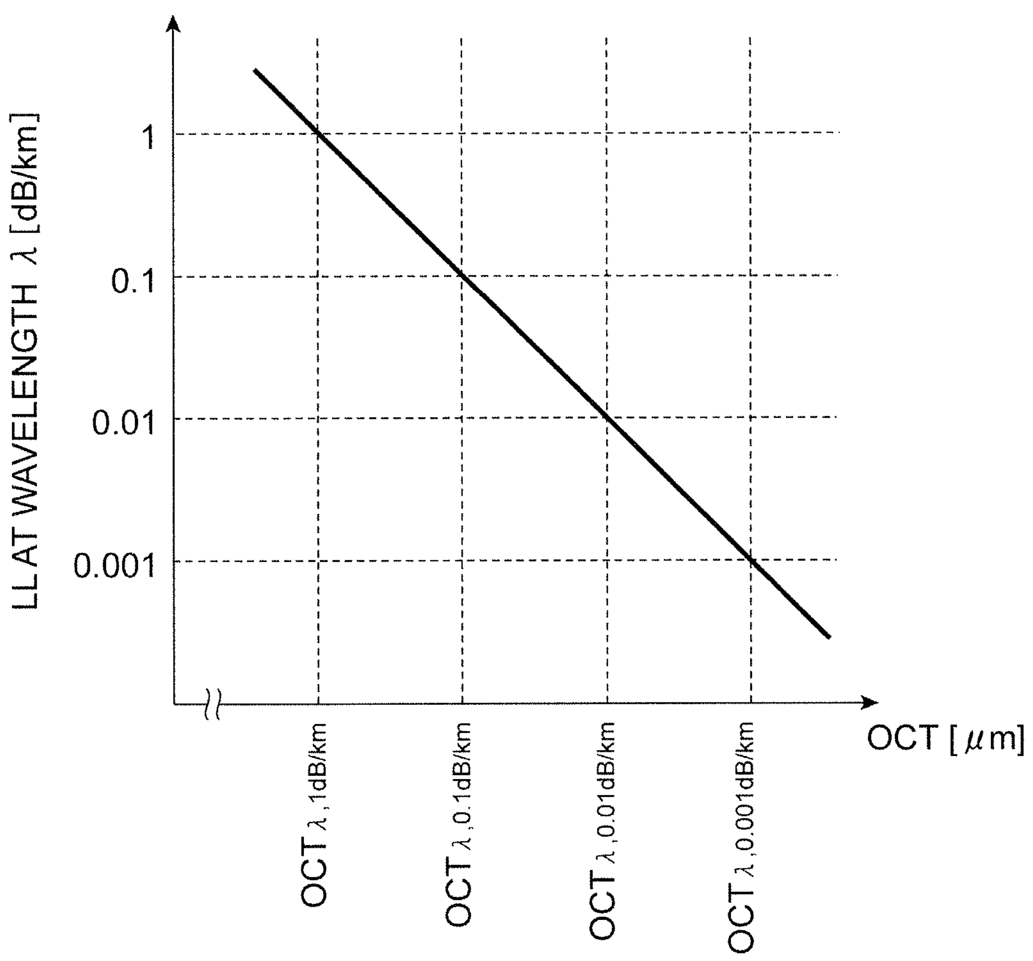
FIG. 2 is a graph showing a relation between OCT and LL at wavelength λ.

Contents of the embodiment of the present invention will be first described as individually enumerated below.

(1) One aspect of the MCF according to the embodiment of the invention comprises: a core group consisting of eight or more cores; an inner cladding group consisting of inner claddings each of which individually surrounds a corresponding core out of the eight or more cores; a trench group consisting of trenches each of which individually surrounds a corresponding inner cladding out of the inner claddings; a common cladding individually surrounding each of the trenches; and a resin coating surrounding the common cladding. In the MCF, each of the cores, each of the inner claddings, each of the trenches, and the common cladding are comprised of silica-based glass. A diameter of the common cladding is not more than 126 μm. Where relative RI differences of each core, each inner cladding, each trench, the common cladding, and the coating with respect to a predetermined RI are defined as Δ1, Δ2, Δ3, Δ4, and Δ5, respectively, each core, each inner cladding, each trench, the common cladding, and the coating satisfy the following conditions: Δ5>Δ1>Δ2>Δ3; and Δ1>Δ4>Δ3. Optical characteristics of each core are as follows: a TL is not more than 0.5 dB/km or not more than 0.4 dB/km at a wavelength of 1310 nm. An MFD is from 8.0 μm to 10.1 μm at the wavelength of 1310 nm. A BL in a BR of not less than 5 mm or in the BR of not less than 3 mm and, less than 5 mm is not more than 0.25 dB/turn at the wavelength of 1310 nm. λ0 is from 1300 nm to 1324 nm. λcc is not more than 1260 nm. Furthermore, an XT or XTs is not more than 0.001/km at the wavelength of 1310 nm.

Since the MCF has the eight or more cores, the number of spatial channels per cross-sectional area can be made larger. Since it has the trench-assisted RI structure with the inner claddings and trenches, it can enhance the confinement effect of light in the cores. Furthermore, it has the common cladding and the OD is not more than 126 μm. Therefore, the OD is equal to or smaller than that of the conventionally-used SSMF (Standard SMF). Since the MCF has the high-index coating, it can suppress propagation of the cladding mode.

Each core has the TL of not more than 0.5 dB/km or not more 1.0 than 0.4 dB/km at the wavelength of 1310 nm, and thus has the optical characteristics suitable for transmission near the wavelength of 1310 nm. Therefore, the LL is sufficiently small at the wavelength of 1310 nm. Since each core has the MFD of 8.0 μm to 10.1 μm at the wavelength of 1310 nm, a splice loss can be reduced in splice to a system or a component premised on the conventional SSMF. Since each core has the BL of not more than 0.25 dB/turn in the BR of not less than 5 mm or in the BR of less than 5 mm and not less than 3 mm at the wavelength of 1310 nm, a significant TL increase can be restrained even in a case where a fiber bend of a small BR is given.

Since each core has the λ0 of 1300 nm to 1324 nm, the CD in the O-band used in transmission is kept low. Since each core has the λcc of not more than 1260 nm, it can guarantee the single-mode operation in the O-band used in transmission. Since the cores have the XT of not more than 0.001/km at the wavelength of 1310 nm or the XTs of not more than 0.001/kin at the wavelength of 1310 nm, the XT is low in short-haul transmission. Therefore, the optical characteristics satisfactorily suitable for short-haul transmission can be realized while the eight or more cores are included in the cladding with the diameter of not more than 126 μm.

(2) As one aspect of the MCF according to the embodiment of the invention, the OD may be not less than 124 μm. In this case, since the OD of the SSMF is 125±1 μm, it is possible to use the same peripheral components, such as a connector ferrule, as those for the conventionally-used SSMF.

(3) As one aspect of the MCF according to the embodiment of the invention, the MCF may be configured so that the TL of an OC a core center of which is located at a smallest distance from the coating, out of the eight or more cores, is larger than 0.5 dB/km at a wavelength of 1550 nm or at a wavelength of 1625 nm, or, so that the TLs of the eight or more respective cores are larger than 0.4 dB/km at the wavelength of 1550 nm or at the wavelength of 1625 nm. In this case, by adopting a structure to make the OCT small and the LL large at long wavelengths, a larger number of cores or the cores with a larger MFD can be packed in the cladding of about 125 μm. Furthermore, a design margin for manufacturing is expanded to allow for variation in XT and Λ.

(4) As one aspect of the MCF according to the embodiment of the invention, the eight or more cores may be arranged on an identical circumference centered at a center of a cross section of the common cladding. In this case, the core arrangement of a circular ring shape can suppress variation in core pitch and optical characteristics among the cores.

(5) As one aspect of the MCF according to the embodiment of the invention, the eight or more cores may be arranged at equal intervals. In this case, the core arrangement of the circular ring shape can suppress the variation in core pitch and optical characteristics among the cores.

(6) As one aspect of the MCF according to the embodiment of the invention, where Conditions 0 to 10 are defined as below using 2a as a diameter of each core, 2b as a diameter of each inner cladding, and 2c as a diameter of each trench, Δ1, Δ2, Δ3, Δ4, a, b, and c preferably satisfy at least any one of the Conditions 0 to 10.

$$5.27\ \mu m \le 2a \le 8.05\ \mu m$$

$$0.375 \le a/b \le 0.45$$

$$0.478 \le b/c \le 0.816$$

$$0.26\% \le \Delta1-\Delta4 \le 0.42\%$$

$$-0.05\% \le \Delta2-\Delta4 \le 0.15\%$$

$$0.25\% \le \Delta1-\Delta2 \le 0.385\%$$

$$\Delta3-\Delta4 \le -0.5\% \quad \text{(Condition 0)}$$

$$6.16\ \mu m \le 2a \le 7.01\ \mu m$$

$$0.385 \le a/b \le 0.473$$

$$0.597 \le b/c \le 0.729$$

$$0.266\% \le \Delta1 \le 0.409\%$$

$$-0.034\% \le \Delta2 \le 0.071\%$$

$$-0.566\% \le \Delta3 \le -0.284\%$$

$$-0.015\% \le \Delta4 \le 0.222\% \quad \text{(Condition 1)}$$

$$6.73\ \mu m \le 2a \le 8.08\ \mu m$$

$$0.357 \le a/b \le 0.530$$

$$0.687 \le b/c \le 0.815$$

$$0.297\% \le \Delta1 \le 0.403\%$$

$$-0.053\% \le \Delta2 \le 0.034\%$$

$$-0.694\% \le \Delta3 \le -0.271\%$$

$$-0.017\% \le \Delta4 \le 0.196\% \quad \text{(Condition 2)}$$

$$6.47\ \mu m \le 2a \le 7.64\ \mu m$$

$$0.359 \le a/b \le 0.435$$

$$0.695 \le b/c \le 0.819$$

$$0.264\% \le \Delta1 \le 0.409\%$$

$$-0.067\% \le \Delta2 \le 0.060\%$$

$$-1.020\% \le \Delta3 \le -0.392\%$$

$$-0.017\% \le \Delta4 \quad \text{(Condition 3)}$$

$$7.14\ \mu m \le 2a \le 8.10\ \mu m$$

$$0.322 \le a/b \le 0.483$$

$$0.744 \le b/c \le 0.859$$

$$0.328\% \le \Delta1 \le 0.412\%$$

$$-0.037\% \le \Delta2 \le 0.043\%$$

$$-1.426\% \le \Delta3 \le -0.495\%$$

$$-0.022\% \le \Delta4 \le 0.161\% \quad \text{(Condition 4)}$$

$$6.65\ \mu m \le 2a \le 7.01\ \mu m$$

$$0.385 \le a/b \le 0.410$$

$$0.597 \le b/c \le 0.729$$

$$0.367\% \le \Delta1 \le 0.409\%$$

$$-0.034\% \le \Delta2 \le 0.058\%$$

$$-0.566\% \le \Delta3 \le -0.284\%$$

$$-0.015\% \le \Delta4 \le 0.222\% \quad \text{(Condition 5)}$$

$$6.47\ \mu m \le 2a \le 7.64\ \mu m$$

$$0.359 \le a/b \le 0.435$$

$$0.695 \le b/c \le 0.819$$

$$0.349\% \le \Delta1 \le 0.409\%$$

$$-0.067\% \le \Delta2 \le 0.054\%$$

$$-1.020\% \le \Delta3 \le -0.392\%$$

$-0.017\% \leq \Delta 4$ (Condition 6)

$6.16\ \mu m \leq 2a \leq 7.01\ \mu m$ $0.385 \leq a/b \leq 0.473$ $0.597 \leq b/c \leq 0.704$ $0.301\% \leq \Delta 1 \leq 0.409\%$ $-0.034\% \leq \Delta 2 \leq 0.071\%$ $-0.566\% \leq \Delta 3 \leq -0.317\%$ $-0.015\% \leq \Delta 4 \leq 0.132\%$ (Condition 7)

$6.73\ \mu m \leq 2a \leq 8.08\ \mu m$ $0.357 \leq a/b \leq 0.530$ $0.687 \leq b/c \leq 0.796$ $0.339\% \leq \Delta 1 \leq 0.403\%$ $-0.053\% \leq \Delta 2 \leq 0.034\%$ $-0.694\% \leq \Delta 3 \leq -0.505\%$ $-0.017\% \leq \Delta 4 \leq 0.082\%$ (Condition 8)

$6.47\ \mu m \leq 2a \leq 7.64\ \mu m$ $0.359 \leq a/b \leq 0.435$ $0.695 \leq b/c \leq 0.810$ $0.314\% \leq \Delta 1 \leq 0.409\%$ $-0.067\% \leq \Delta 2 \leq 0.060\%$ $-1.020\% \leq \Delta 3 \leq -0.477\%$ $-0.017\% \leq \Delta 4 \leq 0.126\%$ (Condition 9)

$7.14\ \mu m \leq 2a \leq 8.10\ \mu m$ $0.322 \leq a/b \leq 0.483$ $0.744 \leq b/c \leq 0.848$ $0.355\% \leq \Delta 1 \leq 0.412\%$ $-0.037\% \leq \Delta 2 \leq 0.043\%$ $-1.426\% \leq \Delta 3 \leq -0.601\%$ $-0.022\% \leq \Delta 4 \leq 0.035\%$ (Condition 10)

(7) As one aspect of the MCF according to the embodiment of the invention, a cladding mode suppressor is comprised of a glass having a thermal expansion coefficient different from that of the common cladding part excluding the cladding mode suppressor, whereby a stress is applied to each of the eight or more cores. Each of the eight or more cores to which the stress is applied in this manner preferably has a birefringence of not less than $10^{-4}$, or, a polarization crosstalk of not more than −6.9 dB in a fiber length of 30 in to 10 km.

(8) As one aspect of the MCF according to the embodiment of the invention, as an optical characteristic of a cladding mode propagating in a portion (first common cladding) of the common cladding located in a region surrounded by three or more cores in the core group, the BL in the BR of 140 mm may be not less than 19.3 dB/20 m at a wavelength of 1.26 μm.

(9) As one aspect of the MCF according to the embodiment of the invention, a portion (first common cladding) of the common cladding located in a region surrounding by the core group may comprise a cladding mode suppresser a relative RI difference of which with respect to the predetermined RI is lower than Δ4.

(10) As one aspect of the MCF according to the embodiment of the invention, where Conditions 11 to 17 are defined as below, the MCF preferably satisfies at least any one of the Conditions 11 to 17.

(Condition 11)

A neighboring core pitch Λ of the eight or more cores is not less than 23.3 μm, and a shortest distance OCT between a core center of an outmost core OC located closest to an outer periphery side of the common cladding, out of the eight or more cores, and the coating is not less than 17.7 μm.

(Condition 12)

The S0 at the λ0 is not more than 0.092 ps/(nm$^2$·km).

(Condition 13)

The BL in the BR of 3 mm is not more than 0.10 dB/turn at the wavelength of 1310 nm.

(Condition 14)

One core of the eight or more cores is arranged at a center of the common cladding.

(Condition 15)

The eight or more cores have their respective RI profiles (refractive index profiles) which are substantially identical with each other.

(Condition 16)

The eight or more cores have their respective RI profiles which are substantially identical with each other, except for the core arranged at the center of the common cladding.

(Condition 17)

The MCF is an all-solid optical fiber.

When the MCF satisfies the above Condition 11, it becomes easier to realize the optical characteristics satisfactorily suitable for short-haul transmission. When the MCF satisfies the above Condition 12, distortion of signal waveform due to higher-order CD can be suppressed in high-speed transmission. When the MCF satisfies the above Condition 13, increase of TL can be suppressed even under severer conditions. When the MCF satisfies the above Condition 14, it becomes possible to use the MCF as a conventional one-core fiber. When the MCF satisfies the above Condition 15, variation is restrained in transmission characteristics among the cores. When the MCF satisfies the above Condition 16, the center core arranged at the center is subjected to the light confinement effect by the trench layers of the peripheral cores. For this reason, even if the center core is configured by adopting a RI profile with a weaker light confinement effect than that of the peripheral cores, it may realize optical characteristics equivalent to those of the peripheral cores. When the MCF satisfies the above Condition 17, the MCF has no holes and thus there is no need for performing a process of closing holes at a fiber end face (process for preventing intrusion of foreign matter).

(11) One aspect of an optical cable according to the embodiment 1.0 of the invention may include one or more optical fibers each having the same structure as the multi-core optical fiber according to any one of the above aspects.

(12) As one aspect of the optical cable according to the embodiment of the invention, an average BR of the optical fibers in an unbent state of the optical cable may be not more than 1 m, not more than 20 cm, not more than 10 cm, or, not more than 5 cm.

(13) One aspect of an optical connector according to the embodiment of the invention may hold one or more optical fibers each having the same structure as the MCF according to any one of the above aspects.

(14) One aspect of the optical connector according to the embodiment of the invention preferably comprises: a resin ferrule; and four or more MCFs arrayed in the ferrule. In this aspect, each of the MCFs has a common cladding with a diameter of 124 to 126 μm, and two or more cores. As an optical characteristic of each of the two or more cores, an MFD is from 8 to 10.1 μm at a wavelength of 1310 nm. In each of the MCFs, an OC is arranged so that a distance between a core center of the OC out of the two or more cores and a center of a cross section of the common cladding is not more than 45 μm. Projection amounts of end faces of the respective MCFs from an end face of the ferrule are not less than 2 μm, and a variation of the projection amounts among the MCFs is not more than 0.3 μm. The end faces of the MCFs projecting from the end face of the ferrule are preferably polished. The MCFs and the ferrule are preferably fitted to each other by a pressing force of not less than 22 N.

(15) As one aspect of the optical connector according to the embodiment of the invention, at least one of the MCFs has the same structure as the multi-core optical fiber according to any one of claims 1 to 10.

Each of the aspects enumerated in this section of [Description of Embodiment of Present Invention] above is applicable to each of all the remaining aspects or to all combinations of these remaining aspects.

Details of Embodiment of Present Invention

Specific structures of the MCFs and others according to the embodiment of the invention will be described below in detail with reference to the accompanying drawings. It should be noted that the present invention is not limited only to these illustrative examples and is intended for inclusion of all changes within the meaning and scope of equivalency to the scope of claims, as described in the scope of claims.

Since there were the problems of XT, LL, and others as described above, it was technical knowledge among those skilled in the art that it was difficult to realize an MCF including eight or more cores while achieving optical characteristics suitable for transmission of optical signals, with the same OD as the conventional SSMF having the OD of 125±1 μm. The inventors assumed short-haul transmission using the O-band (1260 to 1360 nm) as usage and permitted optical characteristics unsuitable for long-haul transmission using the C-band and others. On this assumption, the inventors discovered that it was feasible to realize an MCF including eight or more cores in the cladding with the diameter of not more than 126 μm, while achieving the optical characteristics satisfactorily suitable for short-haul transmission.

Figure 3:
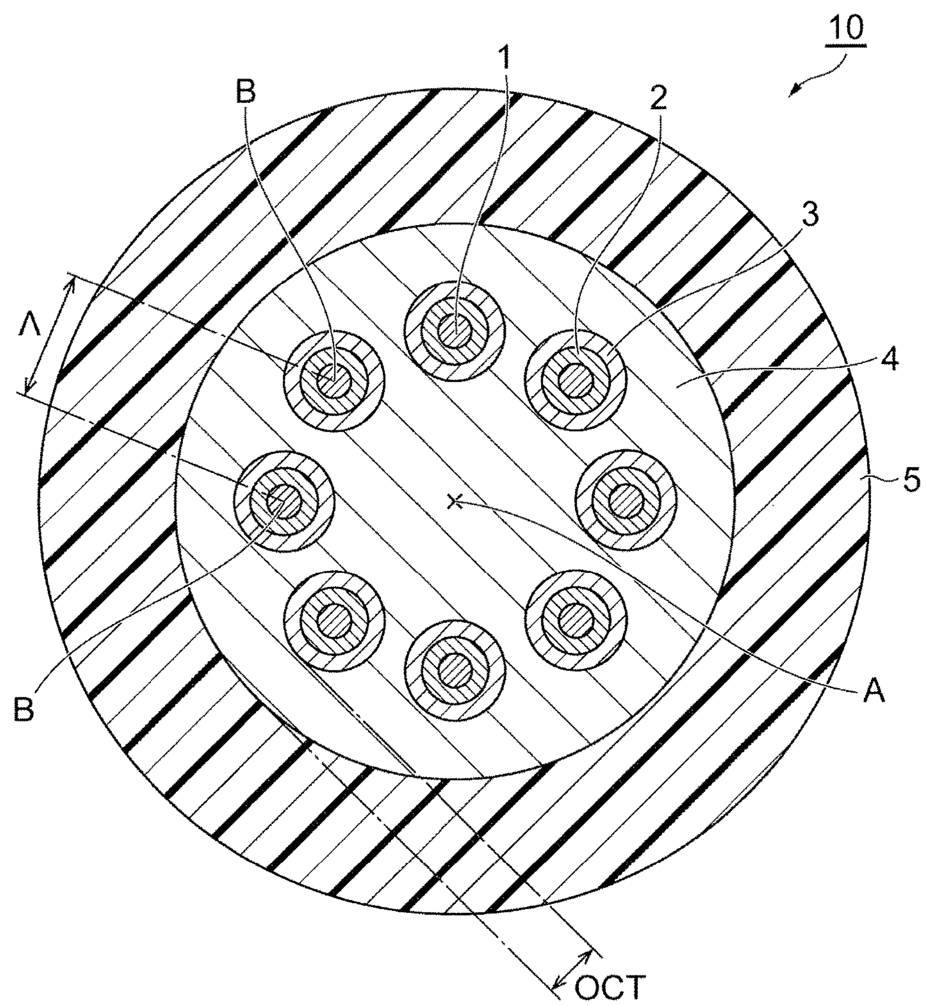
FIG. 3 is a cross-sectional view showing a configuration example of an MCF according to the embodiment of the invention.

FIG. 3 is a cross-sectional view showing a configuration example of an MCF according to the embodiment of the invention. The MCF 10 shown in FIG. 3 has a core group consisting of eight or more cores 1 comprised of silica-based glass, an inner cladding group consisting of individual inner claddings 2 individually surrounding the eight or more cores 1, a trench group consisting of individual trenches 3 individually surrounding the respective inner claddings 2, a common cladding 4 comprised of silica-based glass and individually surrounding each of the trenches 3 inside, and a coating 5 surrounding the common cladding 4. In the present embodiment, the number of cores 1 is eight. In FIG. 3, "A" represents a center of a cross section of the common cladding 4 and "B" a core center of each core 1.

The eight cores 1 have their respective RI profiles which are substantially identical with each other. This suppresses variation in transmission characteristics among the cores 1. In addition, it can restrain increase in cost necessary for preparing the cores 1 with multiple types of RI profiles instead. Furthermore, users can use the MCF 10 without regard to difference in characteristics of the respective cores.

The cores 1 extend along the fiber axis. The cores 1 and common cladding 4 are comprised of silica-based glass. The eight cores 1 are arranged at equal intervals on the same circle centered at the center of the common cladding. Namely, all the eight cores 1 are OCs in the present embodiment. Since the eight cores 1 are arranged in this way, a positional relation of a certain core 1 with the outer periphery of the common cladding 4 (coating 5) and a positional relation thereof with the other cores 1 become equivalent to those of all the other cores 1 with the outer periphery of the common cladding 4 and with the other cores 1. For this reason, forces exerted on the cores from the surrounding structure in a manufacturing process are symmetrically applied to all the cores 1. Therefore, this configuration suppresses variation in characteristics and variation in positions among the cores 1.

In the cores 1, the TL at the wavelength of 1310 nm is not more than 0.5 dB/km or not more than 0.4 dB/km. This is favorable because there is no significant increase of TL, compared to a single-core single-mode fiber compliant with ITU-T G.652 or G.657 commonly used at present. When the TL of the core 1 unaffected by the LL is defined as a transmission loss $TL_0$ intrinsic to the core, the $TL_0$ at the wavelength of 1310 nm that can be realized is about 0.3 dB/km in the case of pure silica cores and from 0.32 dB/km to 0.35 dB/km in the case of $GeO_2$-doped cores. In the cores 1, the "TL" being the sum of the "$TL_0$" and "LL", at the wavelength of 1310 nm, is preferably not more than 0.5 dB/km or not more than 0.4 dB/km. In the entire range of the O-band, this "TL" is more preferably not more than 0.5 dB/km or not more than 0.4 dB/km.

In the cores 1, the TL at the wavelength of 1550 nm or at the wavelength of 1625 nm is larger than 0.4 dB/km or larger than 0.5 dB/km. When the TL is daringly set at the large value uncompliant with ITU-T G.652 or G.657 in this manner, a smaller OCT can be realized. This allows the OC to be located closer to the coating 5. Therefore, a larger number of cores 1 or the cores with a larger MFD can be packed in the common cladding 4 of about 125 μm. It is also favorable because it can expand a design margin for manufacturing to allow for variation of XT, XTs, and A.

In the cores 1, the MFD at the wavelength of 1310 nm is from 8.0 μm to 10.1 μm. For this reason, it is feasible to reduce the splice loss in splice to the system or component premised on the conventional SSMF. It is also favorable because the splice loss can be kept low even with a certain level of axial misalignment.

In the cores 1, the BL in the BR of not less than 5 mm or in the BR of not less than 3 mm and, less than 5 mm at the wavelength of 1310 nm is not more than 0.25 dB/turn. For this reason, it is favorable because a significant increase of TL can be restrained even with a fiber bend of a small BR given in use at an optical interconnect in high-performance computing or in a data center or the like. In the cores 1, the BL in the BR of 3 mm at the wavelength of 1310 nm is not more than 0.10 dB/turn. For this reason, it is more favorable because the increase of TL can be further restrained even under severer conditions.

In the cores 1, λ0 is from 1300 nm to 1324 nm. For this reason, the CD in the O-band used in transmission can be kept low. Therefore, it is favorable because it can reduce cost for compensation for chromatic dispersion in transceivers (price and cost of power consumption).

In the cores 1, λcc is not more than 1260 nm. For this reason, the single-mode operation in the O-band used in transmission can be guaranteed. It is more preferable to set a 2 m cutoff wavelength not more than 1260 nm.

The cores 1 have the XT of not more than 0.001/km from the core 1 neighboring to the neighboring core 1. This is favorable because it can fully suppress noise produced by XT from the core 1 neighboring to the neighboring core 1 in a case where optical signals are transmitted in opposite directions in the neighboring cores 1. The XT at the wavelength of 1310 nm between the core 1 and the neighboring core 1 is not more than 0.001/km. This is more favorable because this can keep the noise produced by XT between the neighboring cores 1, sufficiently small even in a case where optical signals are transmitted in an identical direction in all the cores 1.

The eight cores 1 have Λ of not less than 23.3 μm. The eight cores 1 have the shortest distance of not less than 17.7 μm between the core center and the coating 5.

The number of cores 1 is preferably an even number of not less than 8 and more preferably a power of 2. When the number of cores 1 is a power of 2, compatibility becomes higher with computers, information processing, and information transmission based on binary numbers. For this reason, it is more preferable than 7-core fibers, 19-core fibers, and so on of hexagonal closest packing conventionally frequently used. When the cores are not four cores or six cores but eight or more cores, this arrangement is favorable because the number of spatial channels per cross-sectional area can be made larger. Therefore, the number of cores 1 is particularly preferably a power of 2 not less than 8.

The inner claddings 2 are provided between the respective eight cores 1 and trenches 3. The inner claddings 2 have the RI lower than that of the cores 1 and higher than that of the trenches 3. The inner claddings 2 are comprised, for example, of $GeO_2$-doped silica glass.

The trenches 3 are provided between the respective eight cores 1 and the common cladding 4. The trenches 3 have the RI lower than that of the common cladding 4. The trenches 3 are comprised, for example, of F-doped silica glass.

The trench-assisted RI structure with the inner claddings 2 and the trenches 3 is preferable because it can realize the optical characteristics suitable for transmission using the O-band. Furthermore, the trench-assisted RI structure enhances the confinement effect of light in the cores 1. For this reason, it is preferable because it can realize reduction in XT and decrease in $OCT_{1310\ nm,\ 0.1\ dB/km}$, $OCT_{1310\ nm,\ 0.08\ dB/km}$, $OCT_{1310\ nm,\ 0.05\ dB/km}$, and so on indicating values of OCT at predetermined values of LL (e.g., 0.1 dB, 0.08 dB, 0.05 dB, and so on) at the wavelength 1310 nm.

The common cladding 4 is comprised of silica-based glass. The OD is 125±1 μm. Namely, the OD is not more than 126 μm and not less than 124 μm. When the OD is 125±1 μm, it is possible to use the same peripheral components, such as the connector ferrule, as those for the conventionally used SSMF. For this reason, it is favorable in terms of reduction in cost of transmission systems.

Figure 4:
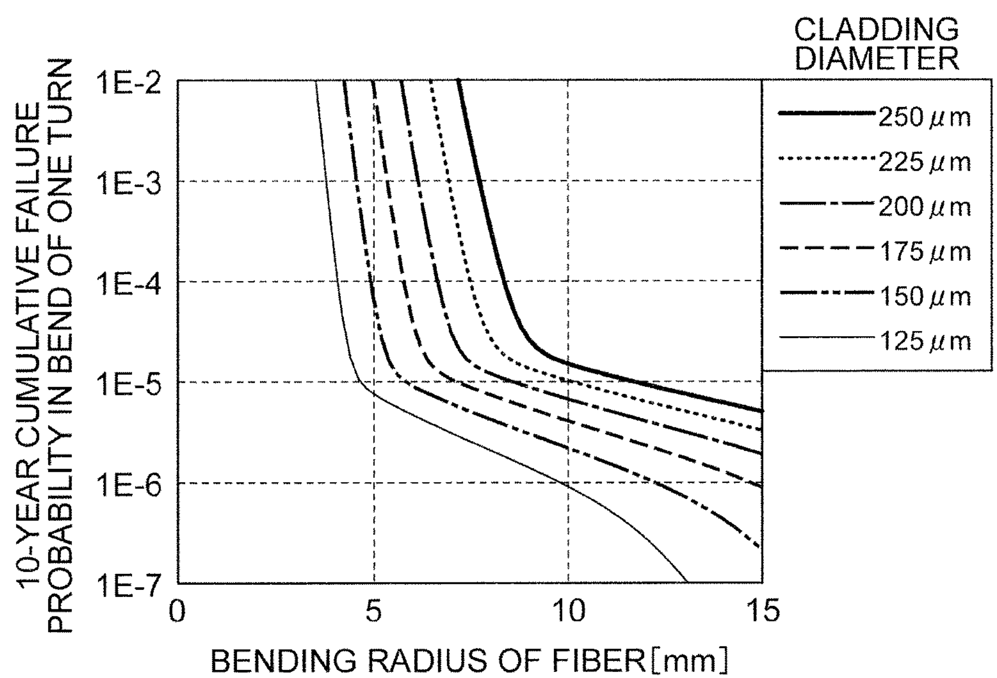
FIG. 4 is a graph showing relations between bending radius BR of fiber and 10-year cumulative failure probability in a one-turn bend for respective ODs.

FIG. 4 is a graph showing relations between BR of fiber and 10-year cumulative failure probability in a one-turn bend for respective ODs. As shown in FIG. 4, at all the ODs (125 μm, 150 μm, 175 μm, 200 μm, 225 μm, and 250 μm), the failure probability in the fiber bend increases with decreasing BR of fiber. A threshold of BR at a sudden increase of failure probability (threshold radius of curvature) increases with increasing OD. When the OD is 125±1 μm, or smaller than it, the threshold of BR can be kept less than 5 mm and thus it is favorable.

The coating 5 is made of resin. The coating 5 has the RI higher than that of the common cladding 5. The coating 5 also has the RI higher than that of the cores 1. When the coating 5 has the RI as described above, it is favorable because it suppresses propagation of light leaking into the common cladding 4.

Figure 5:
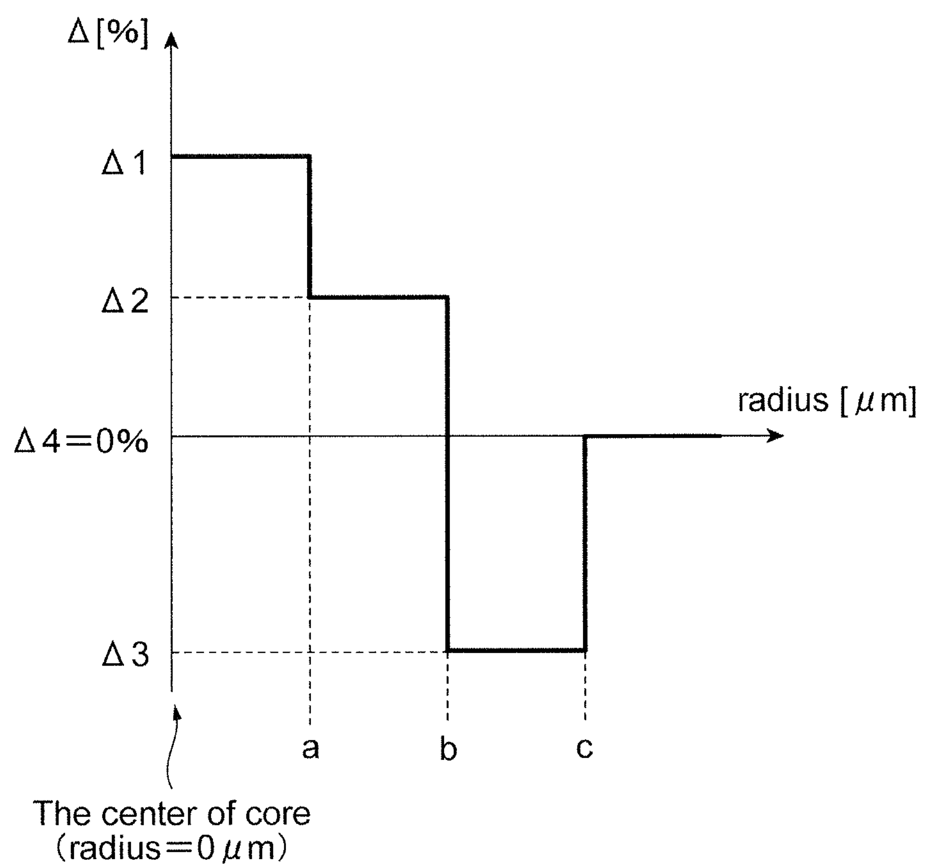
FIG. 5 is a graph showing a relation between radial distance from the core center and relative RI difference (relative refractive index difference) with respect to a predetermined RI.

FIG. 5 is a graph showing a relation between radial distance from the core center and relative RI difference with respect to a predetermined RI. The diameter of the cores 1 is defined as 2a, the diameter of the inner claddings 2 as 2b, and the diameter of the trenches 3 as 2c. As shown in FIG. 5, when the relative RI difference of the cores 1 with respect to the predetermined RI is defined as Δ1, the relative RI difference of the inner claddings 2 with respect to the predetermined RI as Δ2, the relative RI difference of the trenches 3 with respect to the predetermined RI as Δ3, and the relative RI difference of the common cladding 4 with respect to the predetermined RI as Δ4, these Δ1, Δ2, Δ3, and Δ4 satisfy the following relation:

$$\Delta 1>\Delta 2>\Delta 4>\Delta 3.$$

As described above, the coating 5 has the higher RI than the cores 1. Therefore, when the relative RI difference of the coating 5 with respect to the predetermined RI is defined as Δ5, Δ1, Δ2, Δ3, Δ4, and Δ5 satisfy the following relations:

$$\Delta 5>\Delta 1>\Delta 2>\Delta 3;\text{ and}$$

$$\Delta 1>\Delta 4>\Delta 3.$$

The optical characteristics and others of the cores of samples with variation in RI profile of the cores are shown in FIGS. 6A to 10B, 11 to 15, and 16A to 20B. In the tables of the respective drawings, numerical expressions such as macrobend loss "aE−b (a and b are real numbers)" and "aE+b (a and b are real numbers)" mean "$a\times10^{-b}$" and "$a\times10^{+b}$," respectively. FIGS. 6A to 10B are tables showing the core RI profiles and core optical characteristics of samples #1 to #195. In these tables, values of 2a, a/b, b/c, Δ1, Δ2, Δ3, Δ1-Δ2, and 2c are provided as parameters representing the core RI profile. In FIGS. 6A to 10B, λcc, λ0 at CD of 0, S0, MFD, CD, and Macrobend loss in BR=(7.5 mm, 5 mm, 4 mm, and 3 mm) at the wavelength of 1310 nm are shown as parameters representing the optical characteristics of each of the eight cores 1. In these tables, however, the aforementioned predetermined RI is determined so as to make Δ4=0%, and the BR is expressed by R.

FIGS. 11 to 15 are tables showing the OCTs at respective LLs at the wavelength of 1310 nm, of samples #1 to #195. In these tables, an OCT at LL of a predetermined value at the wavelength of 1310 nm is indicated as $OCT_{1310,\ LL}$. Specifically, $OCTs_{1310,\ LL}$ at LLs of 0.1 dB/km, 0.08 dB/km, 0.05 dB/km, 0.01 dB/km, and 0.001 dB/km are provided in the cases of the respective core RI profiles shown in FIGS. 6A to 10B.

The OCT is preferably not less than $OCT_{1310,\ 0.1\ dB/km}$ shown in these FIGS. 11 to 15, more preferably not less than $OCT_{1310,\ 0.08\ dB/km}$, and much more preferably not less than $OCT_{1310,\ 0.05\ dB/km}$.

FIGS. 16A to 20B are tables showing the Λs, maxima of OCT, LLs at the maxima of OCT, and minima of OD when the XT at the wavelength of 1310 nm is not more than a predetermined value, of samples #1 to #195. In these tables, there are two cases separately shown: case A (XT_case A) where the XT from the neighboring core 1 is not more than 0.001/km; and case B (XT_case B) where the XT from the core 1 neighboring to the neighboring core 1 at the wavelength of 1310 nm is not more than 0.001/km. FIGS. 16A to 20B show the minimum $\Lambda_{min}$ of Λ, maximum $OCT_{max}$ of OCT, LLs at $OCT_{max}$ (at the wavelengths of 1310 nm, 1550 nm, and 1625 nm), and minimum $OD_{min}$ of OD, in each of the cases A and B.

In case A, it is assumed that optical signals are transmitted in an identical direction in all the cores 1. In case B, it is assumed that optical signals are transmitted in opposite directions in the neighboring cores 1 (bidirectional transmission). $\Lambda_{min}$ is Λ at the XT of not more than 0.001/km. When Λ was not more than 2c, $\Lambda_{min}$ was determined to be 2c. $OCT_{max}$ is a maximum of OCT that can be realized with the OD of 125 μm in arrangement of the cores 1 at $\Lambda_{min}$. $OD_{min}$ is a minimum of OD that can be realized while maintaining the $OCT_{1310,\ 0.1\ dB/km}$, in the arrangement of the cores 1 at $\Lambda_{min}$.

Namely, at the wavelength of 1310 nm, the XT from the neighboring core 1 is not more than 0.001/km, Λ is not less than $\Lambda_{min}$ in XT_case A in FIGS. 16A to 20B, and the OD is not less than $OD_{min}$ in XT_case A in FIGS. 16A to 20B. Alternatively, at the wavelength of 1310 nm, the XT from the core 1 neighboring to the neighboring core 1 is not more than 0.001/km, Λ is not less than $\Lambda_{min}$ in XT_case B in FIGS. 16A to 20B, and the OD is not less than $OD_{min}$ in XT_case B in FIGS. 16A to 20B.

Since the ranges of values taken by 2a, a/b, b/c, Δ1, Δ2, Δ1-Δ2, and Δ3 being the parameters representing the core RI profiles shown in FIGS. 6A to 10B are as described below in the light of the fact that the reference of the relative RI differences is determined so as to make Δ4=0%:

$$5.27\ \mu m \le 2a \le 8.05\ \mu m$$

$$0.375 \le a/b \le 0.45$$

$$0.478 \le b/c \le 0.816$$

$$0.26\% \le \Delta1-\Delta4 \le 0.42\%$$

$$-0.05\% \le \Delta2-\Delta4 \le 0.15\%$$

$$0.25\% \le \Delta1-\Delta2 < 0.385\%$$

$$\Delta3-\Delta4 \le -0.5\%,$$

the present embodiment preferably satisfies these formulae. However, if Δ3−Δ4 takes a negative value an absolute value of which is sufficiently large, it is desirable to adjust b/c over the above range so as to make λcc not more than 1260 nm.

Similarly, from FIGS. 11 to 15, the OCT is preferably not less than 17.7 μm. From FIGS. 16A to 20B, Λ is preferably not less than 23.3 μm.

Now, let us check desired ranges of the parameters representing the core RI profile (RI parameters) in detail, particularly, concerning each of samples of sample numbers #121, #189, #148, and #191, out of the samples #1 to #195 shown in FIGS. 6A to 10B. In each of the samples, the basic RI parameters can be set as described below.

$$2a=6.85\ \mu m, Ra=0.4, Rb=0.61, \Delta1=0.375\%, \Delta2=0.05\%, \Delta3=-0.5\%, \Delta4=0.00\% \quad \text{(sample \#121)}$$

$$2a=7.88\ \mu m, Ra=0.4, Rb=0.732, \Delta1=0.375\%, \Delta2=0.00\%, \Delta3=-0.5\%, \Delta4=0.00\% \quad \text{(sample \#189)}$$

$$2a=7.36\ \mu m, Ra=0.4, Rb=0.733, \Delta1=0.375\%, \Delta2=0.030\%, \Delta3=-0.75\%, \Delta4=0.00\% \quad \text{(sample \#148)}$$

$$2a=7.91\ \mu m, Ra=0.4, Rb=0.816, \Delta1=0.375\%, \Delta2=0.00\%, \Delta3=-0.75\%, \Delta4=0.00\% \quad \text{(sample \#191)}$$

Figure 21A:
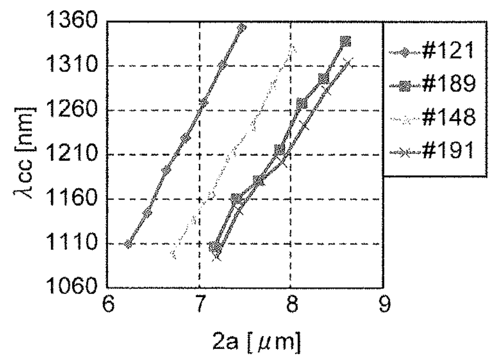
FIGS. 21A to 21F are drawings showing dependences of λcc on RI parameters (refractive index parameters).
Figure 21B:
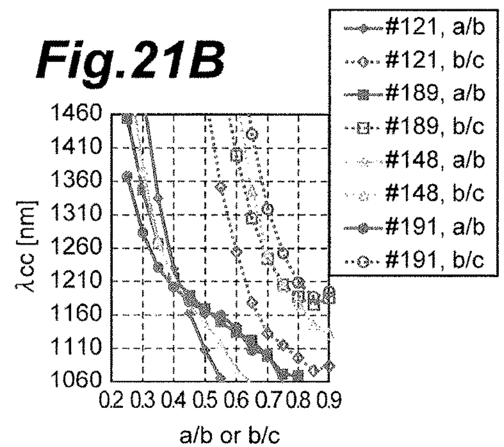
Figure 21C:
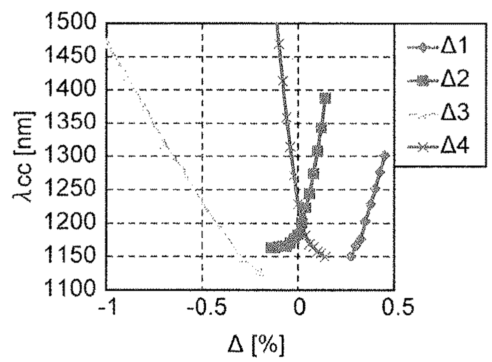
Figure 21D:
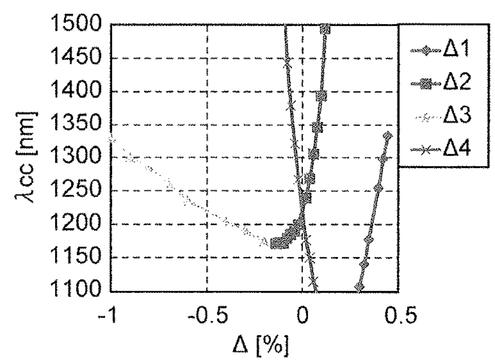
Figure 21E:
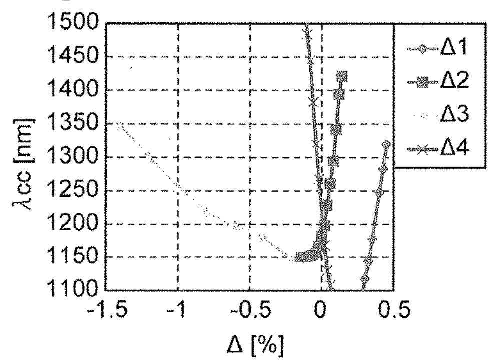
Figure 21F:
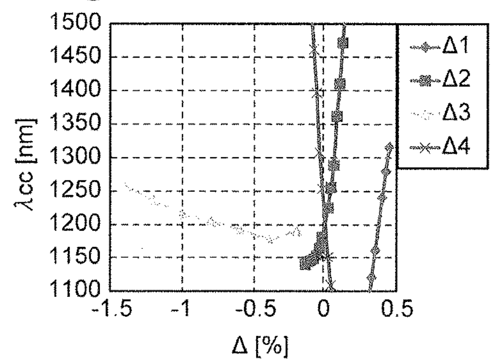

FIGS. 21A to 29D are drawings showing dependences of λcc, MFD, BL loss, λ0, S0, and minimum cladding diameter on the RI parameters. FIG. 21A is a drawing showing dependences of λcc on 2a, of the samples #121, #189, #148, and #191, FIG. 21B a drawing showing dependences of λcc on a/b and b/c, of the foregoing four types of samples, FIG. 21C a drawing showing dependences of λcc on Δ1, Δ2, Δ3, and Δ4 of the sample #121, FIG. 21D a drawing showing dependences of λcc on Δ1, Δ2, Δ3, and Δ4 of the sample #189, FIG. 21E a drawing showing dependences of λcc on Δ1, Δ2, Δ3, and Δ4 of the sample #148, and FIG. 21F a drawing showing dependences of λcc on Δ1, Δ2, Δ3, and Δ4 of the sample #191.

Figure 22A:
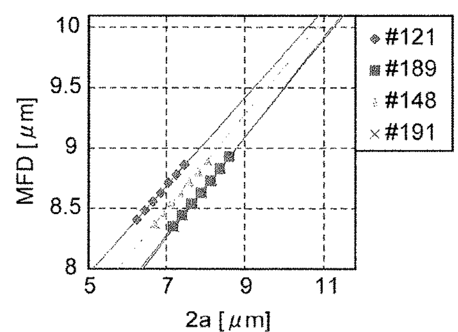
FIGS. 22A to 22F are drawings showing dependences of MFD on RI parameters.
Figure 22B:
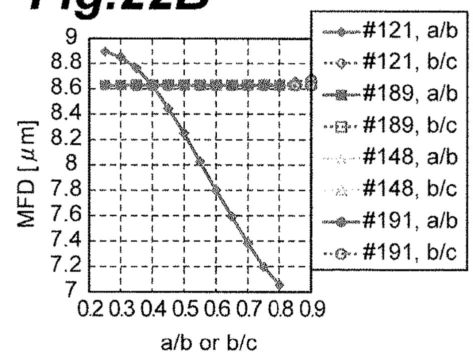
Figure 22C:
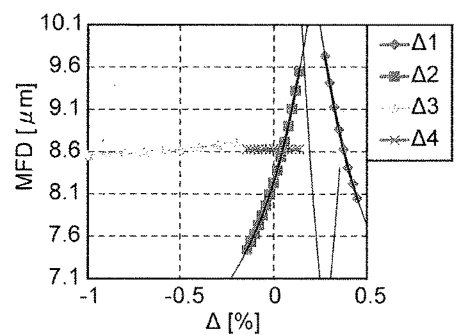
Figure 22D:
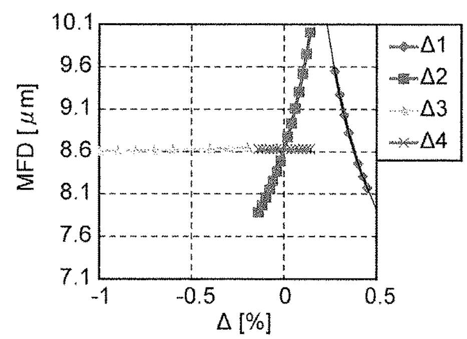
Figure 22E:
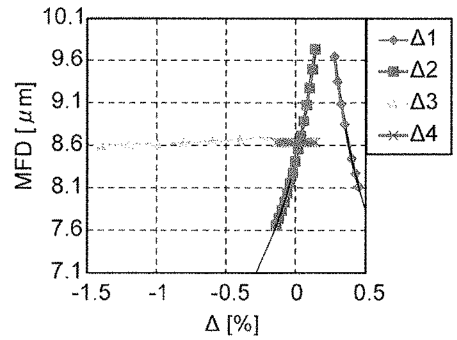
Figure 22F:
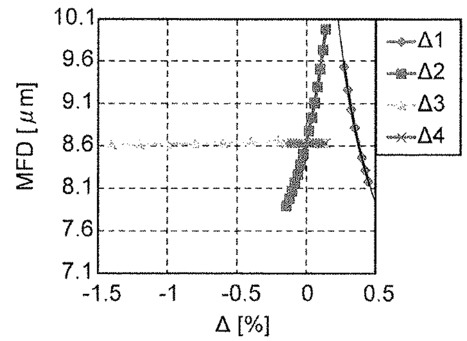

FIG. 22A is a drawing showing dependences of MFD on 2a, of the samples #121, #189, #148, and #191, FIG. 22B a drawing showing dependences of MFD on a/b and b/c, of the foregoing four types of samples, FIG. 22C a drawing showing dependences of MFD on Δ1, Δ2, Δ3, and Δ4 of the sample #121, FIG. 22D a drawing showing dependences of MFD on Δ1, Δ2, Δ3, and Δ4 of the sample #189, FIG. 22E a drawing showing dependences of MFD on Δ1, Δ2, Δ3, and Δ4 of the sample #148, and FIG. 22F a drawing showing dependences of MFD on Δ1, Δ2, Δ3, and Δ4 of the sample #191.

Figure 23A:
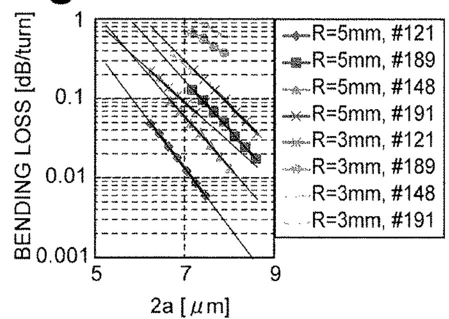
FIGS. 23A to 23F are drawings showing dependences of BL on RI parameters.
Figure 23B:
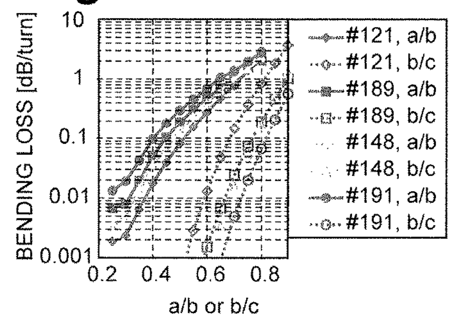
Figure 23C:
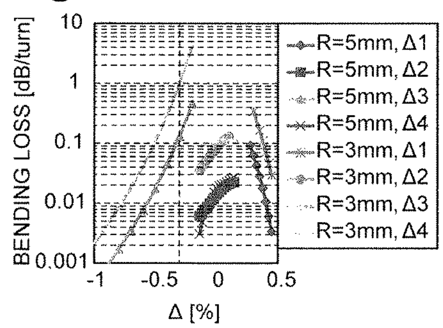
Figure 23D:
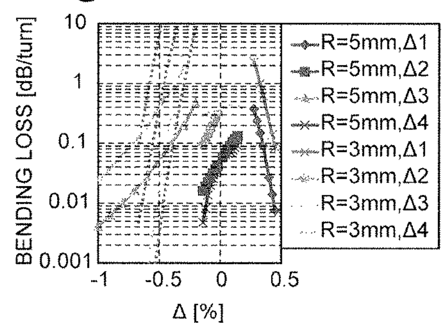
Figure 23E:
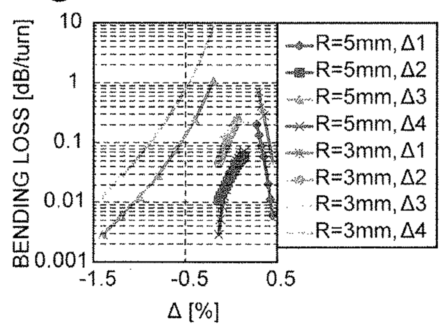
Figure 23F:
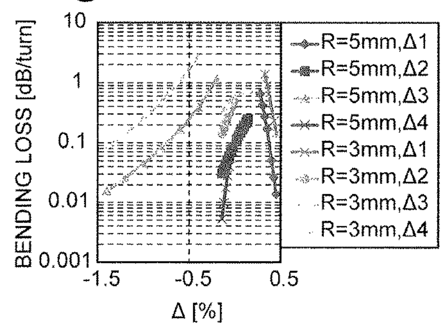

FIG. 23A is a drawing showing dependences of BL on 2a, of the samples #121, #189, #148, and #191, FIG. 23B a drawing showing dependences of BL on a/b and b/c, of the foregoing four types of samples, FIG. 23C a drawing showing dependences of BL on Δ1, Δ2, Δ3, and Δ4 of the sample #121, FIG. 23D a drawing showing dependences of BL on Δ1, Δ2, Δ3, and Δ4 of the sample #189, FIG. 23E a drawing showing dependences of BL on Δ1, Δ2, Δ3, and Δ4 of the sample #148, and FIG. 23F a drawing showing dependences of BL on Δ1, Δ2, Δ3, and Δ4 of the sample #191. FIGS. 23A to 23F show the dependences of BL at the wavelength of 1.31 μm in the BR of 5 mm and in the BR of 3 mm.

Figure 24A:
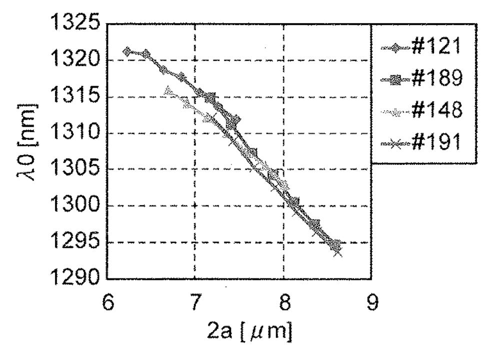
FIGS. 24A to 24F are drawings showing dependences of λ0 on RI parameters.
Figure 24B:
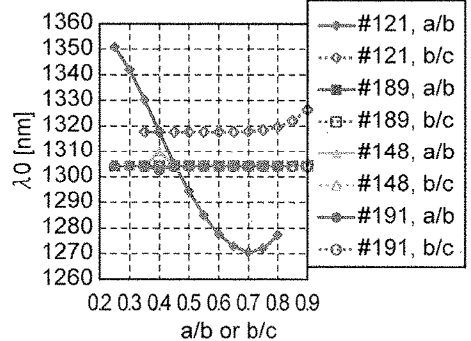
Figure 24C:
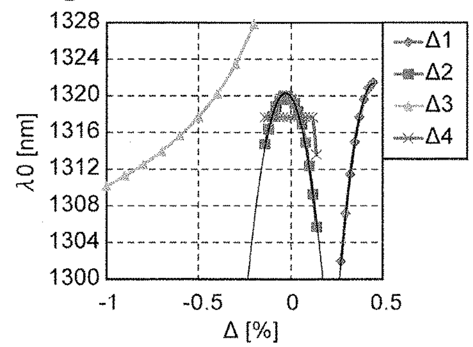
Figure 24D:
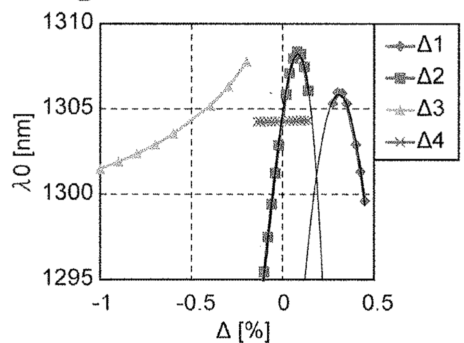
Figure 24E:
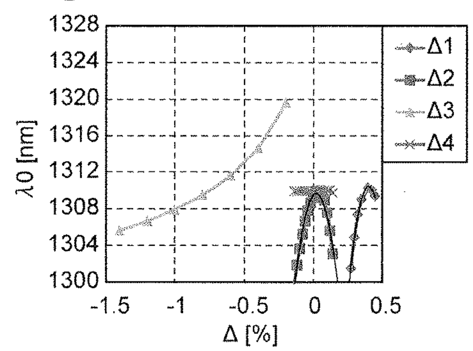
Figure 24F:
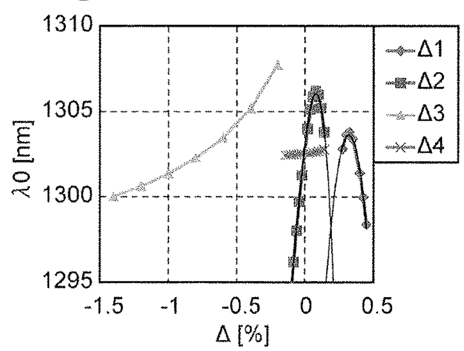

FIG. 24A is a drawing showing dependences of λ0 on 2a, of the samples #121, #189, #148, and #191, FIG. 24B a drawing showing dependences of λ0 on a/b and b/c, of the foregoing four types of samples, FIG. 24C a drawing showing dependences of λ0 on Δ1, Δ2, Δ3, and Δ4 of the sample #121, FIG. 24D a drawing showing dependences of λ0 on Δ1, Δ2, Δ3, and Δ4 of the sample #189, FIG. 24E a drawing showing dependences of λ0 on Δ1, Δ2, Δ3, and Δ4 of the sample #148, and FIG. 24F a drawing showing dependences of λ0 on Δ1 Δ2, Δ3, and Δ4 of the sample #191.

Figure 25A:
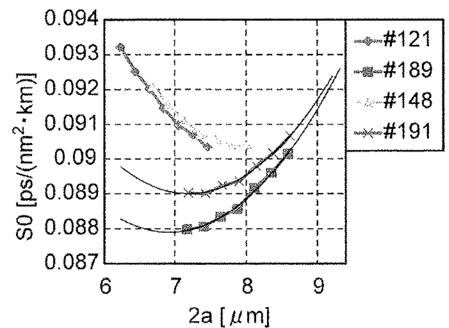
FIGS. 25A to 25F are drawings showing dependences of S0 (chromatic dispersion slope at λ0) on RI parameters.
Figure 25B:
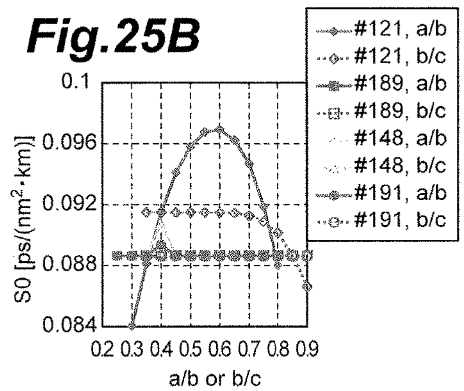
Figure 25C:
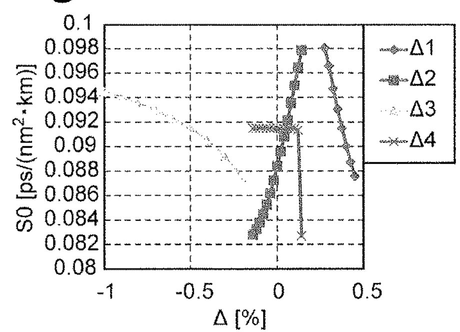
Figure 25D:
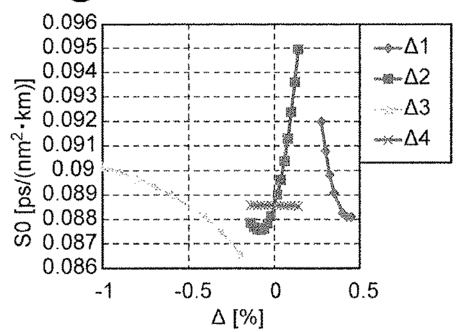
Figure 25E:
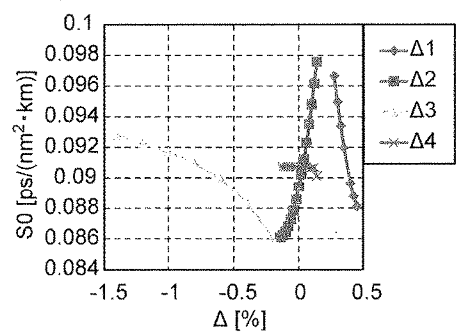
Figure 25F:
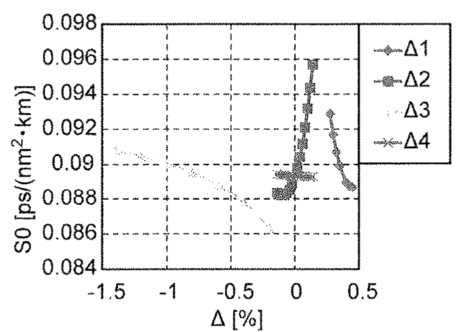

FIG. 25A is a drawing showing dependences of S0 on 2a, of the samples #121, #189, #148, and #191, FIG. 25B a drawing showing dependences of S0 on a/b and b/c, of the foregoing four types of samples, FIG. 25C a drawing showing dependences of S0 on Δ1, Δ2, Δ3, and Δ4 of the sample #121, FIG. 25D a drawing showing dependences of S0 on Δ1, Δ2, Δ3, and Δ4 of the sample #189, FIG. 25E a drawing showing dependences of S0 on Δ1, Δ2, Δ3, and Δ4 of the sample #148, and FIG. 25F a drawing showing dependences of S0 on Δ1, Δ2, Δ3, and Δ4 of the sample #191.

Figure 26A:
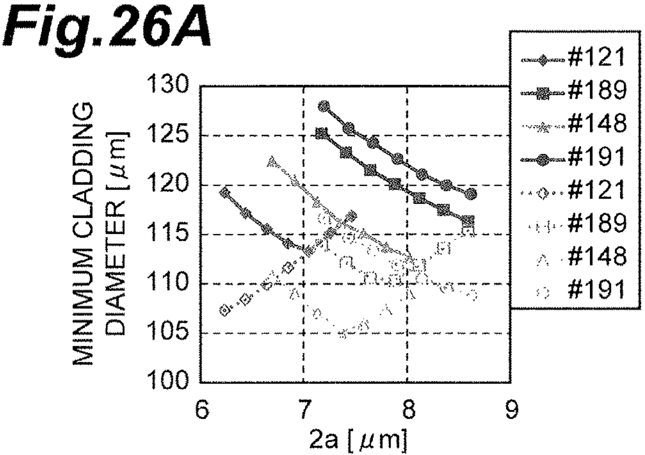
FIGS. 26A to 26C are drawings showing dependences of minimum cladding diameter on RI parameters.
Figure 26B:
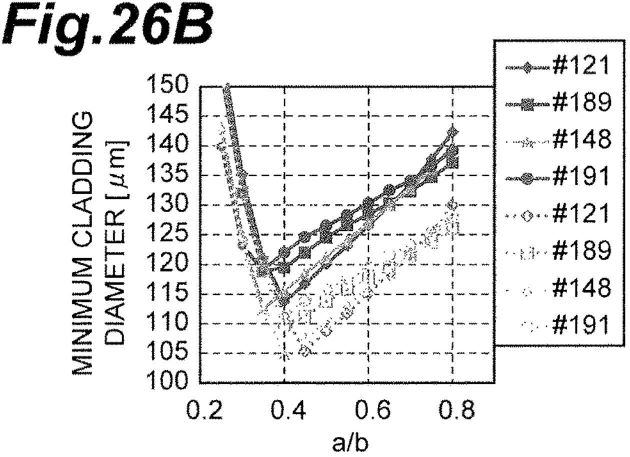
Figure 26C:
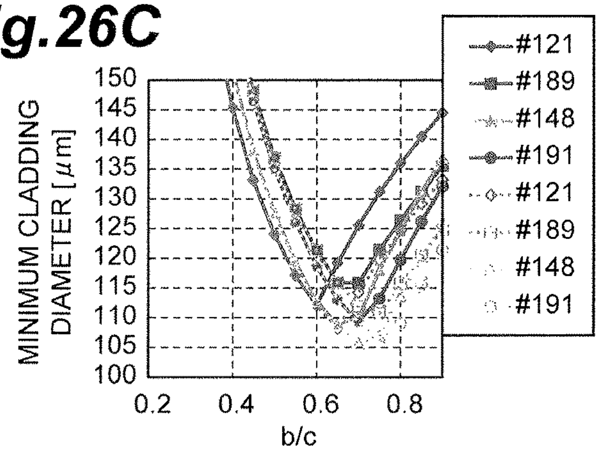
Figure 27A:
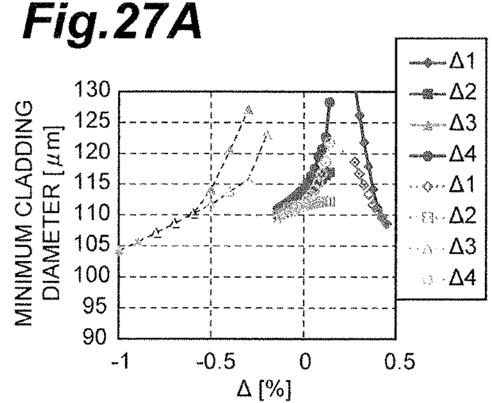
FIGS. 27A to 27D are drawings showing dependences of minimum cladding diameter on RI parameters.
Figure 27B:
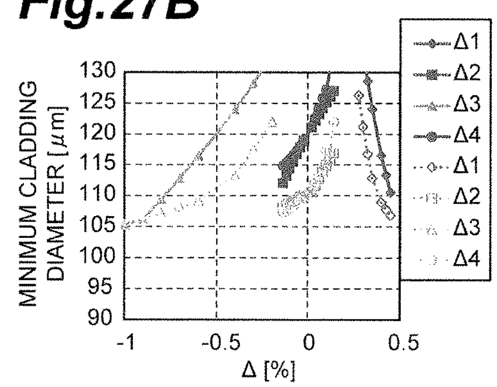
Figure 27C:
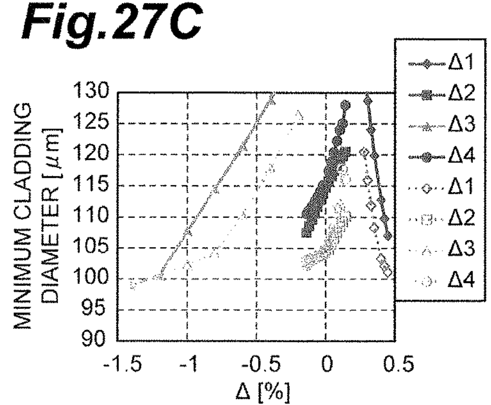
Figure 27D:
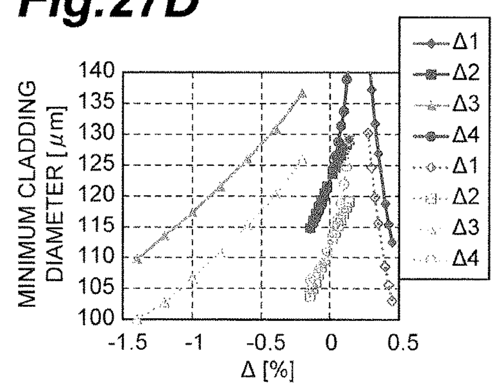

FIG. 26A is a drawing showing dependences of minimum cladding diameter on 2a, of the samples #121, #189, #148, and #191, FIG. 26B a drawing showing dependences of minimum cladding diameter on a/b, of the foregoing four types of samples, and FIG. 26C a drawing showing dependences of minimum cladding diameter on b/c, of the foregoing four types of samples. FIG. 27A is a drawing showing dependences of minimum cladding diameter on Δ1, Δ2, Δ3, and Δ4 of the sample #121, FIG. 27B a drawing showing dependences of minimum cladding diameter on Δ1, Δ2, Δ3, and Δ4 of the sample #189, FIG. 27C a drawing showing dependences of minimum cladding diameter on. Δ1, Δ2, Δ3, and Δ4 of the sample #148, and FIG. 27D a drawing showing dependences of minimum cladding diameter on Δ1, Δ2, Δ3, and Δ4 of the sample #191. FIGS. 26A to 26F and 27A to 27D show the dependences of the minimum cladding diameter that can be realized in the case where the eight cores are arranged at equal intervals on the same circle and on the condition that the inter-neighboring-core XT (series of filled solid lines) or the second inter-proximate-core XT (series of unfilled dashed lines) at the wavelength of 1.31 μm is not more than 0.001/km and LL≤0.1 dB/km. A second proximate core is a core neighboring to the neighboring core.

Figure 28A:
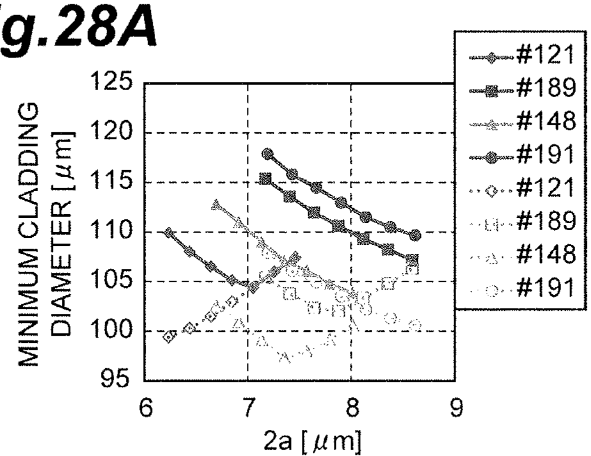
FIGS. 28A to 28C are drawings showing dependences of minimum cladding diameter on RI parameters.
Figure 28B:
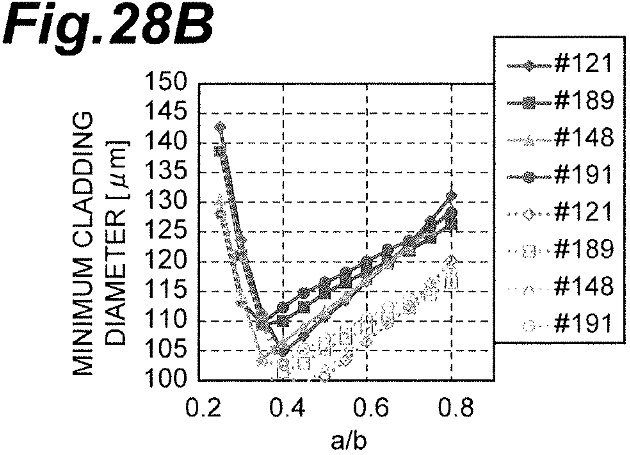
Figure 28C:
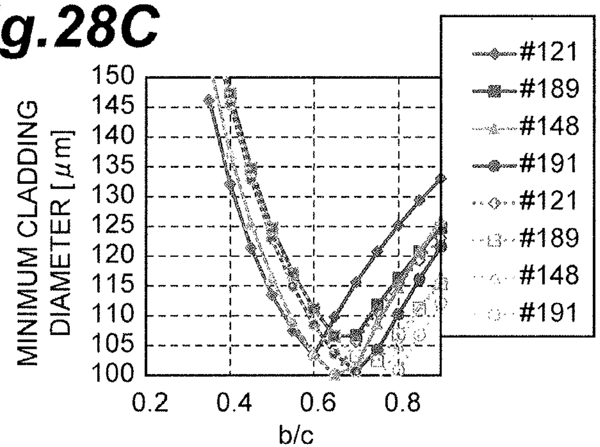
Figure 29A:
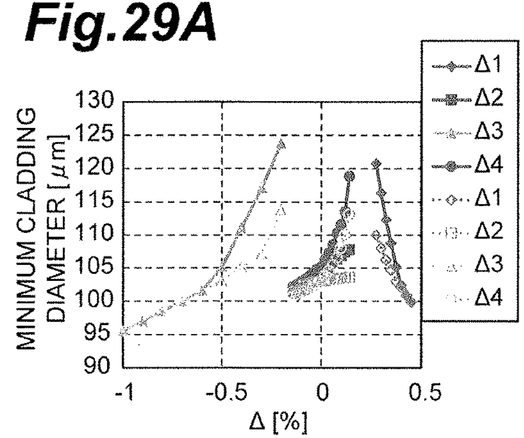
FIGS. 29A to 29D are drawings showing dependences of minimum cladding diameter on RI parameters.
Figure 29B:
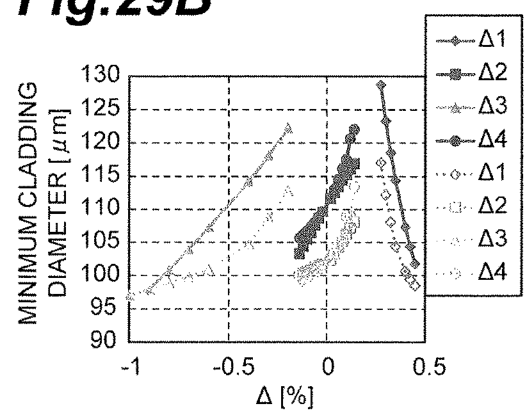
Figure 29C:
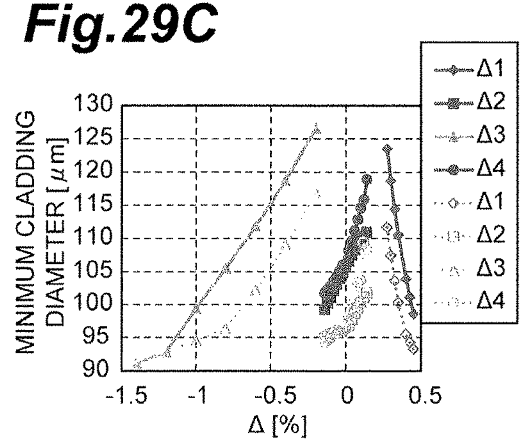
Figure 29D:
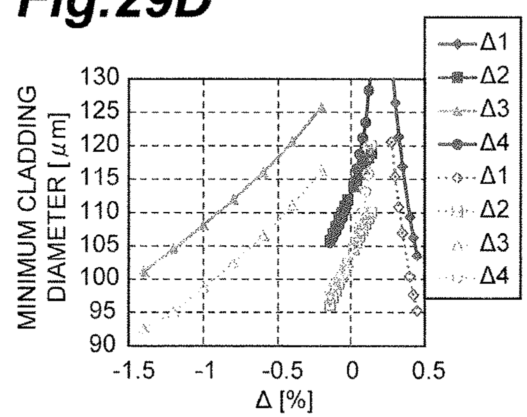

FIG. 28A is a drawing showing dependences of minimum cladding diameter on 2a, of the samples #121, #189, #148, and #191, FIG. 28B a drawing showing dependences of minimum cladding diameter on a/b, of the foregoing four types of samples, and FIG. 28C a drawing showing dependences of minimum cladding diameter on b/c, of the foregoing four types of samples. FIG. 29A is a drawing showing dependences of minimum cladding diameter on Δ1, Δ2, Δ3, and Δ4 of the sample #121, FIG. 29B a drawing showing dependences of minimum cladding diameter on Δ1, Δ2, Δ3, and Δ4 of the sample #189, FIG. 29C a drawing showing dependences of minimum cladding diameter on Δ1, Δ2, Δ3, and Δ4 of the sample #148, and FIG. 29D a drawing showing dependences of minimum cladding diameter on Δ1, Δ2, Δ3, and Δ4 of the sample #191. FIGS. 28A to 28C and 29A to 29D show the dependences of the minimum cladding diameter that can be realized in the case where the seven cores are arranged at equal intervals on the same circle and on the condition that the inter-neighboring-core XT (series of filled solid lines) or the second inter-proximate-core XT (series of unfilled dashed lines) at the wavelength of 1.31 μm is not more than 0.001/km and LL≤0.1 dB/km. One core is arranged in the vicinity of the center of the same circle, whereby the eight cores can be included.

FIGS. 30A and 30B are tables showing desired ranges of the RI parameters. In FIGS. 30A and 30B, the desired ranges of the RI profile parameters to satisfy each of λcc≤1260 nm, 8 μm≤MFD≤10.1 μm at the wavelength of 1.31 μm, BL (BR=5 mm) of not more than 0.25 dB/turn at the wavelength of 1.31 μm, BL (BR=3 mm) of not more than 0.25 dB/turn, 1300 nm≤λ0≤1324 nm, and, S0≤0.092 ps/($nm^2$·km) are shown for each of the samples #121, #189, #148, and #191.

FIGS. 30A and 30B show, for each of the samples #121, #189, #148, and #191, the desired ranges of the RI profile parameters to satisfy the condition that the minimum cladding diameter 1 that can be achieved while realizing the second inter-proximate-core XT of not more than 0.001/km at the wavelength of 1.31 μm and the LL of not more than 0.1 dB/km, is not more than 126 μm, and the desired ranges of the RI profile parameters to satisfy the condition that the minimum cladding diameter 2 that can be achieved while realizing the inter-neighboring-core XT of not more than 0.001/km and the LL of not more than 0.1 dB/km, is not more than 126 μm, in the case where the seven cores are arranged at equal intervals on the same circle (where the eight or more cores can be included in the cladding by arranging one core separately inside the same circle); and, the desired ranges of the RI profile parameters to satisfy the condition that the minimum cladding diameter 3 that can be achieved while realizing the second inter-proximate-core XT of not more than 0.001/km at the wavelength of 1.31 μm and the LL of not more than 0.1 dB/km, is not more than 126 μm, and the desired ranges of the RI profile parameters to satisfy the condition that the minimum cladding diameter 4 that can be achieved while realizing the inter-neighboring-core XT of not more than 0.001/km and the LL of not more than 0.1 dB/km, is not more than 126 μm, in the case where the eight cores are arranged at equal intervals on the same circle.

It is understood from the results shown in FIGS. 30A and 30B that, for simultaneously satisfying λcc≤1260 nm, 8 μm≤MFD≤10.1 μm at the wavelength of 1.31 μm, BL (BR=5 mm) of not more than 0.25 dB/turn at the wavelength of 1.31 μm, 1300 nm≤λ0≤1324 nm, and the minimum cladding diameter 1 of not more than 126 μm, it is preferred that the sample #121 should satisfy Condition #1, the sample #189 should satisfy Condition #2, the sample #148 should satisfy Condition #3, and the sample #191 should satisfy Condition #4. Condition #1 to Condition #4 are as follows.

$$6.16\ \mu m \le 2a \le 7.01\ \mu m,$$

$$0.385 \le a/b \le 0.473$$

$$0.597 \le b/c \le 0.729$$

$$0.266\% \le \Delta1 \le 0.409\%,$$

$$-0.034\% \le \Delta2 \le 0.071\%$$

$$-0.566\% \le \Delta3 \le -0.284\%$$

$$-0.015\% \le \Delta4 \le 0.222\% \quad \text{(Condition \#1)}$$

$$6.73\ \mu m \le 2a \le 8.08\ \mu m,$$

$$0.357 \le a/b \le 0.530$$

$$0.687 \le b/c \le 0.815$$

$$0.297\% \le \Delta1 \le 0.403\%,$$

$$-0.053\% \le \Delta2 \le 0.034\%$$

$$-0.694\% \le \Delta3 \le -0.271\%$$

$$-0.017\% \le \Delta4 \le 0.196\% \quad \text{(Condition \#2)}$$

$$6.47\ \mu m \le 2a \le 7.64\ \mu m,$$

$$0.359 \le a/b \le 0.435$$

$$0.695 \le b/c \le 0.819$$

$$0.264\% \le \Delta1 \le 0.409\%,$$

$$-0.067\% \le \Delta2 \le 0.060\%$$

$$-1.020\% \le \Delta3 \le -0.392\%$$

$$-0.017\% \le \Delta4 \quad \text{(Condition \#3)}$$

$$7.14\ \mu m \le 2a \le 8.10\ \mu m,$$

$$0.322 \le a/b \le 0.483$$

$$0.744 \le b/c \le 0.859$$

$$0.328\% \leq \Delta 1 \leq 0.412\%,$$

$$-0.037\% \leq \Delta 2 \leq 0.043\%$$

$$-1.426\% \leq \Delta 3 \leq -0.495\%$$

$$-0.022\% \leq \Delta 4 \leq 0.161\% \quad \text{(Condition \#4)}$$

Furthermore, in order to satisfy S0≤0.092 ps/(nm$^2$·km), the sample #121 needs to satisfy Condition #5 in addition to Condition #1, the sample #148 needs to satisfy Condition #6 in addition to Condition #3, the sample #189 needs to satisfy Condition #2, and the sample #191 needs to satisfy Condition #4. Condition #5 and Condition #6 are as follows.

$$6.65\ \mu m \leq 2a \leq 7.01\ \mu m,$$

$$0.385 \leq a/b \leq 0.410$$

$$0.367\% \leq \Delta 1 \leq 0.409\%,$$

$$-0.034\% \leq \Delta 2 \leq 0.058\% \quad \text{(Condition \#5)}$$

$$0.349\% \leq \Delta 1 \leq 0.409\%,$$

$$-0.067\% \leq \Delta 2 \leq 0.054\% \quad \text{(Condition \#6)}$$

For simultaneously satisfying λcc≤1260 nm, 8 μm≤MFD≤10.1 μm at the wavelength of 1.31 μm, BL (BR=5 mm) of not more than 0.25 dB/turn at the wavelength of 1.31 μm, 1300 nm≤λ0≤1324 nm, and the minimum cladding diameter 2 of not more than 126 μm, the sample #121 needs to satisfy Condition #7 in addition to Condition #1, the sample #189 needs to satisfy Condition #2, the sample #148 needs to satisfy Condition #8 in addition to Condition #3, and the sample #191 needs to satisfy Condition #9 in addition to Condition #4. Condition #7 to Condition #9 are as follows.

$$-0.015\% \leq \Delta 4 \leq 0.167\% \quad \text{(Condition \#7)}$$

$$-0.017\% \leq \Delta 4 \leq 0.187\% \quad \text{(Condition \#8)}$$

$$-0.022\% \leq \Delta 4 \leq 0.110\% \quad \text{(Condition \#9)}$$

Furthermore, for making the minimum cladding diameter 3 not more than 126 μm, the sample #121 needs to satisfy Condition #7 in addition to Condition #1, the sample #189 needs to satisfy Condition #10 in addition to Condition #2, the sample #148 needs to satisfy Condition #3, and the sample #191 needs to satisfy Condition #11 in addition to Condition #4. Condition #10 and Condition #11 are as follows.

$$-0.017\% \leq \Delta 4 \leq 0.157\% \quad \text{(Condition \#10)}$$

$$-0.022\% \leq \Delta 4 \leq 0.126\% \quad \text{(Condition \#11)}$$

Furthermore, for making the minimum cladding diameter 4 not more than 126 μm, the sample #121 needs to satisfy Condition #12 in addition to Condition #1, the sample #189 needs to satisfy Condition #13 in addition to Condition #2, the sample #148 needs to satisfy Condition #14 in addition to Condition #3, and the sample #191 needs to satisfy Condition #15 in addition to Condition #4. Condition #12 to Condition #15 are as follows.

$$0.597 \leq b/c \leq 0.704$$

$$0.301\% \leq \Delta 1 \leq 0.409\%,$$

$$-0.566\% \leq \Delta 3 \leq -0.317\%$$

$$-0.015\% \leq \Delta 4 \leq 0.132\% \quad \text{(Condition \#12)}$$

$$0.687 \leq b/c \leq 0.796$$

$$0.339\% \leq \Delta 1 \leq 0.403\%,$$

$$-0.694\% \leq \Delta 3 \leq -0.505\%$$

$$-0.017\% \leq \Delta 4 \leq 0.082\% \quad \text{(Condition \#13)}$$

$$0.695 \leq b/c \leq 0.810$$

$$0.314\% \leq \Delta 1 \leq 0.409\%,$$

$$-1.020\% \leq \Delta 3 \leq -0.477\%$$

$$-0.017\% \leq \Delta 4 \leq 0.126\% \quad \text{(Condition \#14)}$$

$$0.744 \leq b/c \leq 0.848$$

$$0.355\% \leq \Delta 1 \leq 0.412\%,$$

$$-1.426\% \leq \Delta 3 \leq -0.601\%$$

$$-0.022\% \leq \Delta 4 \leq 0.035\% \quad \text{(Condition \#15)}$$

The MCF 10 preferably has the S0 of not more than 0.092 ps/(nm$^2$·km). This can suppress distortion of signal waveform due to higher-order CD in high-speed transmission. Furthermore, it can also restrain a maximum of CD in a band in use, so as to suppress the distortion of signal waveform, in the case of wavelength division multiplexing transmission being performed using a wide wavelength range in the O-band.

The MCF 10 is the all-solid optical fiber. Namely, the MCF 10 includes no holes. If the fiber includes holes, foreign matter such as water can intrude into the holes to influence the transmission characteristics of the cores 1. For avoiding this influence, it is necessary to perform a process of closing the holes at the fiber end face. For this reason, the holes will cause an increase in cost for splice of the fiber or attachment of a connector to the fiber. The atmospheric pressure in the holes needs to be finely controlled during fiber drawing to control sizes of the holes so as to set the optical characteristics of the cores 1 to the desired values, and thus the holes will also be a cause to increase the manufacturing cost.

As described above, the MCF 10 of the present embodiment has the eight or more cores 1 and thus the number of spatial channels per cross-sectional area can be made larger. Furthermore, it has the trench-assisted RI structure with the inner claddings 2 and the trenches 3, and thus it can enhance the confinement effect of light in the cores 1. It also has the common cladding 4 and the OD is 125±1 μm. For this reason, it is possible to use the same peripheral components, such as the connector ferrule, as those for the conventionally-used SSMF. The trenches are effective in enhancing the confinement effect of light in the cores 1 and in letting the cladding-mode light of leakage into the common cladding outside the trenches propagate as it does. Cladding modes include the cladding mode leaking to the outside and the cladding mode confined inside. The one propagating in a first common cladding being a region inside the core group will be tentatively called an inner cladding mode and the one propagating in a second common cladding being a region outside the core group (a region outside the first common cladding 7) an outer cladding mode. Since the fiber has the high-index coating 5, it can suppress propagation of the outer cladding mode. The fiber may also be provided with a cladding mode suppressor 6 in the first cladding region 7, whereby the inner cladding mode can be suppressed. Since these make the MPI or the like less likely to occur due to recoupling of the cladding mode to the core mode, it is feasible to suppress degradation of signal quality of signal light propagating in the cores 1.

The TL of the cores 1 at the wavelength of 1310 nm is not more than 0.5 dB/km or not more than 0.4 dB/km and the cores 1 have the optical characteristics suitable for transmission near the wavelength of 1310 nm. Therefore, the LL at the wavelength of 1310 nm is sufficiently small. In this case, there is no significant increase of TL, compared to the single-core single-mode fiber compliant with ITU-T G.652 or G.657 commonly used at present, and thus it is favorable.

Since the MFD of the cores 1 at the wavelength of 1310 nm is from 8.0 μm to 10.1 μm, it is feasible to reduce the splice loss in splice to a system or a component premised on the conventional SSMF. It is also preferable because the splice loss can be controlled at a small level even with a certain degree of axial misalignment.

The BL of the cores 1 in the BR of not less than 5 mm or in the BR of not less than 3 mm and, less than 5 mm is not more than 0.25 dB/turn at the wavelength of 1310 nm. For this reason, a significant increase of TL is restrained even with application of a fiber bend of a small BR. The BL of the cores 1 in the BR of 3 mm is not more than 0.10 dB/turn at the wavelength of 1310 nm. For this reason, the IL increase is further restrained even under severer conditions.

Since λ0 of the cores 1 is from 1300 nm to 1324 nm, the CD is kept low in the O-band used in transmission. Therefore, the cost for compensation for chromatic dispersion in transceivers (price and cost of power consumption) is kept down and thus it is preferred. Since λcc of the cores 1 is not more than 1260 nm, it can guarantee the single-mode operation in the O-band used in transmission. Since the XT between the core 1 neighboring to the core 1 concerned and the concerned core 1 is not more than 0.001/km at the wavelength of 1310 nm, or the XTs between the core 1 further neighboring to the core 1 neighboring to the concerned core 1 and the concerned core 1 is not more than 0.001/km at the wavelength of 1310 nm, the XT is low in short-haul transmission.

In the MCF 10, the core 1 the core center of which is located at the shortest distance from the coating 5 (outmost core OC), out of the eight or more cores 1, or each of the eight or more cores 1 has the TL larger than 0.4 dB/km or larger than 0.5 dB/km at the wavelength of 1550 nm or at the wavelength of 1625 nm. For this reason, when the MCF 10 is configured by adopting the structure to make the OCT small and the LL larger at long wavelengths, a larger number of cores 1 or the cores 1 with a larger MFD can be packed in the cladding of about 125 μm. Furthermore, it can expand the design margin for manufacturing to allow for variation in XT and Λ.

In the MCF 10, the eight or more cores 1 are arranged at equal intervals on the same circle with the center being at the center of the common cladding. For this reason, it is feasible to restrain variation in core pitch and in optical characteristics among the cores, in the core arrangement of the circular ring shape.

In the MCF 10, when the diameter of the cores 1 is defined as 2a, the diameter of the inner claddings 2 as 2b, and the diameter of the trenches 3 as 2c, Δ1, Δ2, Δ3, a, b, and c satisfy at least one of the relation:

$$5.27\ \mu m \le 2a \le 8.05\ \mu m$$

$$0.375 \le a/b \le 0.45$$

$$0.26\% \le \Delta 1 \le 0.42\%$$

$$-0.05\% \le \Delta 2 \le 0.15\%$$

$$0.25\% \le \Delta 1 - \Delta 2 \le 0.385\%$$

$$\Delta 3 \le -0.5\%;\ \text{and}$$

the relation:

$$0.478 \le b/c \le 0.816.$$

For this reason, it is easier to realize the optical characteristics satisfactorily suitable for short-haul transmission.

In the MCF 10, Λ between the eight or more cores 1 is not less than 23.3 μm and the OCT is not less than 17.7 μm. For this reason, it is easier to realize the optical characteristics satisfactorily suitable for short-haul transmission.

In the MCF 10, the S0 is not more than 0.092 ps/(nm$^2$·km). For this reason, it is feasible to suppress the distortion of signal waveform due to higher-order CD in high-speed transmission. Even in the case of wavelength division multiplexing transmission being performed using a wide wavelength range in the O-band, the maximum of CD in the used band can be kept down, so as to suppress the distortion of signal waveform.

In the MCF 10, the eight or more cores 1 have the respective RI profiles which are substantially identical with each other. For this reason, variation in transmission characteristics among the cores 1 is restrained. In addition, it can restrain increase in cost necessary for preparing the cores 1 with multiple types of RI profiles instead. Furthermore, users can use the MCF 10 without regard to difference in characteristics of the respective cores.

The MCF 10 is the all-solid optical fiber without holes. In this case, there is no need for performing the process of closing the holes at the fiber end face (process for preventing intrusion of foreign matter). This can reduce the cost for splice of the fiber or attachment of a connector to the fiber. Since there is no need for finely controlling the atmospheric pressure in the holes during the fiber drawing, the manufacturing cost can be reduced.

The present invention is not limited to the above embodiment. For example, the MCF 10 may be modified so that one core 1 out of the eight or more cores 1 is arranged at the center of the common cladding 4.

The MCF 10 only needs to be the trench-assisted RI structure, and the trench layer may be shared between neighboring cores. For example, the MCF 10 may have common trench layers to the neighboring cores in the common cladding 4. For example, the MCF may have a hole-assisted RI structure in which the trench layers are comprised of holes.

The OD only needs to be not more than 126 μm, and is not limited to 125±1 μm.

Figure 31:
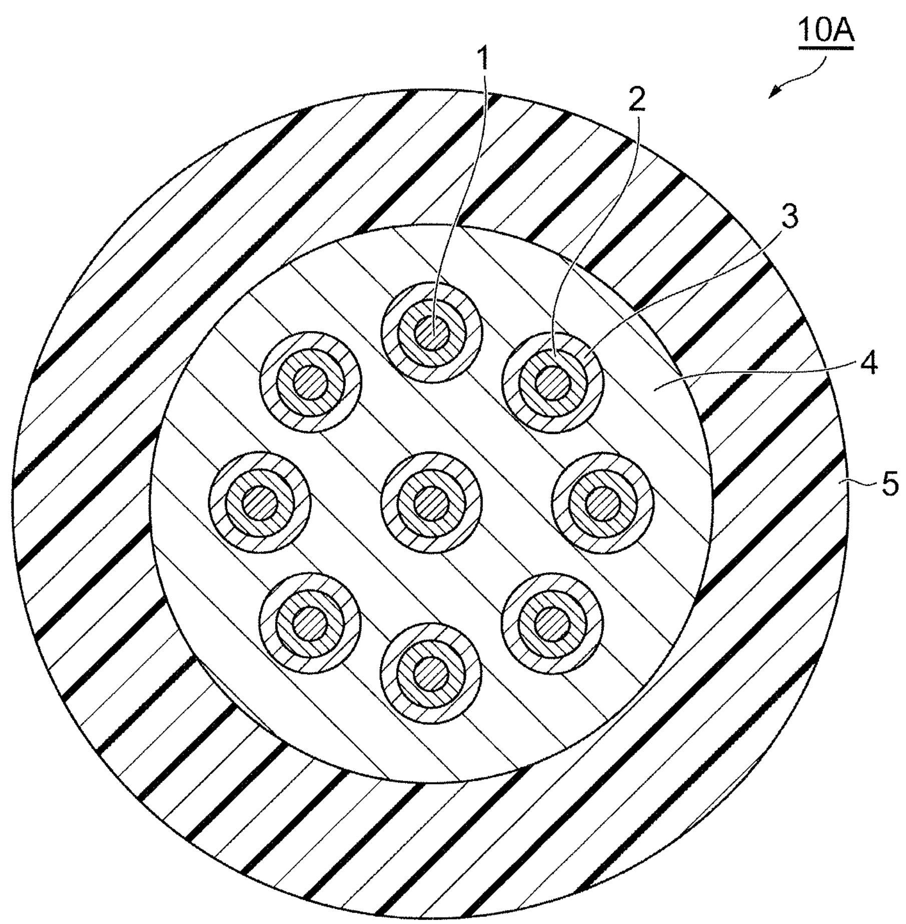
FIG. 31 is a cross-sectional view showing a configuration example of an MCF according to Modification Example 1.

FIG. 31 is a cross-sectional view showing a configuration example of an MCF according to Modification Example 1. As shown in FIG. 31, the MCF 10A according to Modification Example 1 is different from the MCF 10 according to the embodiment, in that the core 1 is also arranged at the center of the common cladding 4, but is identical in the other points. In the MCF 10A, the number of cores 1 is nine.

The MCF 10A can also be used as a conventional one-core fiber. With introduction of the MCF 10A of this arrangement, it can be used as a one-core fiber at first and a transceiver can be replaced with one compatible with the MCF in future, thereby implementing an upgrade of a transmission system without replacement of the fiber. In an environment where there are MCF transmission systems and one-core fiber transmission systems mixed, it is possible to perform physical exercises with the both transmission systems, by preparing only cords and cables of MCF 10A. Since the core 1 is also arranged at the center of the common cladding 4, it becomes feasible to further increase the number of spatial channels per cross-sectional area.

In the MCF 10A, the eight or more cores 1 have the respective RI profiles which are substantially identical with each other, except for the core 1 arranged at the center of the common cladding 4. The core 1 (center core) arranged at the center is subjected to the light confinement effect by the trenches 3 around the cores 1 arranged on the outer periphery (peripheral cores). For this reason, even if the center core is configured using a RI profile with a weaker light confinement effect than that of the peripheral cores, the optical characteristics equivalent to those of the peripheral cores can be realized in some cases.

Figure 32:
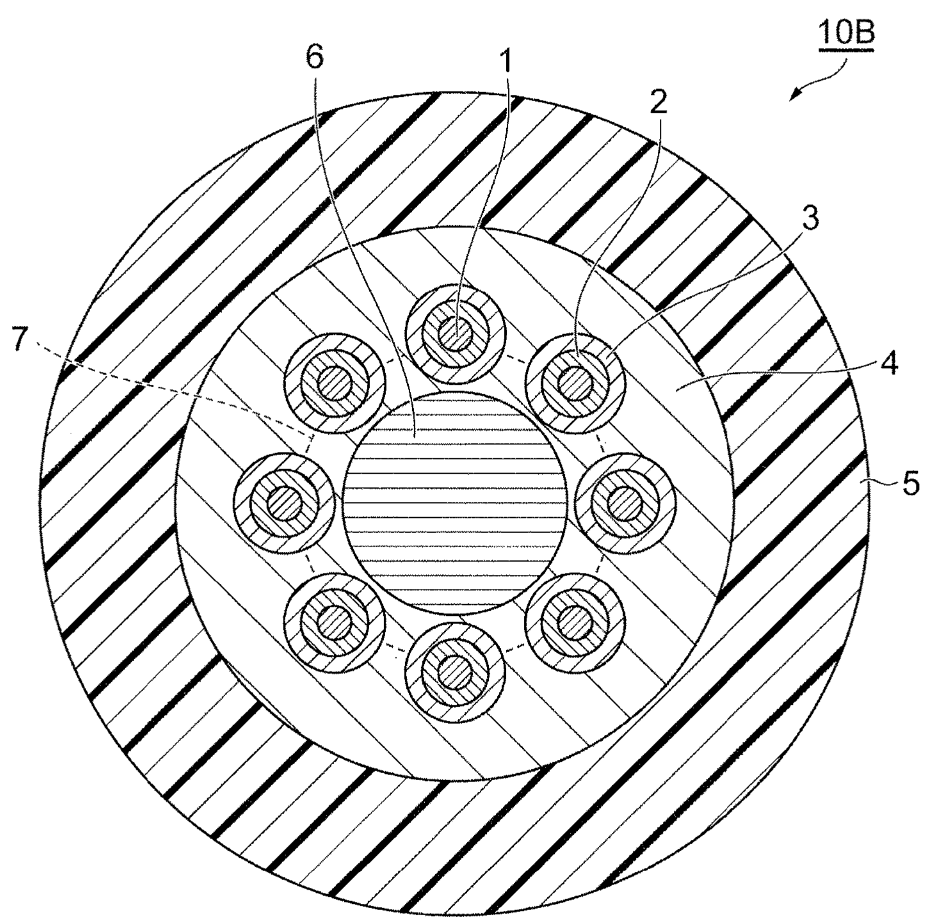
FIG. 32 is a cross-sectional view showing a configuration example of an MCF according to Modification Example 2.

FIG. 32 is a cross-sectional view showing a configuration example of an MCF according to Modification Example 2. As shown in FIG. 32, the MCF 10B according to Modification Example 2 is different from the MCF 10 according to the embodiment, in that it further has a trench-guided cladding mode suppressor 6 with a low RI, and is identical in the other points. The trench-guided cladding mode suppressor 6 is arranged so as to include a part or the whole of the first common cladding 7. The first common cladding 7 is a portion surrounded by three or more cores 1 in the common cladding 4 and, more precisely, it is an interior of a region defined by line segments connecting the trenches 3 through the shortest distance between neighboring cores of the three or more cores 1 and by interfaces between the trenches 3 and the common cladding 4. The trench-guided cladding mode suppressor 6 is arranged so as not to contact the trenches 3 around the cores 1. Namely, the trench-guided cladding mode suppressor 6 is separated from the trenches 3 around the cores 1. In the MCF 10B according to Modification Example 2, the cores 1 surrounding the first common cladding 7 are arranged in a circular ring shape but they may be arranged to surround the first common cladding 7 by arrangement except for the circular ring shape.

In the MCF 10 according to the embodiment of the invention, the three or more cores 1 having the trenches 3 are arranged in the circular ring shape in the common cladding 4, whereby the interior of the circular ring (first common cladding 7) is surrounded by the trenches 3 of the cores 1. In this case, this surrounding structure may serve as a waveguide structure, to guide light of wavelengths below a certain wavelength to the interior of the circular ring and make the light guided therein. Because of the splice loss and BL, or, because of XT from the cores 1, light may be coupled to a mode guided inside the circular ring (trench-guided cladding mode) and the light may be recoupled to the core 1 to cause multi-path interference or the like, resulting in degradation of transmission quality.

The MCF 10B according to Modification Example 2 is provided with the trench-guided cladding mode suppressor 6 with the low RI as properly designed inside the circular ring in the common cladding 4. This can weaken the confinement of light effected by the trenches 3. As a result of this, the BL in the BR of 140 mm of the trench-guided cladding mode at the wavelength of 1.26 μm can be made not less than 19.3 dB/20 m. Therefore, the trench-guided cladding mode is cut off in the wavelength band used in transmission, and the aforementioned multi-path interference can be suppressed thereby.

Figure 33:
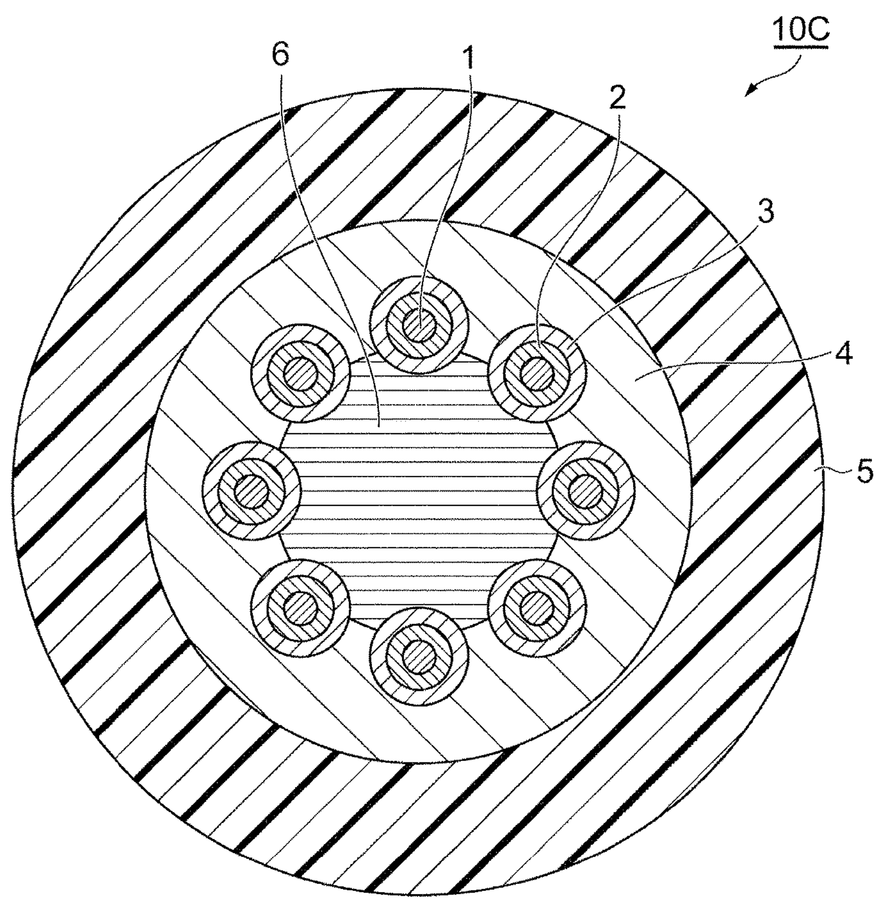
FIG. 33 is a cross-sectional view showing a configuration example of an MCF according to Modification Example 3.

FIG. 33 is a cross-sectional view showing a configuration example of an MCF according to Modification Example 3. As shown in FIG. 33, the MCF 10C according to Modification Example 3 is different from the MCF 10B according to Modification Example 2, in that the trench-guided cladding mode suppressor 6 is arranged in contact with the trenches 3 of the cores 1, and is identical in the other points. The MCF 10C according to Modification Example 3 achieves the same effect as the MCF 10B according to Modification Example 2.

In the MCF 10B according to Modification Example 2 and the MCF 10C according to Modification Example 3, the core 1 may be arranged inside the trench-guided cladding mode suppressor 6. The core 1 arranged inside the trench-guided cladding mode suppressor 6 may have a RI profile different from those of the cores 1 arranged in the circular ring shape.

In the case where the trench-guided cladding mode suppressor 6 is in contact with the trenches 3 of the cores 1 arranged in the circular ring shape, i.e., in the case of the modification example according to Modification Example 3, the MCF may be manufactured by separately preparing a glass rod for the center cladding mode suppressor, a pipe for the common cladding, and core rods provided with trenches, combining them together to form an optical fiber preform, and drawing the optical fiber preform.

The trench-guided cladding mode suppressor 6 may be comprised of a glass with a thermal expansion coefficient different from that of the common cladding 4 excluding the trench-guided cladding mode suppressor 6, whereby a stress may be applied to each of the eight or more cores 1. This stress application causes the eight or more cores 1 to have birefringence, whereby each of the eight or more cores 1 comes to have a polarization maintaining function. In implementing input/output from a silicon photonics waveguide to the optical fiber with use of a grating coupler, the possession of the polarization maintaining function allows the single polarization grating coupler to be also used in coupling from the optical fiber to the silicon photonics optical waveguide. In the case of the optical fiber without the polarization maintaining function, it is necessary to use a polarization diversity type grating coupler in coupling from the optical fiber to the silicon photonics optical waveguide, and an extra space is needed on a silicon photonics optical waveguide substrate, when compared with the case using the single polarization grating coupler. In coupling from the optical fiber to the silicon photonics optical waveguide, in order to keep the coupling loss due to incapability of reception of unused polarization not more than 0.1 dB, not more than 0.2 dB, not more than 0.5 dB, or not more than 1 dB, the polarization crosstalk is desirably not more than −16.4 dB, not more than −13.5 dB, not more than −9.6 dB, or not more than −6.9 dB, respectively. The values of polarization crosstalk are desirably satisfied when the fiber length is in the range of 30 m to 10 km, 50 m to 2 km, 50 m to 500 m, or 500 m to 2 km.

Each of the eight or more cores 1 with the polarization maintaining function desirably has the birefringence of not less than $10^{-4}$ because it can suppress the polarization crosstalk. When the common cladding 4 is made of silica-based glass, the trench-guided cladding mode suppressor 6 is desirably comprised of boron-doped silica-based glass.

Specifically, in the MCF structures of FIGS. 32 and 33, the trench-guided cladding mode suppressor 6 desirably does not have only the cladding mode suppressing function but also has a stress applying function to each core 1. Namely, the cladding mode suppressing function suppresses the cladding mode generated in the first common cladding 7 and the stress applying function keeps each of the cores 1 located around the trench-guided cladding mode suppressor 6, in a polarization maintaining state in which two orthogonal polarization modes are not mixed. When the trench-guided cladding mode suppressor 6 is provided with the cladding mode suppressing function and the stress applying function in this manner, it becomes feasible to suppress generation of the cladding mode and suppress crosstalk between orthogonal polarization modes in each of the cores 1. The trench-guided cladding mode suppressor 6, in terms of material, may be one obtained by doping silica glass with a dopant as used in the existing stress applying members, or one obtained by forming fine bubbles or air holes in silica glass.

Figure 34:
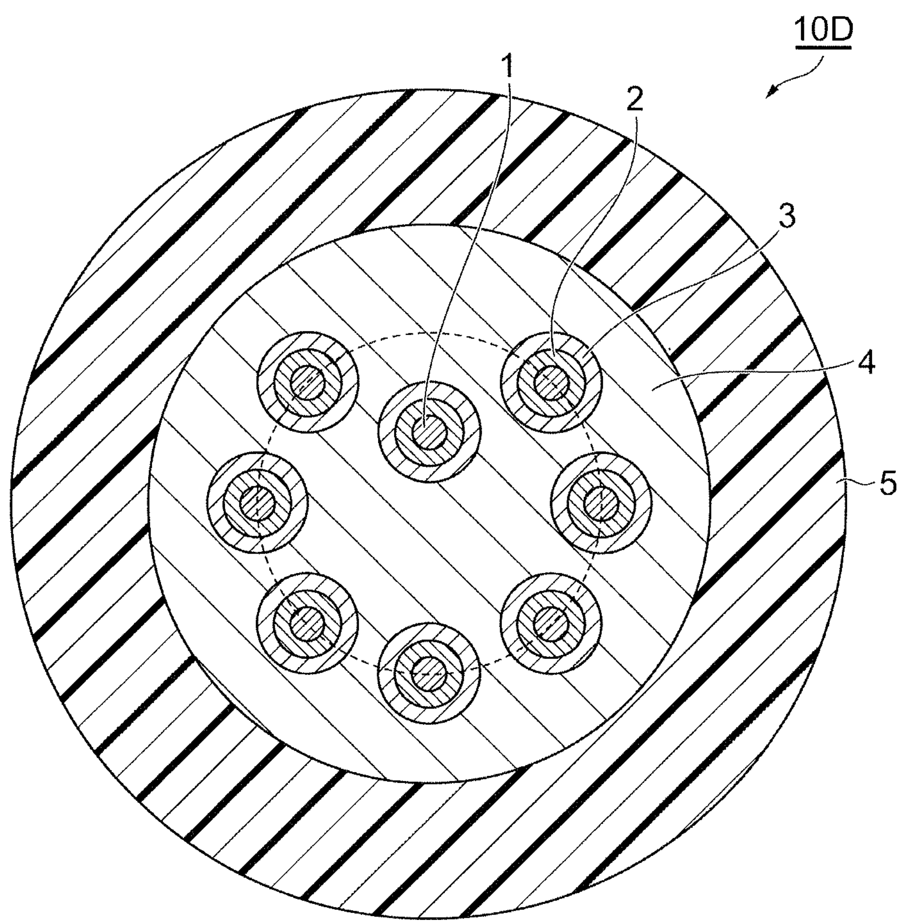
FIG. 34 is a cross-sectional view showing a configuration example of an MCF according to Modification Example 4.

FIG. 34 is a cross-sectional view showing a configuration example of an MCF according to Modification Example 4. As shown in FIG. 34, the MCF 10D according to Modification Example 4 is different from the MCF 10 according to the embodiment, in that a plurality of cores 1 except for one core are arranged in a circular ring shape and the one core is arranged inside the circular ring, and is identical in the other points. In the MCF 10D, the core arrangement has no two- or more-fold rotational symmetry. In the MCF 10D, it is possible to determine to which core 1 each core 1 corresponds.

Figure 35:
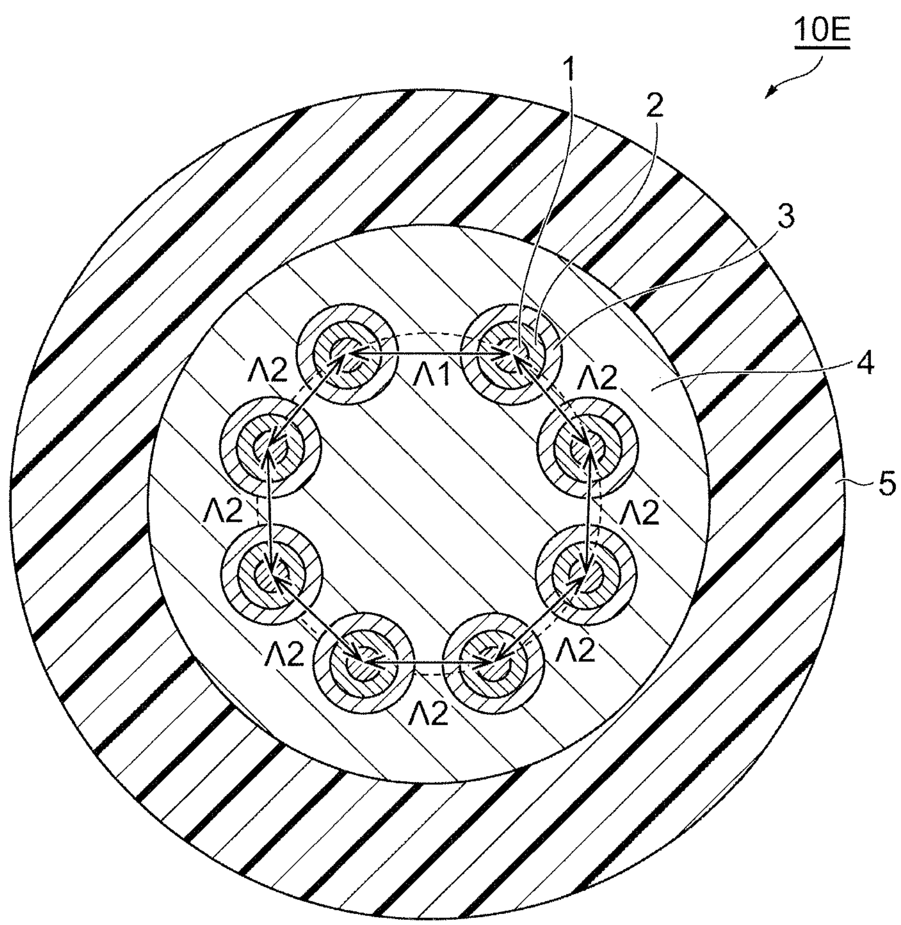
FIG. 35 is a cross-sectional view showing a configuration example of an MCF according to Modification Example 5.

FIG. 35 is a cross-sectional view showing a configuration example of an MCF according to Modification Example 5. As shown in FIG. 35, the MCF 10E according to Modification Example 5 is different from the MCF 10 according to the embodiment, in that Λs are not identical but different, and is identical in the other points. Specifically, in the MCF 10E, there is one portion with Λ1 and a plurality of cores 1 are arranged at Λ2 smaller than Λ1 in the other portions. In the MCF 10E, the core arrangement has no two- or more-fold rotational symmetry. In the MCF 10E, it is possible to determine to which core 1 each core 1 corresponds.

Figure 36:
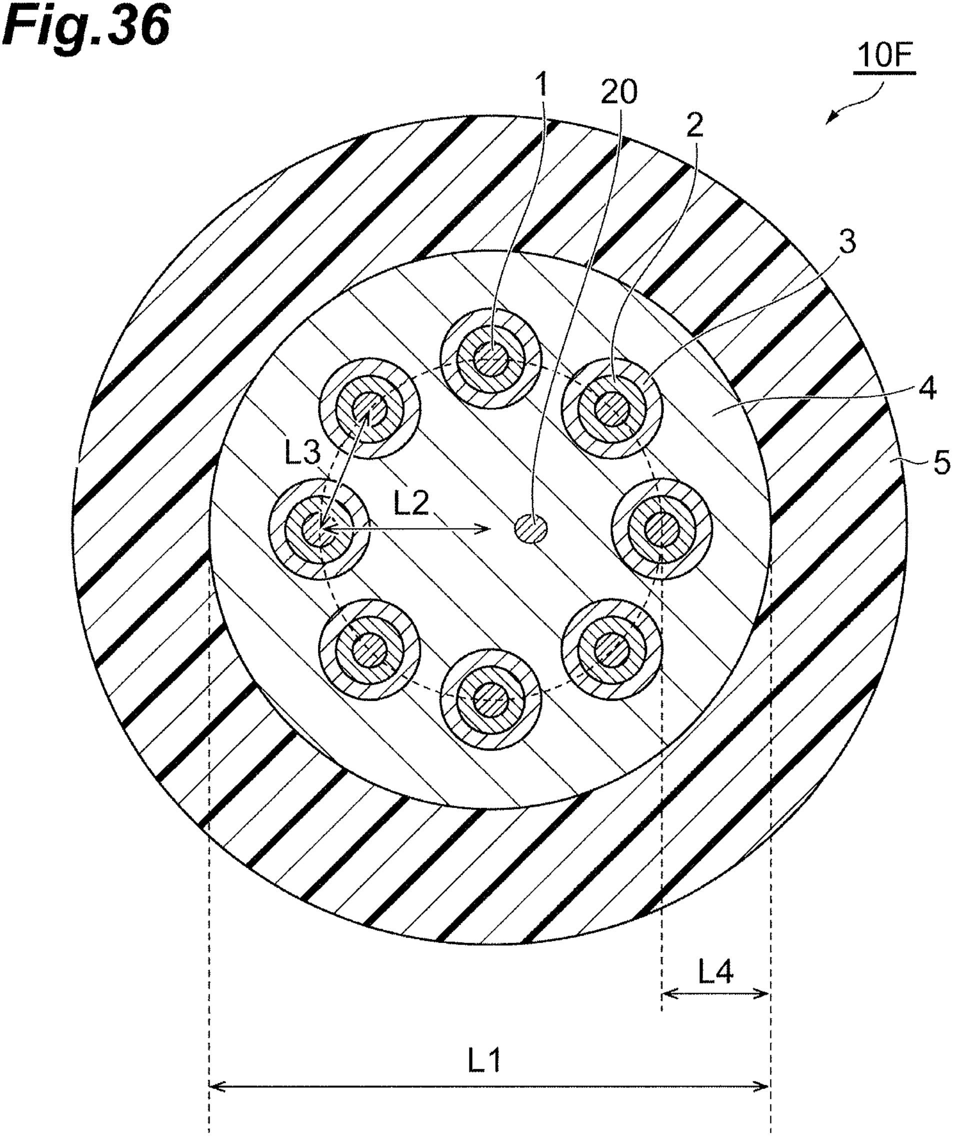
FIG. 36 is a cross-sectional view showing a configuration example of an MCF according to Modification Example 6.

FIG. 36 is a cross-sectional view showing a configuration example of an MCF according to Modification Example 6. As shown in FIG. 36, the MCF 10F according to Modification Example 6 is different from the MCF 10 according to the embodiment, in that a marker 20 for visual confirmation is further provided, and is identical in the other points. The marker 20 is surrounded by the common cladding 4. A cross-sectional shape of the marker 20 is circular. The marker 20 is arranged along the fiber axis in parallel to the cores 1 in the common cladding 4. The RI of the marker 20 is different from that of the common cladding 4. The marker 20 is arranged so that member arrangement in the common cladding 4 including the marker 20 and the cores 1 has no two- or more-fold rotational symmetry. For this reason, the MCF 10F allows us to determine to which core 1 each core 1 corresponds.

The below will describe an optical cable according to the embodiment of the invention.

Figure 37A:
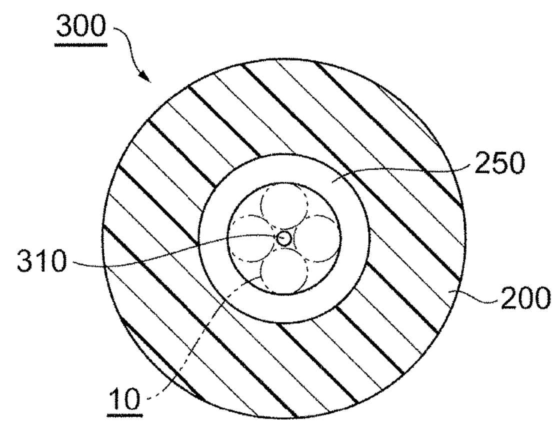
FIGS. 37A and 37B are drawings showing a configuration example of an optical cable according to an embodiment of the invention.
Figure 37B:
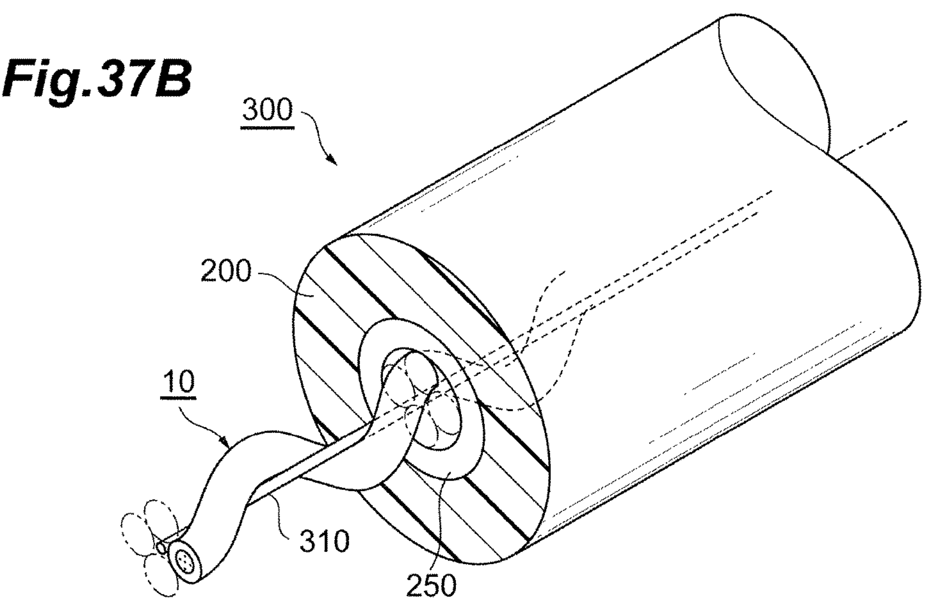

FIGS. 37A and 37B are drawings showing a configuration example of an optical cable according to the embodiment of the invention. FIG. 37A is a cross-sectional view of the optical cable and FIG. 37B a perspective view of the optical cable. As shown in FIGS. 37A and 37B, the optical cable 300 has a support member 310, a plurality of MCFs 10 wound at a predetermined pitch on the support member 30 so as to be spirally twisted together around the support member 310 as a center axis, a strength member 250 wound on the MCFs 10 so as to maintain their wound state, and a cable jacket 200 covering the periphery of the strength member 250. In this example, the optical cable 300 holds four MCFs 10.

Even in a straight state of the cable, each of the MCFs 10 is given a bend in a constant radius of curvature CR because it is wound at the predetermined pitch along its longitudinal direction on the support member 310. The cable jacket 200 covers the whole of the strength member 250 so as to protect the MCFs 10 from external force. The strength member 250 may be, for example, aramid fiber ("Kevlar (registered trademark)" manufactured by DU PONT-TORAY CO., LTD. or "Technora (registered trademark)" manufactured by TEIJIN LIMITED) or the like. As the strength member 250 is provided, the MCFs 10 become less likely to be subjected to elongation strain with a stretch of the optical cable 300, and it can exercise a cushion effect to function to protect the MCFs 10 from external impact.

The support member 310 may be a metal material such as an anti-tension wire or may be an anti-shrinkage material resistant to shrinkage of the cable jacket 200. In FIG. 37B, there is only one MCF 10 illustrated for simplicity of illustration, but in fact all the MCFs 10 included in the optical cable 300 are wound on the support member 310.

As the optical cable 300 includes the MCF spiral bundle prepared by twisting the plurality of MCFs 10 in the spiral form, the MCFs 10 can be included in a bent state in which an average BR of the MCFs 10 is not more than 1 m, not more than 0.2 m, not more than 0.1 m, or not more than 0.05 m.

The optical cables according to the present invention are not limited to the above configuration. For example, the support member 310 may be excluded. It is also possible to prepare first MCF spiral bundles by twisting a plurality of MCFs in a spiral form as described above, thereafter twist the plurality of first MCF spiral bundles in a spiral form to prepare a second MCF spiral bundle, and set the second MCF spiral bundle in the optical cable 300. This allows the MCFs 10 to be set in the optical cable while they are bent in an average BR of the MCFs 10 of not more than 1 m, not more than 0.2 m, not more than 0.1 m, or not more than 0.05 m.

The below will describe an optical connector according to the embodiment.

Figure 38:
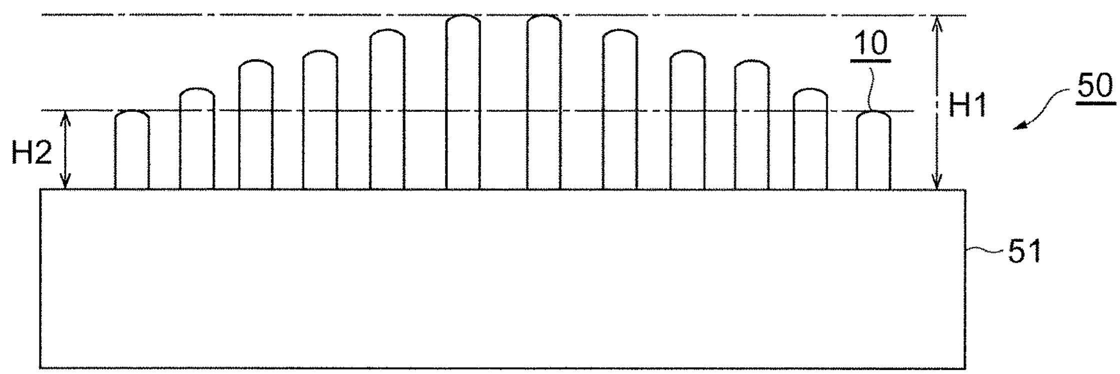
FIG. 38 is a drawing showing a configuration example of an optical connector according to an embodiment of the invention.

FIG. 38 is a drawing showing a configuration example of the optical connector according to the present embodiment. As shown in FIG. 38, the optical connector 50 has a resin ferrule 51 and the MCF 10 held in the resin ferrule 51. The optical connector 50 is one including one or more MCFs 10 and may be a multi-fiber optical connector including two or more MCFs 10. In this example, the optical connector 50 includes four or more MCFs 10. The optical connector 50 is, for example, an optical connector obtained by mounting twelve MCFs 10 in a standard MPO connector for twelve fibers (using a standard 12-fiber MT ferrule and having fiber holding holes for holding the MCFs 10, linearly arranged at the pitch of 250 μm). The end face of the optical connector 50 is polished.

Figure 39:
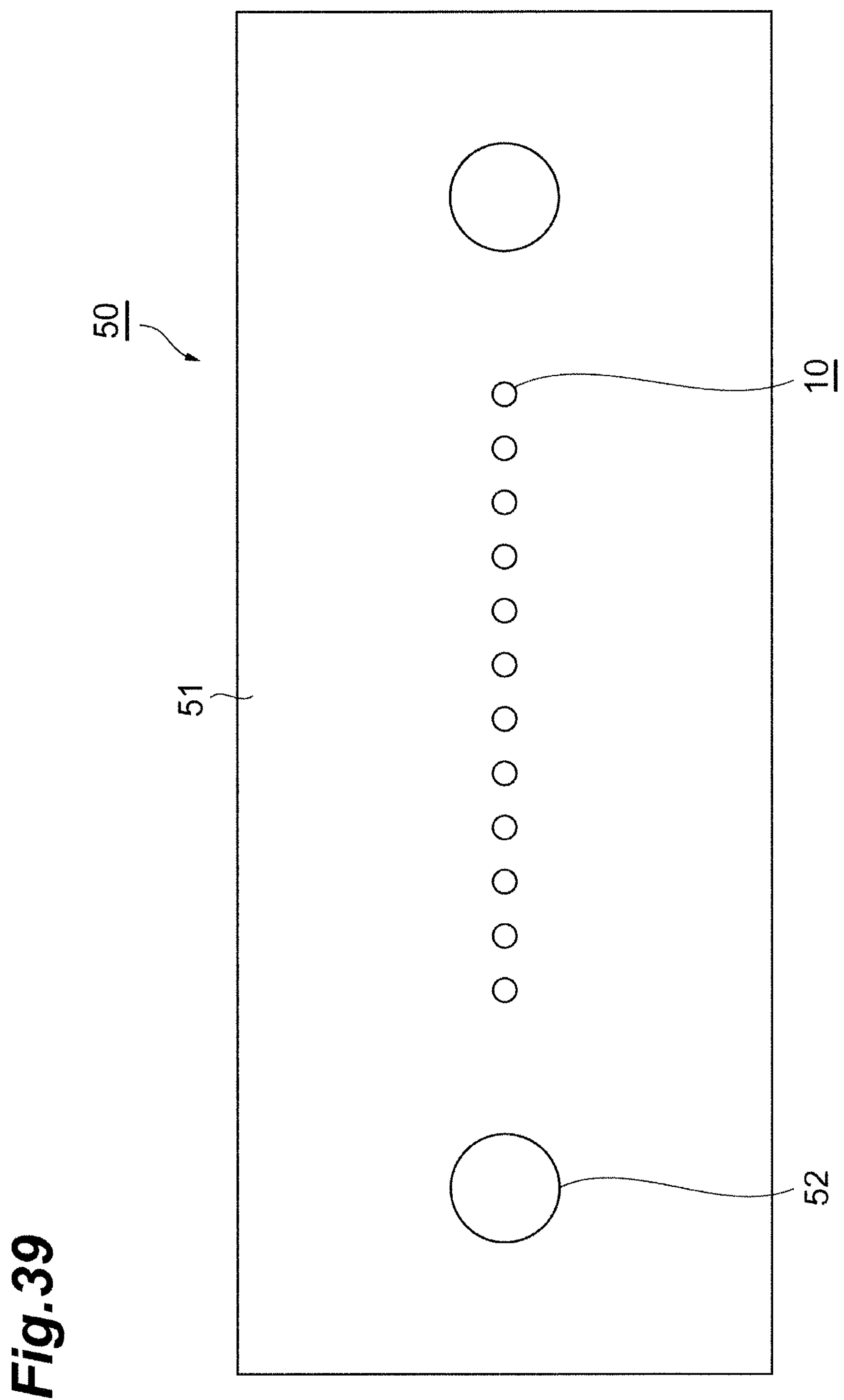
FIG. 39 is a schematic drawing of a connection end face of the optical connector according to the embodiment of the invention.

FIG. 39 is a schematic drawing of the connection end face of the optical connector according to the present embodiment. As shown in FIG. 39, the twelve MCFs 10 are held in the respective fiber holding holes arranged at equal intervals on one straight line. The resin ferrule 51 is provided with a pair of guide holes 52 on both sides of the MCFs 10. The guide holes 52 are used for alignment of each core 1 in the MCFs 10 in connection between a pair of optical connectors 50. Namely, the connection end faces of the pair of optical connectors 50 are made to butt against each other with guide pins being inserted in the guide holes 52, whereby the cores 1 of the MCFs 10 are aligned and connected.

Figure 40:
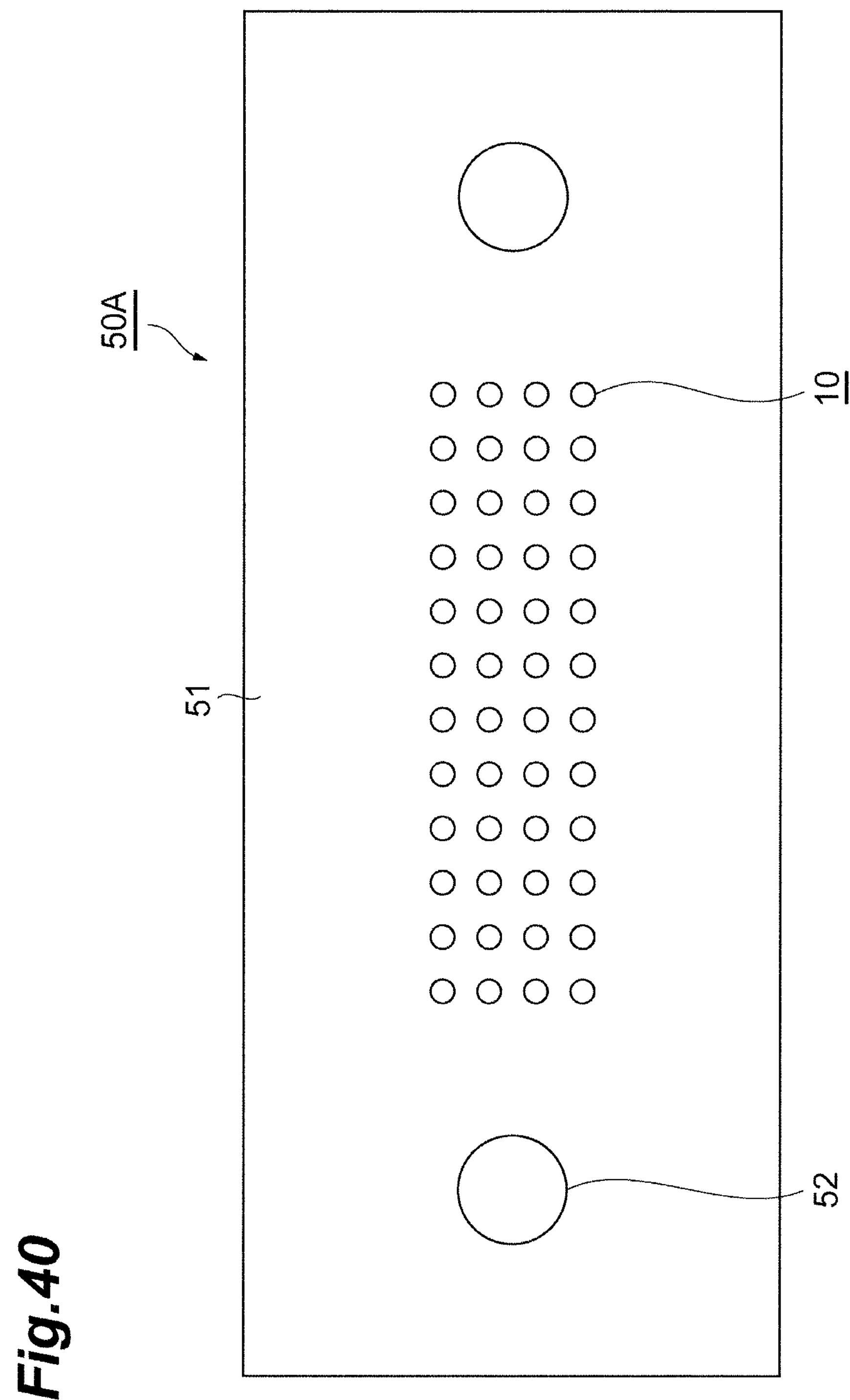
FIG. 40 is a schematic drawing of the connection end face in another example of the optical connector according to the embodiment of the invention.

The MCFs 10 are linearly held at the predetermined pitch in the resin ferrule 51. The MCFs 10 project by predetermined projection amounts from the end face of the resin ferrule 51. The projection amounts are, for example, not less than 2 μm. Among the plurality of MCFs 10 lineally arranged, the MCF 10 located at the center has the largest projection amount H1 and the MCFs 10 located at the two ends (the end fibers) have the smallest projection amount H2. Variation of the projection amounts is kept, for example, not more than 0.3 μm. The tips of the MCFs 10 are processed in a spherical shape. All the MCFs 10 do not always have to be arranged on the common straight line, but the MCFs 10 may be held at the predetermined pitch on a plurality of straight lines, as in an optical connector 50A shown in FIG. 40.

The below will describe a specific example of the MCF 10.

A configuration of the MCF according to the present specific example corresponds to the configuration of the MCF 10F (FIG. 36) according to Modification Example 6. In the present specific example, the OD (L1) was 125 μm, the distances (L2) between the core centers and the fiber center were not more than 40.5 μm, Λ (L3) was 31 μm, and the OCT (L4) not more than 22 μm. Furthermore, Δ1 was 0.35%, Δ2 0.05%, Δ3—0.70%, and Δ4 0%. In addition, 2a was 6.38 μm, a/b 0.4, and b/c 0.619.

FIG. 41 is a table showing the optical characteristics in the O-band (1260 to 1360 nm) of the respective cores in the MCF according to the present specific example. FIG. 41 shows the TL at the wavelength of 1310 nm, λcc, MFD at the wavelength of 1310 nm, λ0, S0, and BL in the BR of 3 mm at the wavelength of 1310 nm, for each of the eight cores #1 to #8. An average power coupling coefficient between neighboring cores at the wavelength of 1310 nm is $3.3\times10^{-7}$/km in a wound state on a bobbin of 76.2 mm.

Figure 42:
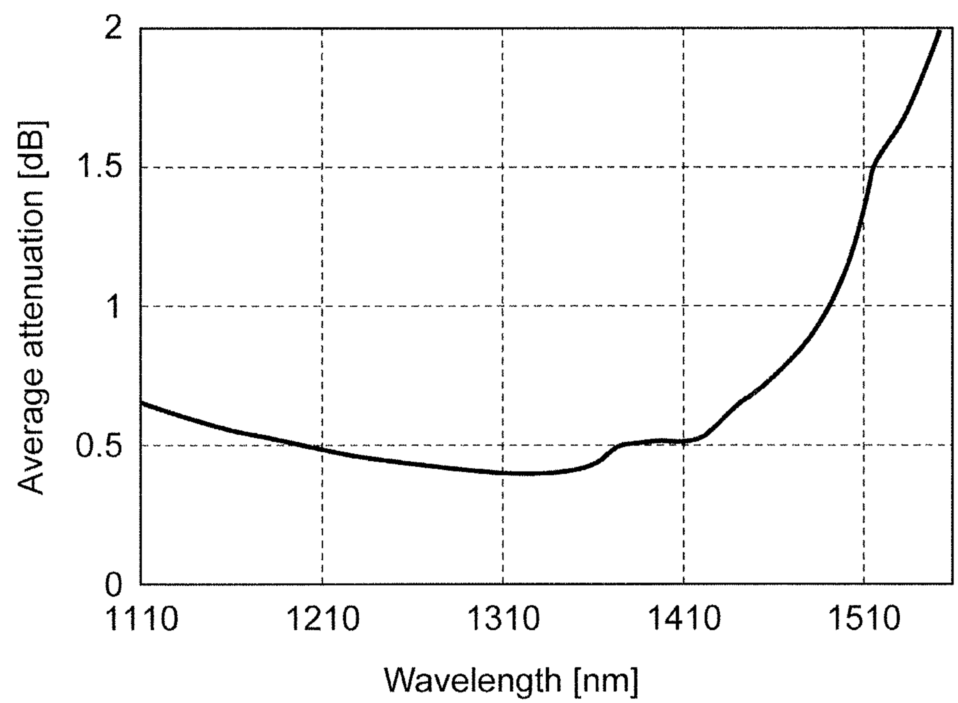
FIG. 42 is a drawing showing a transmission loss spectrum of the eight cores in the MCF according to the specific example.

FIG. 42 is a drawing showing an average transmission loss spectrum of the eight cores #1 to #8 in the MCF according to the present specific example. As shown in FIG. 42, the loss is maintained low in the O-band but the TL occurs far over 1 dB/km in the long wavelength band of 1550 nm and others. This TL increase in the long wavelength band is caused by LL into the coating. This LL into the coating in the long wavelength band is daringly permitted, whereby it becomes feasible to achieve both of the good optical characteristics in the O-band and inclusion of the eight or more cores in the cladding with the diameter of 125 μm.

Next, on the assumption of connection of MCFs each having eight cores arranged in a ring shape with use of a 12-fiber connector (12-MPO connector) as the multi-core optical connector according to the embodiment of the invention, we conducted the analysis by CAE on fiber shape and pressing force of the connector end face for achieving physical contact (PC) connection of all the cores. The PC connection is connection in a state in which the fiber end faces polished in the spherical shape are elastically deformed by pressing force so as to come into face contact, whereby the cores are in contact with each other without a physical gap.

(1) Fiber Model

The fiber model was an MCF corresponding to the configuration of the MCF 10 shown in FIG. 3. The OD (L1 (cf. FIG. 36)) was 125 μm, the MFD 8.5 μm, the core constellation the ring shape comprised of eight cores arranged at the equal pitch, and the distances (L2 (cf. FIG. 36)) between the core centers and the fiber center were not more than 40.5 μm.

(2) Connector Model

The connector model was an optical connector corresponding to the configuration of the optical connector 50 shown in FIG. 38. The optical connector was one obtained by mounting twelve MCFs in the 12-fiber standard MPO connector (12-MPO connector). The projection amount H1 was 2.5 μm. The projection amount H2 was 2.3 μm. These values are typical vales empirically obtained. The end face of the resin ferrule was an ideal flat plane and had no inclination of the plane. The tips of the MCFs were processed in the spherical shape in the radius of curvature of 6.0 mm. There was no polished top offset. The polished top offset is a distance on a plane perpendicular to the fiber axis between "the most projecting part of the fiber end face polished in the spherical shape" and "the fiber center." No polished top offset means that the most projecting part is the fiber center in the fiber end face polished in the spherical shape.

(3) PC Connection Model

In the PC connection model, all the regions (φ 10 μm) of the eight cores of each MCF were assumed to be in face contact (PC connection). The load to bring all of the eight cores in each of the twelve MCFs (96 cores in total) into PC connection was calculated by CAE analysis.

Figure 43:
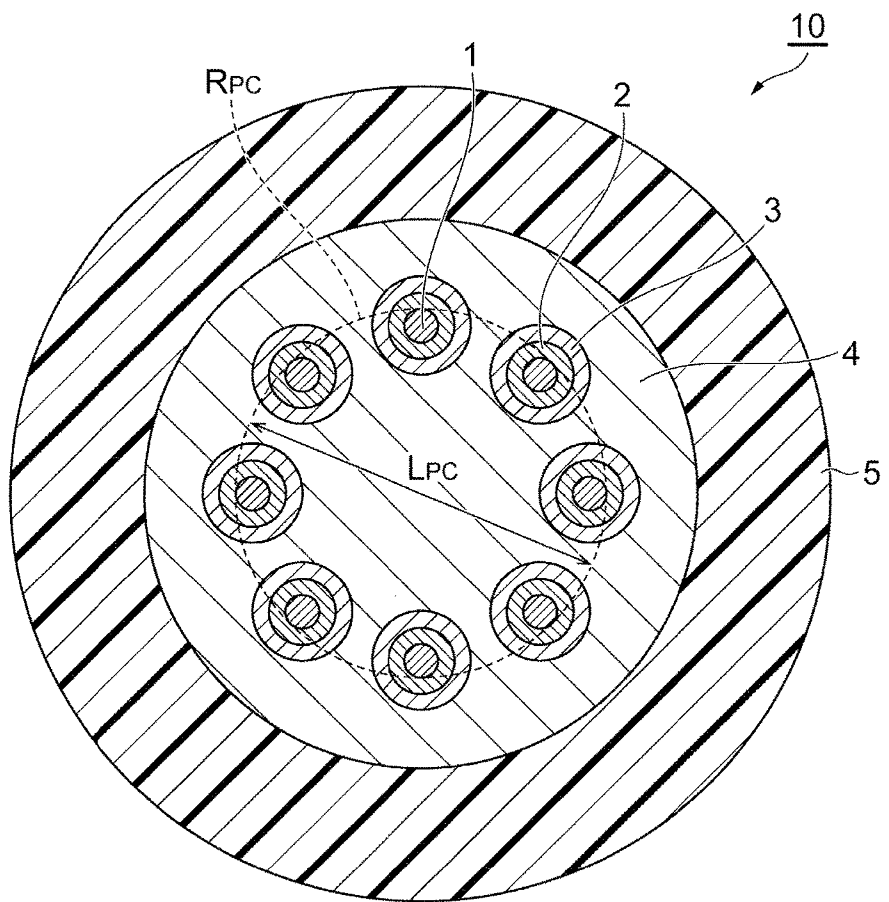
FIG. 43 is a drawing illustrating a PC region in a PC (Physical Contact) connection model.

FIG. 43 is a drawing illustrating a PC region in the PC connection model. As shown in FIG. 43, the PC region $R_{PC}$ is a region necessary for all the regions (φ 10 μm) of the eight cores 1 in the MCF 10 to be in face contact (PC connection) and is located in the central portion (φ 91μ) of the MCF 10. Namely, the diameter $L_{PC}$ of the PC region $R_{PC}$ is 91 μm.

Figure 44A:
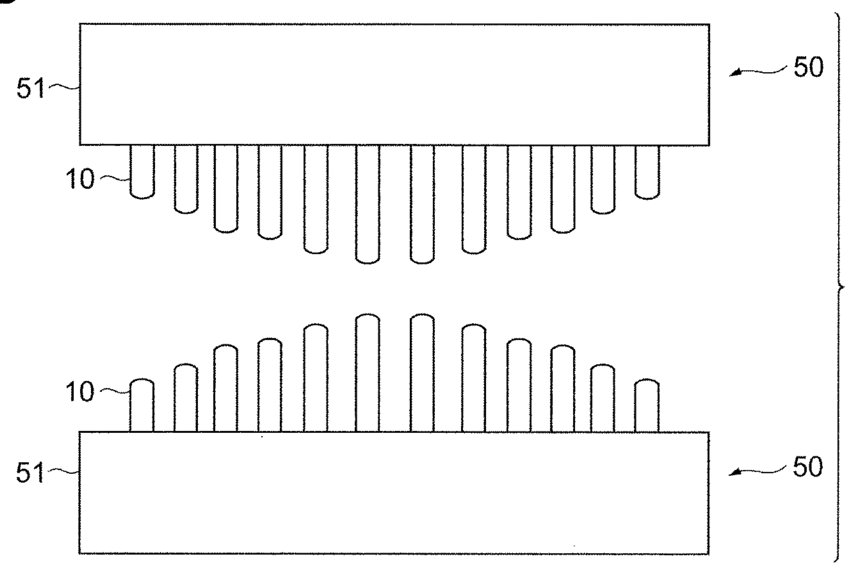
FIGS. 44A and 44B are drawings illustrating PC connection between optical connectors.
Figure 44B:
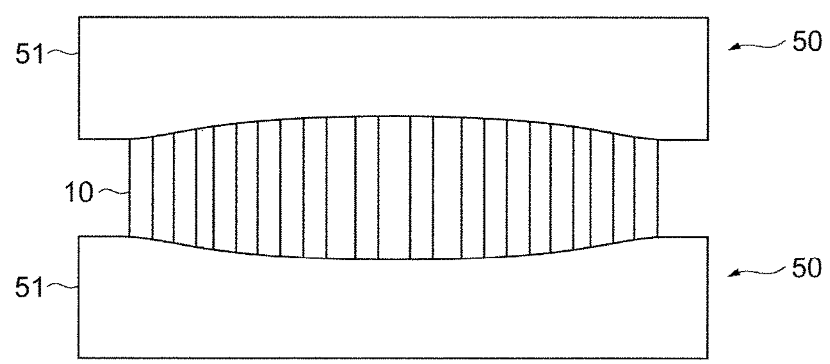

FIGS. 44A and 44B are drawings illustrating the PC connection between optical connectors. FIG. 44A is a drawing illustrating a state before the PC connection between a pair of optical connectors 50 and FIG. 44B a drawing illustrating a state after the PC connection between the pair of optical connectors 50. As shown in FIGS. 44A and 44B, the pair of optical connectors 50 are made to butt against each other and to be connected so that the projecting end faces of the MCFs 10 are opposed to each other. The thickness of an adhesive was set to 0.5 μm. In the optical connectors 50 after the PC connection, the resin of the resin ferrules 51 has been bent so as to make the butting end faces linear.

The most difficult fibers to be brought into the PC connection out of the twelve MCFs 10 coupled to the MT ferrule are the end fibers located at the two ends. Namely, the largest load is needed for the PC connection of the fibers at the two ends. Therefore, as long as the load is confirmed in the PC connection of the end fibers, the remaining ten fibers must be in the PC connection. The analysis model was assumed to be symmetric with respect to a horizontal line and a vertical line and the calculation was performed using a quarter model.

Figure 45:
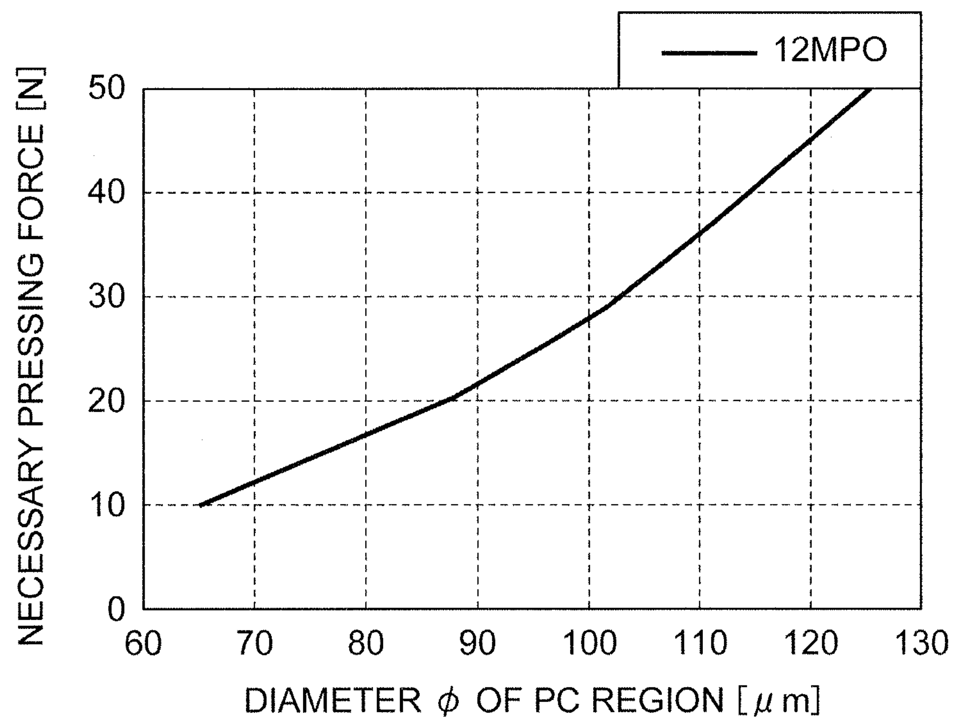
FIG. 45 is a drawing showing a relation between pressing force and diameter of the PC region.

FIG. 45 is a drawing showing a relation between pressing force and diameter of the PC region. This relation was calculated from the CAE analysis as to the end fibers of the 12-MPO connector. As shown in FIG. 45, when the diameter Φ of the PC region is 91 μm, the necessary pressing force is 22 N. Namely, the pressing force necessary for the PC connection of all the eight cores of one MCF is 22 N.

REFERENCE SIGNS LIST

1 cores; 2 inner claddings; 3 trenches; 4 common cladding; 5 coating; 6 trench-guided cladding mode suppressor;

7 first common cladding; 10, and 10A to 10F MCFs (multi-core optical fibers); 50 and 50A optical connectors; 51 resin ferrule; 300 optical cable.

The invention claimed is:

1. A multi-core optical fiber comprising:

eight or more core units each having a core, an inner cladding surrounding the core, and a trench surrounding the inner cladding;

a common cladding individually surrounding each of the eight or more core units; and a resin coating surrounding the common cladding, wherein each of the cores, each of the inner claddings, each of the trenches, and the common cladding are comprised of silica-based glass, wherein a diameter of the common cladding is not more than 126 μm, and wherein the multi-core optical fiber satisfies Condition A or Condition B as defined below:

(Condition A)

when relative RI differences of each core, each inner cladding, each trench, the common cladding, and the coating with respect to a predetermined RI are defined as Δ1, Δ2, Δ3, Δ4, and Δ5, respectively, each core, each inner cladding, each trench, the common cladding, and the coating satisfy the following conditions:

$$\Delta5>\Delta1>\Delta2>\Delta3; \text{ and}$$

$$\Delta1>\Delta4>\Delta3;$$

(Condition B)

optical characteristics of each core are as follows:

a transmission loss is not more than 0.5 dB/km or not more than 0.4 dB/km at a wavelength of 1310 nm;

a mode field diameter is from 8.0 μm to 10.1 μm at the wavelength of 1310 nm;

a bending loss in a bending radius of not less than 5 mm or in the bending radius of not less than 3 mm and, less than 5 mm is not more than 0.25 dB/turn at the wavelength of 1310 nm; and an inter-neighboring-core crosstalk between a concerned core, out of the cores, and a core neighboring to the concerned core or a secondary inter-neighboring-core crosstalk between the concerned core and another core neighboring to the core neighboring to the concerned core is not more than 0.001/km at the wavelength of 1310 nm.

2. The multi-core optical fiber according to claim 1, wherein the diameter of the common cladding is not less than 124 μm.

3. The multi-core optical fiber according to claim 1, wherein the transmission loss of an outmost core a core center of which is located at a smallest distance from the coating, out of the cores, is larger than 0.5 dB/km at a wavelength of 1550 nm or at a wavelength of 1625 nm, or, the transmission losses of the cores are larger than 0.4 dB/km at the wavelength of 1550 nm or at the wavelength of 1625 nm.

4. The multi-core optical fiber according to claim 1, wherein the cores are arranged on an identical circumference centered at a center of a cross section of the common cladding.

5. The multi-core optical fiber according to claim 4, wherein the cores are arranged at equal intervals.

6. The multi-core optical fiber according to claim 1, wherein when Conditions 0 to 10 are defined as below using 2a as a diameter of each core, 2b as a diameter of each inner cladding, and 2c as a diameter of each trench:

$$5.27\ \mu m \le 2a \le 8.05\ \mu m$$

$$0.375 \le a/b \le 0.45$$

$$0.478 \le b/c \le 0.816$$

$$0.26\% \le \Delta1-\Delta4 \le 0.42\%$$

$$-0.05\% \le \Delta2-\Delta4 \le 0.15\%$$

$$0.25\% \le \Delta1-\Delta2 \le 0.385\%$$

$$\Delta3-\Delta4 \le -0.5\%; \quad \text{(Condition 0)}$$

$$6.16\ \mu m \le 2a \le 7.01\ \mu m$$

$$0.385 \le a/b \le 0.473$$

$$0.597 \le b/c \le 0.729$$

$$0.266\% \le \Delta1 \le 0.409\%$$

$$-0.034\% \le \Delta2 \le 0.071\%$$

$$-0.566\% \le \Delta3 \le -0.284\%$$

$$-0.015\% \le \Delta4 \le 0.222\%; \quad \text{(Condition 1)}$$

$$6.73\ \mu m \le 2a \le 8.08\ \mu m$$

$$0.357 \le a/b \le 0.530$$

$$0.687 \le b/c \le 0.815$$

$$0.297\% \le \Delta1 \le 0.403\%$$

$$-0.053\% \le \Delta2 \le 0.034\%$$

$$-0.694\% \le \Delta3 \le -0.271\%$$

$$-0.017\% \le \Delta4 \le 0.196\%; \quad \text{(Condition 2)}$$

$$6.47\ \mu m \le 2a \le 7.64$$

$$0.359 \le a/b \le 0.435$$

$$0.695 \le b/c \le 0.819$$

$$0.264\% \le \Delta1 \le 0.409\%$$

$$-0.067\% \le \Delta2 \le 0.060\%$$

$$-1.020\% \le \Delta3 \le -0.392\%$$

$$-0.017\% \le \Delta4; \quad \text{(Condition 3)}$$

$$7.14\ \mu m \le 2a \le 8.10\ \mu m$$

$$0.322 \le a/b \le 0.483$$

$$0.744 \le b/c \le 0.859$$

$$0.328\% \le \Delta1 \le 0.412\%$$

$$-0.037\% \le \Delta2 \le 0.043\%$$

$$-1.426\% \le \Delta3 \le -0.495\%$$

$$-0.022\% \le \Delta4 \le 0.161\%; \quad \text{(Condition 4)}$$

$$6.65\ \mu m \le 2a \le 7.01\ \mu m$$

$$0.385 \le a/b \le 0.410$$

$0.597 \leq b/c \leq 0.729$ $0.367\% \leq \Delta 1 \leq 0.409\%$ $-0.034\% \leq \Delta 2 \leq 0.058\%$ $-0.566\% \leq \Delta 3 \leq -0.284\%$ $-0.015\% \leq \Delta 4 \leq 0.222\%$; (Condition 5)

$6.47\ \mu m \leq 2a \leq 7.64\ \mu m$ $0.359 \leq a/b \leq 0.435$ $0.695 \leq b/c \leq 0.819$ $0.349\% \leq \Delta 1 \leq 0.409\%$ $-0.067\% \leq \Delta 2 \leq 0.054\%$ $-1.020\% \leq \Delta 3 \leq -0.392\%$ $-0.017\% \leq \Delta 4$; (Condition 6)

$6.16\ \mu m \leq 2a \leq 7.01\ \mu m$ $0.385 \leq a/b \leq 0.473$ $0.597 \leq b/c \leq 0.704$ $0.301\% \leq \Delta 1 \leq 0.409\%$ $-0.034\% \leq \Delta 2 \leq 0.071\%$ $-0.566\% \leq \Delta 3 \leq -0.317\%$ $-0.015\% \leq \Delta 4 \leq 0.132\%$; (Condition 7)

$6.73\ \mu m \leq 2a \leq 8.08\ \mu m$ $0.357 \leq a/b \leq 0.530$ $0.687 \leq b/c \leq 0.796$ $0.339\% \leq \Delta 1 \leq 0.403\%$ $-0.053\% \leq \Delta 2 \leq 0.034\%$ $-0.694\% \leq \Delta 3 \leq -0.505\%$ $-0.017\% \leq \Delta 4 \leq 0.082\%$; (Condition 8)

$6.47\ \mu m \leq 2a \leq 7.64\ \mu m$ $0.359 \leq a/b \leq 0.435$ $0.695 \leq b/c \leq 0.810$ $0.314\% \leq \Delta 1 \leq 0.409\%$ $-0.067\% \leq \Delta 2 \leq 0.060\%$ $-1.020\% \leq \Delta 3 \leq -0.477\%$ $-0.017\% \leq \Delta 4 \leq 0.126\%$; (Condition 9)

$7.14\ \mu m \leq 2a \leq 8.10\ \mu m$ $0.322 \leq a/b \leq 0.483$ $0.744 \leq b/c \leq 0.848$ $0.355\% \leq \Delta 1 \leq 0.412\%$ $-0.037\% \leq \Delta 2 \leq 0.043\%$ $-1.426\% \leq \Delta 3 \leq -0.601\%$ $-0.022\% \leq \Delta 4 \leq 0.035\%$, (Condition 10)

the aforementioned Δ1, Δ2, Δ3, Δ4, a, b, and c satisfy at least any one of the Conditions 0 to 10.

7. The multi-core optical fiber according to claim 1, wherein as an optical characteristic of a cladding mode propagating in a portion of the common cladding located in a region surrounded by three or more cores out of the cores, the bending loss in the bending radius of 140 mm is not less than 19.3 dB/20 m at a wavelength of 1.26 μm.

8. The multi-core optical fiber according to claim 1, wherein a portion of the common cladding located in a region surrounded by the eight or more core units comprises a cladding mode suppresser a relative RI difference of which with respect to the predetermined RI is lower than the aforementioned Δ4.

9. The multi-core optical fiber according to claim 8, wherein the cladding mode suppressor is comprised of a glass having a thermal expansion coefficient different from that of the common cladding excluding the cladding mode suppressor, whereby a stress is applied to each of the cores, and wherein each of the cores has a birefringence of not less than $10^{-4}$, or, a polarization crosstalk of not more than −6.9 dB in a fiber length of 30 m to 10 km.

10. The multi-core optical fiber according to claim 1, which satisfies at least any one of Conditions 11 to 17 as defined below:

(Condition 11)

a neighboring core pitch of the cores is not less than 23.3 μm, and a shortest distance between a core center of a core located closest to an outer periphery side of the common cladding, out of the cores, and the coating is not less than 17.7 μm;

(Condition 12)

a chromatic dispersion slope at the zero dispersion wavelength is not more than 0.092 ps/(nm$^2$·km);

(Condition 13)

the bending loss in the bending radius of 3 mm is not more than 0.10 dB/turn at the wavelength of 1310 nm;

(Condition 14)

one core of the cores is arranged at a center of the common cladding;

(Condition 15)

the cores have their respective RI profiles which are substantially identical with each other;

(Condition 16)

the cores have their respective RI profiles which are substantially identical with each other, except for the core arranged at the center of the common cladding;

(Condition 17)

the multi-core optical fiber is an all-solid optical fiber.

11. An optical cable including one or more optical fibers each having the same structure as the multi-core optical fiber according to claim 1.

12. The optical cable according to claim 11, wherein an average bending radius of the multi-core optical fibers in an unbent state of the optical cable is not more than 1 m, not more than 20 cm, not more than 10 cm, or, not more than 5 cm.

13. An optical connector holding one or more optical fibers each having the same structure as the multi-core optical fiber according to claim 1.

14. An optical connector comprising: a resin ferrule; and four or more multi-core optical fibers arrayed in the ferrule, wherein each of the multi-core optical fibers has a common cladding with a diameter of 124 to 126 μm, and two or more cores, wherein as an optical characteristic of each of the two or more cores, a mode field diameter is from 8 to 10.1 μm at a wavelength of 1310 nm, wherein in each of the multi-core optical fibers, an outmost core is arranged so that a distance between a core center of the outmost core out of the two or more cores and a center of a cross section of the common cladding is not more than 45 μm, wherein projection amounts of end faces of the respective multi-core optical fibers from an end face of the ferrule are not less than 2 μm, and a variation of the projection amounts among the multi-core optical fibers is not more than 0.3 μm, wherein the end faces projecting from the end face of the ferrule are polished, and wherein at least one of the multi-core optical fibers has the same structure as the multi-core optical fiber according to claim 1.

* * * * *